US006836304B2

(12) United States Patent
Sakamaki et al.

(10) Patent No.: US 6,836,304 B2
(45) Date of Patent: Dec. 28, 2004

(54) METHOD OF MANUFACTURING AN IMAGE DISPLAY MEDIUM CAPABLE OF DISPLAYING AN IMAGE REPEATEDLY, AND IMAGE DISPLAY MEDIUM CAPABLE OF DISPLAYING AN IMAGE REPEATEDLY

(75) Inventors: Motohiko Sakamaki, Ashigarakami-gun (JP); Yasufumi Suwabe, Ashigarakami-gun (JP); Kiyoshi Shigehiro, Ashigarakami-gun (JP); Yoshinori Machida, Ashigarakami-gun (JP); Takeshi Matsunaga, Ashigarakami-gun (JP); Yoshiro Yamaguchi, Ashigarakami-gun (JP); Takeo Kakinuma, Ashigarakami-gun (JP); Minoru Koshimizu, Ashigarakami-gun (JP); Shota Oba, Ebina (JP); Nobuyuki Nakayama, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 110 days.

(21) Appl. No.: 09/994,751

(22) Filed: Nov. 28, 2001

(65) Prior Publication Data

US 2002/0113871 A1 Aug. 22, 2002

(30) Foreign Application Priority Data

Feb. 19, 2001 (JP) ........................................ 2001-042597

(51) Int. Cl.[7] ...................... G02F 1/1335; G02F 1/1339
(52) U.S. Cl. ............................ 349/106; 349/155; 430/7
(58) Field of Search ......................... 319/106; 349/155; 430/7; 106/31, 64

(56) References Cited

U.S. PATENT DOCUMENTS

| | | | | | |
|---|---|---|---|---|---|
| 4,639,088 | A | * | 1/1987 | Suginoya et al. | 349/106 |
| 5,885,343 | A | * | 3/1999 | Cernigliaro et al. | 106/482 |
| 6,099,630 | A | * | 8/2000 | Kobayashi et al. | 106/31.64 |
| 6,154,265 | A | * | 11/2000 | Kamio et al. | 349/122 |
| 6,475,683 | B1 | * | 11/2002 | Kashiwazaki | 430/7 |
| 2002/0050976 | A1 | * | 5/2002 | Yamaguchi et al. | 345/105 |

OTHER PUBLICATIONS

"New Toner Display Device (I)" by Gugrae–Jo et al., Japan Hard Copy '99 Papers, 1999, pp. 249–252.
"New Toner Display Device (II)" by Gugrae–Jo et al., Japan Hard Copy '99 Fall Papers, 1999, pp. 10–13.

* cited by examiner

*Primary Examiner*—Julie-Huyen Ngo
(74) *Attorney, Agent, or Firm*—Oliff & Berridge, PLC

(57) ABSTRACT

A method of manufacturing an image display medium for encapsulating powdered display elements uniformly between opposed substrates, and an image display medium. Spacer particles are formed in a grid pattern on a first flat substrate pulled out from a first film roll by a first electrostatic application apparatus, and spacers are formed on the first flat substrate by fixing by a first fixer. Then, black particles are applied on the entire surface by a second electrostatic application apparatus, and then white particles are applied on the entire surface by a third electrostatic application apparatus. Subsequently, black particles and white particles are removed from each upper surface of the spacers by a blade, and a second flat substrate pulled out from a second film roll is superimposed thereon, and each upper surface of the spacers is fixed to the second flat substrate by a second fixer.

12 Claims, 48 Drawing Sheets

METHOD OF MANUFACTURING AN IMAGE DISPLAY MEDIUM CAPABLE OF DISPLAYING AN IMAGE REPEATEDLY, AND IMAGE DISPLAY MEDIUM CAPABLE OF DISPLAYING AN IMAGE REPEATEDLY

BACKGROUND OF THE INVENTION

1. Field of the Invention

The present invention relates to a method of manufacturing an image display medium, and more specifically to a method of manufacturing an image display medium that can display an image repeatedly, and to an image display medium.

2. Description of the Related Art

Hitherto, electronic paper technology for displaying desired images on a display substrate utilizing an electric power has become known. When broadly classified, such electronic paper technology includes constructions in which a liquid display element or a display liquid with a display element dispersed in a liquid is encapsulated between opposed substrates, as in the case of technologies such as electrophoresis, thermal rewritability, liquid crystals, and electrochromy are used, and constructions in which a powder-type display element such as a toner is encapsulated between the opposed substrates, as in the case of a construction in which conductive coloring toner 96 and white particles 98 are encapsulated between two display substrates 90*a*, 90*b* each constructed with a matrix electrode 92 and an electric charge transferring layer 94 laminated in sequence, as shown in FIG. 20.

A method of manufacturing electronic paper in the former construction, in which a liquid display element or a display liquid obtained by dispersing a display element in a liquid is encapsulated between the opposed substrates, is generally known. For example, a liquid crystal display is produced by forming a vacuum between the substrates and causing the liquid display element, or the display liquid with the display element dispersed in the liquid, to be sucked between the substrates.

However, a method of manufacturing electronic paper in the latter construction, in which a powder-type display element such as toner is encapsulated between the opposed substrates, is not generally known. A method comprising steps of dispersing powder bodies in carrier fluid, filling the carrier fluid from an opening into a vacuumed space between substrates, and evaporating the carrier fluid is conceivable as a technique for producing electronic paper with such a construction. However, this is difficult and it is not practical to completely evaporate the carrier fluid filled between the substrates from the opening. In addition, when the substrates are fixed by a spacer, a problem of deterioration of display due to trapping of the powder bodies may arise.

SUMMARY OF THE INVENTION

Accordingly, it is an object of the present invention to encapsulate a prescribed amount of a powder-type display element uniformly between opposed substrates. It is another object of the present invention to provide a method of manufacturing an image display medium, and an image display medium, in which a powder-type display element can be encapsulated uniformly between opposed substrates and irregularities in displayed images due to trapping of powder bodies may be prevented.

In order to achieve the objects described above, a method of manufacturing an image display medium according to a first aspect of the present invention includes steps of: providing substantially flat substrates, one of which having at least one spacer disposed thereon; disposing a plurality of color material particles distributed substantially uniformly on at least one of the substrates; while maintaining a predetermined amount of the plurality of color material particles distributed on the at least one substrate, superimposing another substrate thereon; and using the at least one spacer to fix the substrates to one another.

That is, according to the first aspect of the present invention, a prescribed amount of the color material particles is encapsulated uniformly between two opposed substrates by fixing the first substrate and the spacer of the second substrate in a state in which the color material particles are held on the first substrate, the spacer-side of the second substrate, or both the first substrate and the spacer-side of the second substrate.

Especially, when using two types of color material particles having different electrostatic properties, it is preferable to attach the color material particles having one of the electrostatic properties to the first substrate and the color material particles having the other electrostatic property to the spacer-side of the second substrate.

In other words, since the first substrate and the spacer of the second substrate are fixed with each other in the method of manufacturing the image display medium according to the first aspect, the distance between the first substrate and the second substrate is kept constant. In addition, since the color material particles are held on at least one of the substrates, the color material particles can be encapsulated uniformly over the whole area thereof without causing a disadvantage that the amount of the color material particles encapsulated between the first substrate and the second substrate varies between areas divided by the spacer, including a case where some areas have no color material particles at all.

In order to distribute the color material particles uniformly, the color material particles may be attached to one or both of the first and the second substrates by transferring the particles a prescribed distance by an electric field.

For example, a method utilizing an electrostatic recording system, which includes steps of charging the color material particles and attaching the charged color material particles directly to a substrate formed with an electrostatic latent image on a surface thereof, or of attaching the charged color material particles to an intermediate transfer body formed with an electrostatic latent image on a surface thereof, and then transferring the charged color material particles from the intermediate transfer body to the substrate, may be employed. In addition, the color material particles can be applied in a desired pattern by using electrostatic recording methods such as electrophotographic technology, a multi-stylus electrode, liquid development, electrostatic application, and so on.

Alternatively, a method of simply supplying the color material particles to the substrate and holding the particles on the substrate or the like may be employed. Examples of this method include screen printing, blade coating, roll coating, spray coating, gap coating, and bar coating, and the layer of color material particles may be applied on the substrate by supplying the color material particles with these methods.

Alternatively, the color material particles may be distributed uniformly by dispersing the color material particles in gas and supplying the gas to at least one of the first and the second substrates.

For example, a particle falling method, in which the color material particles are suspended in a space by air blowing or the like, and the substrate is held or passed in the space for a predetermined period of time so that the color material particles are allowed to drop down to form a uniform layer of color material particles on the substrate, may be employed.

Alternatively, a method using magnetic recording, in which color material particles including magnetic bodies therein are held directly on a substrate formed with a magnetic pattern on the surface thereof, or the color material particles are held on an intermediate transfer body formed with a magnetic pattern on the surface thereof and then transferred from the intermediate transfer body to the substrate and held thereon, may be employed. By using magnetography as a magnetic recording method, the color material particles can be applied in a desired pattern.

The color material particles can also be distributed uniformly by supplying them to at least one of the first substrate and the second substrate in a state of being dispersed in a liquid.

For example, a method which includes steps of dispersing the color material particles in a carrier fluid, holding the carrier fluid including the color material particles on the surface of a substrate, and evaporating the carrier fluid so that only the color material particles remain held on the substrate may be employed. For example, a uniform layer of color material particles may be formed on the substrate by applying the color material particles on the substrate by screen printing, blade coating, roll coating, spray coating, gap coating, bar coating, or application by means of a liquid injection device such as an inkjet, and dehydrating to evaporate the carrier fluid.

Another method, which includes steps of supplying the color material particles directly on the substrate, and shaking the substrate so that the color material particles on the substrate are uniformly distributed and held on the substrate, may also be employed. In this method, a uniform layer of color material particles can be applied on the substrate by carrying out cascade development of the color material particles on the substrate, and then shaking the substrate to form a uniform layer of developed color material particles on the substrate. This step of shaking the substrate is also effective in the above-described screen printing, blade coating, roll coating, spray coating, gap coating, bar coating, and particle falling methods.

In addition, a method which includes steps of applying the color material particles on a substrate applied with a volatile liquid in a desired pattern, and holding the color material particles on the volatile liquid so that the color material particles are attached on the substrate in the desired pattern may also be employed. In this method, the layer of color material particles in the desired pattern can be applied on the substrate by supplying and holding the color material particles to the substrate applied with the volatile liquid in the desired pattern by a screen printing, blade coating, roll coating, spray coating, or particle falling method, blowing off excess particles held on areas other than the pattern, and evaporating the volatile liquid.

Still another method, which includes steps of placing a mask having openings arranged in a desired pattern on the substrate, supplying the particles and removing the mask, may be employed for attaching the color material particles on the substrate in a desired pattern. In this method, the color material particles may be applied on the substrate in the desired pattern by placing the mask having openings arranged in the desired pattern on the substrate, supplying the particles to the substrate by a screen printing, blade coating, roll coating, spray coating, gap coating, bar coating, or particle falling method, and removing the mask.

The spacer on the second substrate may be formed by cutting or sandblasting the surface of the flat substrate by the use of a cutting tool, a laser, or the like, or by patterning the substrate by the use of lithography.

A second substrate provided with a spacer may be formed by filling a mold having a casting surface of a spacer pattern with a spacer material and curing same, or by molding same as a second substrate by hot pressing. According to this method, the spacer can be formed in a complicated and precise pattern with a manufacturing method suitable for mass production, thereby enabling an increase in resolution of the displayed images by manufacturing a mold with a desired pattern in advance by a microfabrication technology such as electric-discharge machining, and then curing the mold by ultraviolet rays, visible light rays, or an electron beam, using a stimulation-curable resin such as a UV-curable resin, a visible light-curable resin, or an electron beam-curable cured resin, or by molding a thermoplastic resin by hot press, and curing by cooling.

The spacer on the second substrate may be formed by fixing the spacer after it has been disposed on the flat substrate.

For example, a spacer may be formed by the steps of dispersing spacer particles in adhesive carrier fluid to obtain a dispersion fluid, spraying the obtained dispersion fluid on a flat substrate by a liquid injecting apparatus such as an inkjet recording device and sticking the spacer particles on the substrate by the adhesive property of the carrier fluid, or by steps of dispersing the spacer particles into a volatile carrier fluid, supplying the fluid to a flat substrate formed with a sticky layer, evaporating the carrier fluid, and sticking the spacer particles to the substrate by sticking force of the sticky layer formed on the surface of the substrate.

The sticky layer may be any one of an adhesive layer formed of an adhesive agent, a layer of thermoplastic resin that is plasticizable by application of heat, or a layer of stimulation-curable resin. The stimulation-curable resin that can be used here includes, for example, a UV-curable resin that is cured by ultraviolet rays, a visible light curable resin that is cured by a visible light, and an electron beam-curable resin that is cured by an electron beam.

When a sticky layer of thermoplastic resin is employed, the spacer particles can be fixed on the second substrate by steps of evaporating the carrier fluid, heating to plasticize, and cooling down. According to this method, a substrate having a spacer can be fabricated in a simple and inexpensive manner.

Alternatively, if a layer of stimulation-curable resin is employed as the sticky layer formed on the substrate, the spacer particles can be fixed on the second substrate by the steps of evaporating the carrier fluid, and curing by applying stimulation such as visible light, ultraviolet rays, heat, or an electron beam.

The spacer may also be formed by supplying spacer particles formed with sticking layers on surfaces thereof or spacer particles formed of a thermoplastic resin or a stimulation-curable resin to the flat substrate and fixing them on the substrate by sticking force of the sticky layer on the surfaces of the spacer particles. This sticky layer has the same construction as described above, and thus will not be described again.

For example, a method utilizing the electrostatic recording method, including steps of charging spacer particles, and attaching the charged spacer particles directly on a substrate formed with an electrostatic latent image on the surface thereof, or steps of attaching charged spacer particles on an intermediate transfer body formed with an electrostatic latent image on the surface thereof, transferring the charged spacer particles from the intermediate transfer body to the substrate, and attaching them on the substrate, may be employed. The spacer particles may be applied in a desired pattern by using an electrostatic recording method such as electrophotographic technology, a multi-stylus electrode, liquid development, and electrostatic applications.

The sticky layer may be a layer of thermoplastic resin that is plasticizable by application of heat. The spacer particles may be fixed on the second substrate by heating and plasticizing the sticky layer, and cooling it down. According to this method, a substrate having a spacer may be fabricated in a simple and inexpensive manner.

Alternatively, other methods, including steps of providing spacer particles having magnetic bodies therein, attaching the spacer particles directly on a substrate formed with a magnetic pattern on the surface thereof; or steps of attaching the spacer particles on an intermediate transfer body formed with a magnetic pattern on the surface thereof and transferring and attaching the spacer particles from the intermediate transfer body to the substrate; or steps of disposing a magnetic body or electromagnet formed into a given pattern on a back side of a substrate, attaching the spacer particles on a front surface of the substrate, and removing the magnetic body or turning off the electromagnet, may be employed. When using magnetography as a magnetic recording method, the spacer particles maybe applied in a desired pattern, and fixed on the substrate by sticking force of the sticky layer on the surface of the spacer particles. The sticky layer has the same construction as described above, and thus will not be described again.

In addition, a method including steps of dispersing the spacer particles in a carrier fluid, attaching the carrier fluid on the surface of the substrate, and then evaporating the same so that only the spacer particles remains attached on the substrate may be employed. For example, a method of forming a spacer that includes steps of applying the spacer particles on the substrate by screen printing, blade coating, roll coating, spray coating, gap coating, bar coating, or application by means of a liquid injection device such as an inkjet, and fixing the spacer particles on the substrate by sticking force of the sticky layer on the surface of the spacer particles may be employed. The sticky layer has the same construction as described above, and thus will not be described again.

In addition, a method which includes steps of applying spacer particles on a substrate applied with a volatile liquid in a desired pattern, and attaching the spacer particles on the volatile liquid so that the spacer particles are attached on the substrate in a desired pattern may be employed. For example, a method of forming a spacer which includes steps of supplying and attaching the spacer particles on the substrate applied with a volatile liquid in a desired pattern by screen printing, blade coating, roll coating, spray coating, or the particle falling method, blowing off excess spacer particles attached in an area other than the pattern with air or the like, and evaporating the volatile liquid may be employed so that the spacer particles are applied on the substrate in the desired pattern and fixed on the substrate by sticking force of the sticky layer on the surface of the spacer particles. The sticky layer has the same construction as described above, and thus will not be described again.

A method of attaching the spacer particles on the substrate in a desired pattern by steps of placing a mask having openings formed in a desired pattern on the substrate, supplying the spacer particles thereto, and removing the mask from the substrate may also be employed. For example, a method of forming a spacer by steps of supplying the spacer particles to the substrate with the mask having openings arranged in the desired pattern placed thereon by screen printing, blade coating, roll coating, spray coating, gap coating, bar coating, or the particle falling method, and removing the mask may also be employed so that the spacer particles are applied on the substrate in the desired pattern and fixed on the substrate by sticking force of the sticky layer on the surfaces of the spacer particles. The sticky layer has the same construction as described above, and thus will not be described again.

The spacer may be formed by forming a film of thermoplastic resin by thermal transfer application, for example, with a thermal head or the like, or by stimulating a film formed of a stimulation-curable resin. According to this method, a desired pattern may be produced by processing the substrate by hot pressing or the like, and thus the spacer may be fabricated by an inexpensive method suitable for mass production. It is also possible to use a resin obtained by mixing the spacer particles with a thermoplastic resin in advance.

The spacer to be arranged on the flat substrate may also be formed by arranging rod shaped members each provided with a surface layer of thermoplastic resin or rod shaped members each formed of a thermoplastic resin on the flat substrate, and curing them by application of heat, or by arranging rod shaped members each provided with a layer of a stimulation-curable resin or rod shaped members formed of a stimulation-curable resin on the flat substrate, and curing them by stimulation. It is also applicable to cross pluralities of rod shaped members. The thermoplastic resin and the stimulation-curable resin are the same as those described above, and thus will not be described again.

The second substrate may be applied with a film with a rough surface, obtained by mixing the spacer particles with a polymeric resin film. According to this method, by encapsulating the particles in recesses of the film and applying a thermoplastic resin and a stimulation-curable resin on projections, the second substrate can be adhered to the first substrate.

The spacer may be of any type as long as a space between the first substrate and the second substrate is kept constant. However, it is preferable to form the spacer in a grid pattern or in a mesh pattern. A number of cells are defined between the first substrate and the second substrate by forming the spacer in a grid pattern or in a mesh pattern, which prevents the color material particles from gathering to one portion of the display medium when the display medium is moved. It is also preferable because various colors can be displayed by changing the colors of the color material particles to be encapsulated in each of the divided cells.

A member with a grid pattern or a mesh pattern may be formed by forming holes in a sheet formed of metal, such as stainless steel or a resin film such as polyimide, by an etching or laser process, by depositing a metal such as nickel by electroforming, or by knitting metal wire such as stainless steel or a resin such as nylon into a mesh pattern. These members may also be coated as needed with a resin insulating material, or with a thermoplastic resin for providing an adhesive property.

The color material particles may be distributed uniformly by supplying a prescribed certain amount of color material particles from a container containing the color material particles to at least one of the first substrate and the second substrate.

It is also possible to distribute the color material particles uniformly by removing excess color material particles after supplying the color material particles to at least one of the first substrate and the second substrate.

In addition, in a second aspect of the present invention, preferably, a method of manufacturing an image display medium includes steps of: providing substantially flat substrates, one of which having at least one spacer disposed thereon, the substrates being fixable to one another using the at least one spacer interposed between the substrates; disposing a plurality of color material particles on at least one of the substrates; while maintaining the color material particles on the at least one of the substrates, superimposing the substrates such that substantially no color material particles are disposed on a surface of the at least one spacer opposing one of the substrates; and fixing the substrates to one another using the at least one spacer.

According to this aspect, the first substrate and the spacer of the second substrate are fixed in such a manner that the color material particles are held between the first substrate and the second substrate without attaching the color material particles on the surface of the spacer opposing to the first substrate. The term "without attaching" includes a case where the particles are removed after being attached.

That is, the color material particles are held on the second substrate, the color material particles being held over a whole area of an upper surface of the spacer provided on the second substrate. The first substrate is to be fixed on the upper surface of the spacer, so the color material particles attached on the upper surface of the spacer are at risk of being fixed with fixation between the spacer and the first substrate.

If the color material particles are fixed between the spacer and the first substrate, this may cause not only deterioration of an adhesive property between the spacer and the first substrate, but also deterioration of image quality, because the fixed color material particles are always visible when the side of the first substrate is used as a display surface. Therefore, although images of better quality may be obtained by using the second substrate as a display surface, removing the color material particles fixed on the upper surface of the spacer or preventing them from attaching thereon helps to improve the adhesive property between the spacer and the first substrate and to provide a display medium that always displays clear images without deterioration of image quality in either of cases where the first substrate side is used as a display surface and where the second substrate side is used as a display surface.

As measures to remove color material particles attached on the upper surface of the spacer or to prevent them from attaching thereon, for example, setting the adhesive property of the upper surface lower than that of the second substrate, and shaking the spacer to remove the color material particles on the upper surface are conceivable. In the case of removing the color material particles, moving a blade that is in contact only with the upper surface of the spacer relative to the second substrate to remove the color material particles attached on the upper surface of the spacer is possible.

Since amounts of the color material particles on the upper surface of each spacer will be almost equal with each other, when the blade and the second substrate are moved one way with respect to each other, each area divided by the spacer receives an equal amount of the color material particles, which is the amount scraped off the upper surface of one spacer. Therefore, equal amounts of color material particles are consistently held in the respective areas.

By evening out the color material particles with a blade, cell structures between the spacers or recesses may be positively filled with the color material particles in a uniform manner. More specifically, the color material particles may be filled uniformly in recesses formed on the second substrate by a member with a mesh pattern, by adhering the member with a mesh pattern on the second substrate as a spacer, applying the color material particles therein, and evening out the filled color material particles with the blade. Alternatively, amounts of the color material particles may be finely controlled by controlling tendency of the blade to follow the recesses and projections of the mesh portion, by varying elasticity of the blade member, or by controlling an angle of the blade with respect to the mesh portion, or force of pressing the mesh portion. In addition, excess color material particles on projections of the mesh member may be removed.

Alternatively, in a third aspect of the present invention, a method includes steps of: providing substantially flat substrates that are fixable to one another using at least one spacer; fixing the substrates to one another via the at least one spacer, such that there is a gap between the substrates; dispersing color material particles in a gas; supplying the color material particles dispersed in the gas to the gap; and trapping the color material particles in the gap.

In a fourth aspect of the present invention, a method includes steps of: providing substantially flat substrates that are fixable to one another using at least one spacer; fixing the substrates to one another via the at least one spacer, such that there is a gap between the substrates; dispersing color material particles in a liquid; supplying the color material particles dispersed in the liquid to the gap; and trapping the color material particles in the gap.

As has been described thus far, by supplying the color material particles in a state in which the first substrate and the second substrate are fixed via the spacer in advance, irregularities in displayed images caused by trapping of the color material particles between the substrates may be prevented.

The fifth aspect of the present invention is an image display medium including: a first substantially flat substrate; a second substantially flat substrate which includes at least one spacer, the second flat substrate being superimposed with the first flat substrate with the at least one spacer therebetween such that a substantially constant distance is maintained between the substrates; and a plurality of color material particles disposed between the substrates, wherein the spacer comprises a shape that tapers toward a side thereof facing the first flat substrate. Accordingly, the area of a contact surface between the spacer and the first substrate may be reduced, thereby preventing trapping of the color material particles between the substrates.

It is also possible to hold the plurality of color material particles on one or both of the flat first substrate and the flat second substrate, then attach the spacer member to one of the first substrate and the second substrate, and then fix the spacer member and the first substrate and the second substrate so that the color material particles and the spacer member are disposed between the first substrate and the flat second substrate.

In other words, by attaching the plurality of color material particles and the spacer member on the first substrate and then fixing the first substrate and the second substrate; or by attaching the plurality of color material particles on the first substrate, attaching the spacer member on the second substrate, and then fixing the first substrate and the second substrate; or by attaching at least one type of color material particles and the spacer member on the first substrate, attaching remaining color material particles on the second substrate, and fixing the first substrate and the second substrate; or by attaching at least one type of the color material particles on the first substrate, attaching remaining color material particles and the spacer member on the second substrate, and fixing the first substrate and the second substrate, the color material particles can be encapsulated uniformly between the opposed substrates and the process can be simplified because it is not necessary to provide a spacer on the substrate in a separate process, which is preferable.

In addition, preferably, the process is further simplified by transferring the plurality of color material particles and the spacer member to an intermediate transfer body, and then holding them from the intermediate transfer body to the flat first substrate.

The following methods, of the methods described above in relation to the first aspect, may be employed for holding the color material particles and the spacer members on the substrate.

That is, methods utilizing an electrostatic recording method, such as a method in which charged color material particles and a particulated spacer member (hereinafter referred to as spacer particles) are directly held on a substrate formed with an electrostatic latent image on a surface thereof, or a method in which the charged color material particles and the spacer particles are held on an intermediate transfer body formed with an electrostatic latent image on the surface thereof, and then the charged color material particles and the spacer particles are transferred from the intermediate transfer body to the substrate, may be employed. The color material particles and the spacer particles to be used in this method may be the same as those described in relation to the first aspect, so the descriptions will not be given again.

As other methods, methods utilizing magnetic recording, such as a method in which at least one type of color material particles having a magnetic body therein and the spacer particles are used, and the color material particles and the spacer particles are directly held on the substrate formed with a magnetic pattern on the surface thereof, or a method in which at least one type of color material particles and the spacer particles are held on an intermediate transfer body formed with a magnetic pattern on the surface thereof, and the color material particles are transferred from the intermediate transfer body and attached to the substrate, may be employed. Again, the color material particles and the spacer particles in this method may be the same as those described for the first aspect, so the descriptions will not be repeated.

It is also possible to hold the plurality of color material particles on one or both of the flat first substrate and the flat second substrate with one of the flat first substrate and the flat second substrate masked, release the mask, and then hold the spacer member on one of the first substrate and the second substrate so that the spacer member and the first substrate and the second substrate are fixed in such a manner that the color material particles and the spacer member are disposed between the first substrate and the flat second substrate.

In other words, the plurality of color material particles are attached on one or both of the flat first substrate and the flat second substrate in a state in which one of the flat first substrate and the flat second substrate is masked by a member such as a mesh. After the color material particles have been held, the mask is released, and the spacer member is held on one of the first substrate and the second substrate. Subsequently, the spacer member and the first substrate and the second substrate are fixed in such a manner that the color material particles and the spacer member are disposed between the first substrate and the flat second substrate.

In this manner the color material particles may be held on only a required portion by attaching the color material particles in the masked state. Methods described for the first aspect may be used as a method of attaching the color material particles.

The spacer member may be a member with a mesh pattern, whereby the cell construction can be produced in a simple manner.

A resilient material may be used for the spacer member or for an adhesive agent for adhering the spacer member, whereby the first substrate and the second substrate are prevented from being separated even when a vertical or lateral stress is exerted on these substrates, since the spacer member or the adhesive agent for adhering the spacer member is elastic.

The spacer member may be formed of a resin. For example, one formed by applying a resin over all the surface of the first substrate or of the second substrate, then curing the resin by the application of heat, and then pressing by a die, of a predetermined configuration having projections and recesses, may be used as a spacer.

Alternatively, a plurality of color material particles are held on one or both of a flat first substrate and a flat second substrate, which are fittable with each other, and then the first substrate and the flat second substrate are fixed by fitting with each other.

That is, the first substrate and the second substrate each has a configuration that includes prescribed projections and recesses, and thus the color material particles may be supplied into the recesses on the first substrate or the second substrate. In addition, the first substrate and the second substrate have configurations that can be fitted with each other. Thus, the projections may be utilized as spacer members, and the first substrate and the second substrate can be fixed with each other without adhering. In this way, an image display medium can be manufactured in simple steps.

Uniform application in the cells may be realized by applying an alternating current by upper and lower electrodes to make the color material particles flow, after application of the color material particles in a manner described above.

The term “uniform” above means a uniformity such that variations between cells are not significant and no bias is found on the surface, in other words, that no irregularity in display density can be visually recognized when images are actually displayed.

For example, in the case of an image display medium that is divided into cells (the space between the substrates is divided into sub-spaces by a spacer or the like), when the amounts of particles encapsulated in each cell differ from each other, this will be recognized as irregularities in density.

Therefore, if the area of each cell viewed from the display surface is generally equal to that of other cells, a state in which an equal amount of the particles is encapsulated in each cell is called a uniformly encapsulated state, or a uniformly supplied state.

If the area of the cell viewed from the display surface differs from cell to cell, a state in which the encapsulated amounts per unit area of the cells (volume of the particles/area of the cell, or weight of the particles/area of the cell) are almost equal with each other is called uniform.

If the image display medium is not clearly divided into cells when viewed from the display surface, the case where the encapsulated amount per unit area is equal for all of the display surface of the image display medium is called uniform. In this case, a portion of the spacers (ribs) is not included as the display surface.

The uniformity of the amounts of the particles may be inspected for example from the amount supplied per unit area, obtained by transferring the particles held on the substrate from the substrate to an adhesive tape or the like and measuring the weight (or volume) thereof.

Though irregularities in density that an observer can visually recognize differ depending on qualities of the material, color, diameter of the particles used for display, configuration of the cells, the area of the image display medium, the absolute amount of the particles encapsulated, type and brightness of a light source of illumination, irregularities in density will not be obvious and the distribution is recognized to be substantially uniform when the amounts supplied per unit area are in a range of ±10%. It will look quite uniform and irregularities in display density can hardly be recognized when variations are within a range of ±30%.

DETAILED DESCRIPTION OF THE PREFERRED EMBODIMENTS

A method of manufacturing an image display medium according to the present invention will now be described, referring to the case of manufacturing a display medium provided with a plurality of cells in which two types of particles different in color and a property are encapsulated, for example, a display medium provided with a plurality of cells in which conductive black particles and insulative white particles are encapsulated, a display medium provided with a plurality of cells in which conductive white particles and insulative black particles are encapsulated, a display medium provided with a plurality of cell in which insulative black particles and insulative white particles are encapsulated, or a display medium provided with a plurality of cells in which a plurality of color material particles are encapsulated.

(First Embodiment)

Figure 1:
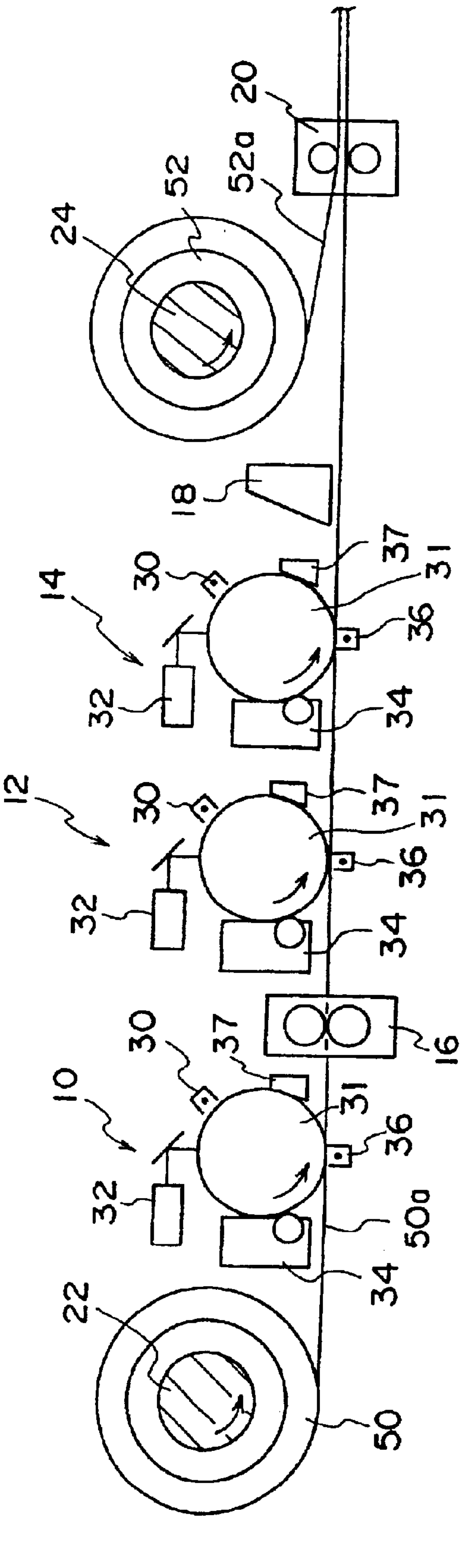
FIG. 1 is an explanatory drawing schematically showing a production line according to a first embodiment of the present invention.

In the first embodiment, as shown in FIG. 1, a line principally comprising a first electrostatic application apparatus 10, a second electrostatic application apparatus 12, a third electrostatic application apparatus 14, a first fixer 16, a blade 18, a second fixer 20, a first roller holding shaft 22, and a second roller holding shaft 24 is used. Spacer particles 60 and the particles in two colors are electrically applied on a first flat substrate 50*a* by electrophotography, and a second flat substrate 52*a* is adhered thereon.

A first film roll 50 and a second film roll 52 are formed for example of a 50 μm flat plate of PET (polyethylene terephthalate), and wound into a roll. The first film roll 50 is mounted on the first roller holding shaft 22 and the second film roll 52 is mounted on the second roller holding shaft 24, and each is unwound from one end and transferred continuously.

There are provided between the first roller holding shaft 22 and the second roller holding shaft 24, the first electrostatic application apparatus 10, the first fixer 16, the second electrostatic application apparatus 12, the third electrostatic application apparatus 14, and the blade 18, arranged in that order from the side of the first roller holding shaft 22. The first flat substrate pulled out from the first film roll 50 passes through the first electrostatic application apparatus 10, the first fixer 16, the second electrostatic application apparatus 12, the third electrostatic application apparatus 14 and the blade 18, in this order, and then is superimposed with the second flat substrate pulled out from the second film roll 52 and fixed by the second fixer 20.

The first electrostatic application apparatus 10 is a device for electrostatically applying the spacer particles 60 on the first flat substrate 50*a*, and is constructed of a charger 30 for charging a photoreceptor drum 31 uniformly, an optical writing unit 32 for forming an electrostatic latent image in a grid pattern on the photoreceptor drum 31, a developer 34 for charging the spacer particles 60 and supplying them to the photoreceptor drum 31, a corotron 36 for applying an electric field to transfer the spacer particles attached on the photoreceptor drum 31 to the first flat substrate 50*a*, and a cleaner 37 for removing the spacer particles remaining on the surface of the photoreceptor drum 31 after transfer is made. These are installed in that order around the photoreceptor drum 31.

Figure 2:
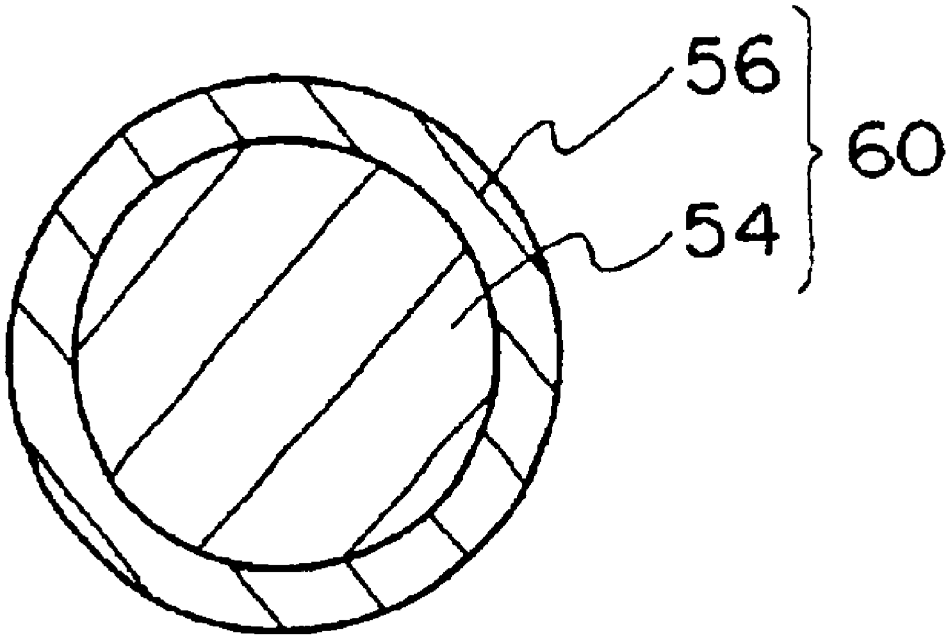
FIG. 2 is a cross sectional view of a spacer particle.

The spacer particles 60 are particles constructed in such a manner that an insulative particle 54 formed of a crosslinking copolymer containing divinyl benzene as a major component, of, for example, about 100 μm in mean diameter, is formed with a 10 μm layer of thermoplastic resin 56 on the surface thereof, as shown in FIG. 2.

In the first electrostatic application apparatus 10, an electrostatic latent image in a grid pattern of 500 μm×500 μm unit cells is formed on the photoreceptor drum 31, which is uniformly charged by the charger 30, by means of the optical writing unit 32. Then the spacer particles 60 in a charged state are supplied from the developer 34 and attached to the electrostatic latent image in a grid pattern to be distributed in the grid pattern. And then the spacer particles 60 distributed in the grid pattern are applied with the electric field when they pass over the corotron 36 and are transferred to the first flat substrate 50*a* being continuously carried between the photoreceptor drum 31 and the corotron 36.

The first fixer 16 is provided at a downstream side of the photoreceptor drum 31. The first fixer 16 heats up the first flat substrate 50*a* onto which the spacer particles 60 have been transferred. Then, the layer of thermoplastic resin 56 formed on the spacer particles 60 attached on the first flat substrate 50*a* melts, and apart thereof moves into space between the insulative particles 54 and the first flat substrate 50*a*.

When it has passed the first fixer 16, the first flat substrate 50*a* is cooled down by outside air, and the layer of thermoplastic resin 56 is fixed on the first flat substrate 50*a*, so that the spacer particles 60 are fixed on the first flat substrate 50*a*. Consequently, the first flat substrate 50*a* is formed into a substrate provided with a projecting spacer for keeping a distance from the second flat substrate 52*a* constant.

The second electrostatic application apparatus 12 is provided beyond the first fixer 16. The second electrostatic application apparatus 12 has the same construction as the first electrostatic application apparatus 10 described above, and thus the same reference numerals are designated, and description of the device will not be given again.

The developer 34 in the second electrostatic application apparatus 12 is filled, for example, with conductive black particles 62 such as spherical conductive black particles formed of amorphous carbon, of about 20 μm in mean diameter and in the order of $10^{-2}$ Ω·cm in resistivity. The conductive black particles 62 are charged and supplied to the photoreceptor drum 31. The spherical conductive black particles 62 formed of amorphous carbon can be obtained by carbonizing calcination (or sintering) of a thermosetting phenol resin.

In the second electrostatic application apparatus 12, the photoreceptor drum 31 is totally charged by the charger 30. Therefore, the spherical conductive black particles 62 in a charged state supplied from the developer 34 are attached uniformly on the photoreceptor drum 31, and then continuously transferred onto the first flat substrate 50*a* being carried between the photoreceptor drum 31 and the corotron 36 by the electric field applied as the drum 31 passes the corotron 36.

Figures 3A, 3B, 3C, 3D:
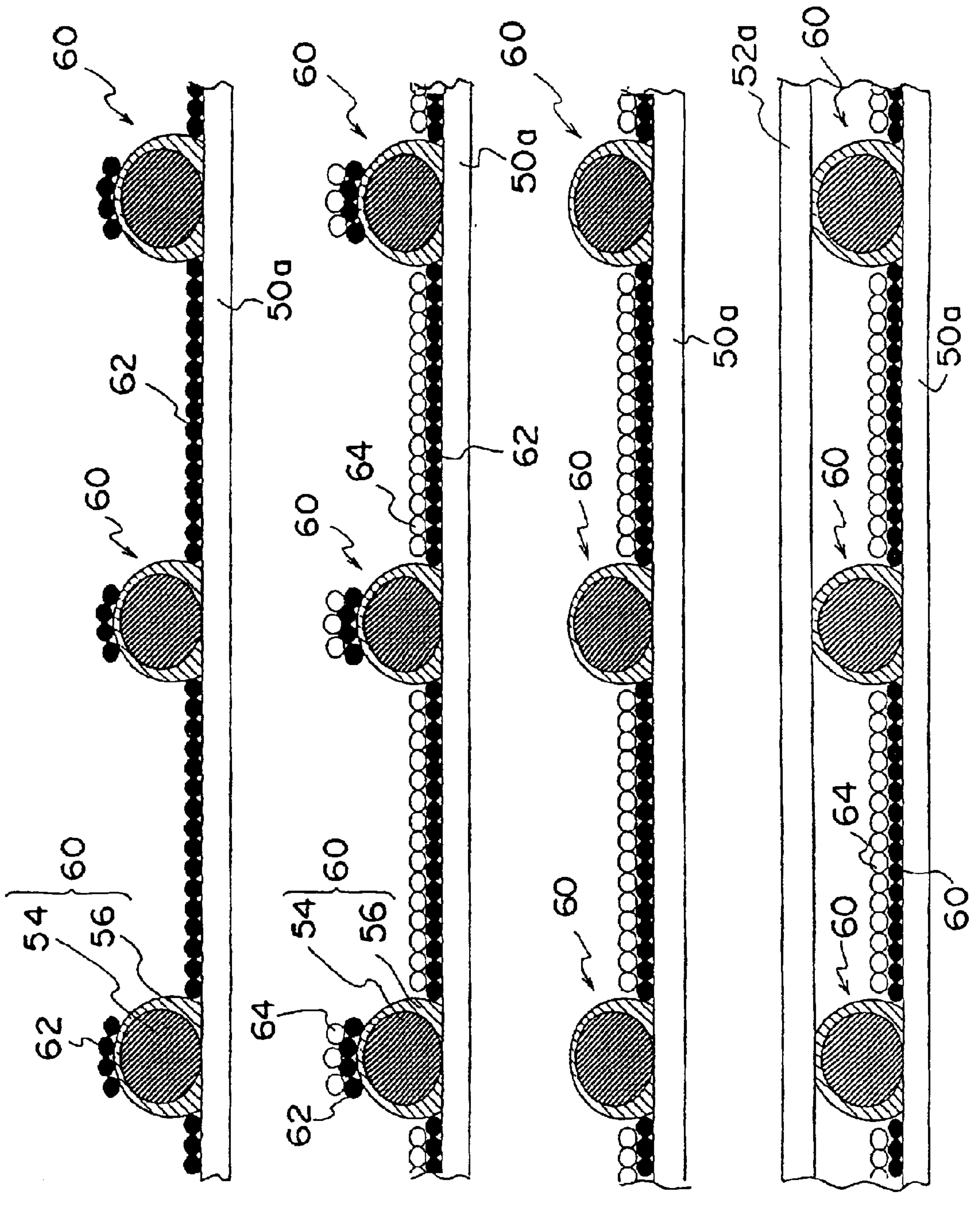
FIG. 3A is an explanatory drawing showing a state in which black particles are attached on a first substrate provided with a spacer.
FIG. 3B is an explanatory drawing showing a state in which white particles are further attached to the first substrate already attached with black particles as in FIG. 3A.
FIG. 3C is an explanatory drawing showing a state in which the black particles and the white particles attached on an upper surface of the spacer are removed by a blade 18 after the state shown in FIG. 3B in which the black particles and the white particles are attached on the first substrate.
FIG. 3D is a cross sectional view showing schematic construction of an obtained image display medium.

Therefore, the spherical conductive black particles 62 are attached over the whole surface of the first flat substrate 50*a*, including upper surfaces of the spacer particles 60, as shown in FIG. 3A.

The third electrostatic application apparatus 14 is provided beyond the second electrostatic application apparatus 12. The third electrostatic application apparatus 14 has the same construction as the first electrostatic application apparatus 10 described above, and thus identical reference numerals are designated, and description of the device will not be given again.

The developer 34 in the third electrostatic application apparatus 14 is filled, for example, with insulative white particles 64, such as spherical particles of a crosslinking copolymer containing divinyl benzene as a major component, of 20 μm in mean diameter, which serve as concealing particles. The developer 34 charges the insulative white particles 64 and supplies them to the photoreceptor drum 31.

In the third electrostatic application apparatus 14, the photoreceptor drum 31 is also charged as in the case of the photoreceptor drum 31 in the second electrostatic application 12.

Therefore, the insulative white particles 64 supplied from the developer 34 in the charged state are attached uniformly over the whole surface of the photoreceptor drum 31, and then transferred continuously onto the first flat substrate 50*a* being carried between the photoreceptor drum 31 and the corotron 36, by the electric field applied when the drum 31 passes the corotron 36.

As a consequence, on the first flat substrate 50*a*, as shown in FIG. 3B, the insulative white particles 64 are attached on the layer of spherical conductive black particles 62 on the whole surface, including the upper surfaces of the spacer particles 60, in a layer.

A blade 18 is provided beyond the third electrostatic application apparatus 14, and a blade unit removes the spherical conductive black particles 62 and the insulative white particles 64 that are attached on the upper surfaces of the spacer particles 60 by the blade scraping the upper surfaces of the spacer particles 60. Accordingly, as shown in FIG. 3C, the spherical conductive black particles 62 and the insulative white particles 64 are left only in the areas defined by the spacer particles 60.

The first flat substrate 50*a* that has passed under the blade 18 is supplied with the second flat substrate 52*a* pulled out from the second film roll 52 and superposed therewith, and then heated by the second fixer 20. Consequently, the layer of thermoplastic resin 56 of the spacer particles 60 melts. When it has passed through the second fixer 20, the melted thermoplastic resin is cooled down by the outside air and cured, and thus the layer of thermoplastic resin 56 on the upper surface of the spacer particles 60 is fixed to the second flat substrate 52*a*, thereby fixing the upper surface of the spacer particles 60 and the second flat substrate 52*a*.

Accordingly, as shown in FIG. 3D, an image display medium in which the powdered color material particles are encapsulated uniformly between the opposed first flat substrate 50*a* and the second flat substrate 52*a* can be formed.

As each of the combination of the first flat substrate 50*a* and the second flat substrate 52*a* for constructing the image display medium, a two layer film obtained by forming an electrode layer of about 50 μm in thickness on a film formed of an electric charge transporting material can be used.

With a substrate of the construction described above, images can be displayed thereon by applying an electric field according to image data from a side of an electron hole-transporting film and causing the color material particles to attach to a side of a film formed of an electric charge transporting material.

Alternatively, for example, a flat substrate comprising a glass plate provided with a plurality of ITO (INDIUM TIN OXIDE) picture element electrodes thereon and a flat substrate comprising a glass plate provided with an ITO electrode over the whole surface thereof may be combined. In this case, the substrate is provided with an electric charge-transporting layer of an electric charge-transporting material on the surface of the ITO electrode, so images can be displayed thereon by applying the electric field from the side of the flat substrate provided with the plurality of ITO picture element electrodes, to cause the black particles to attach thereon according to the image data.

The electric charge-transporting material that can be employed here includes for example, an electron hole-transporting film formed by adding about 40 wt % of N-methyl carbazole diphenylhydrazone, which is an electron hole-transporting substance, to a polyethylene resin, dispersing uniformly and molding to a thickness of about 50 μm, and an electron hole-transporting film formed by adding about 40 wt % of β, β-bis (methoxyphenyl) vinyl diphenylhydrazone, which is also an electron hole-transporting substance, to a polyethylene resin, dispersing uniformly, and molding to a thickness of about 50 μm.

The spacer particles 60 used here are the insulative particles 54 formed with the layer of thermoplastic resin 56 on the surface thereof.

The first fixer 16 and the second fixer 20 apply heat to the thermoplastic resin and soften it to fix the spacer particles. For example, when using the spacer particles 60 formed with the layer of thermoplastic resin on the surfaces thereof, the first fixer 16 and the second fixer 20 are structured to heat the spacer particles and fix the spacer particles 60 on the first flat substrate 50*a* and the second flat substrate 52*a*.

In the first electrostatic application apparatus 10, other types of electrostatic latent image forming apparatuses such as a pin electrode, an ion flow apparatus or the like may be used instead of the optical writing unit 32.

Figure 4:
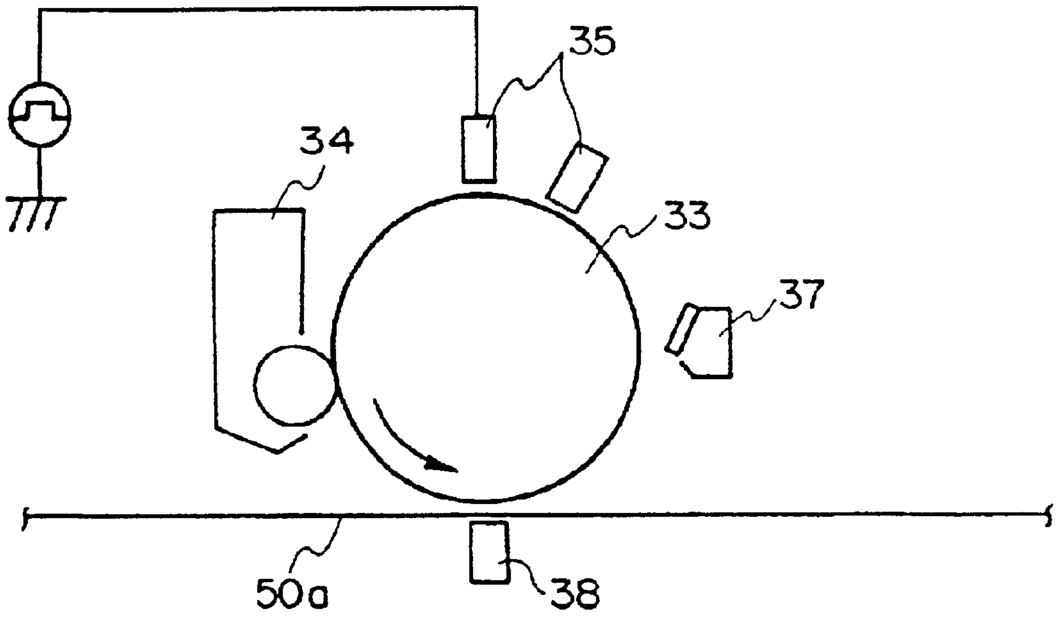
FIG. 4 is a schematic block diagram showing an example of construction of a magnetic recording system.

In addition, by employing magnetic particles as the spacer particles 60, the spacer particles 60 can be distributed on the first flat substrate 50*a* in a grid pattern by magnetic recording. In this case, a magnetic recording apparatus such as a magnetograph is used instead of the first electrostatic application apparatus 10 of the line described above. The magnetic recording apparatus has a construction with a magnetic writing unit 35 for forming a magnetic pattern in a grid pattern on the surface of a soft magnetic thin film drum 33, a developer 34 for supplying the spacer particles 60 to the soft magnetic thin film drum 33, a magnetism generating unit 38 for applying a magnetic field to transfer the spacer particles attached on the soft magnetic thin film drum 33 to the first flat substrate 50*a*, and a cleaner 37 for removing spacer particles remaining on the surface of the soft magnetic thin film drum 33, arranged around the soft magnetic thin film drum 33 as shown in FIG. 4. Since the magnetic recording apparatus is the same as the first electrostatic application apparatus 10 described above except for the point that magnetism is used, detailed description will not be made.

It is also possible to construct the apparatus in such a manner that the spacer particles 60, the black particles 62, and the white particles 64 are dispersed in respective carrier fluids to make dispersion liquids, and the dispersion liquids are supplied from the developers 34 to the photoreceptor drums 31 (so called liquid development).

(Second Embodiment)

Figure 5:
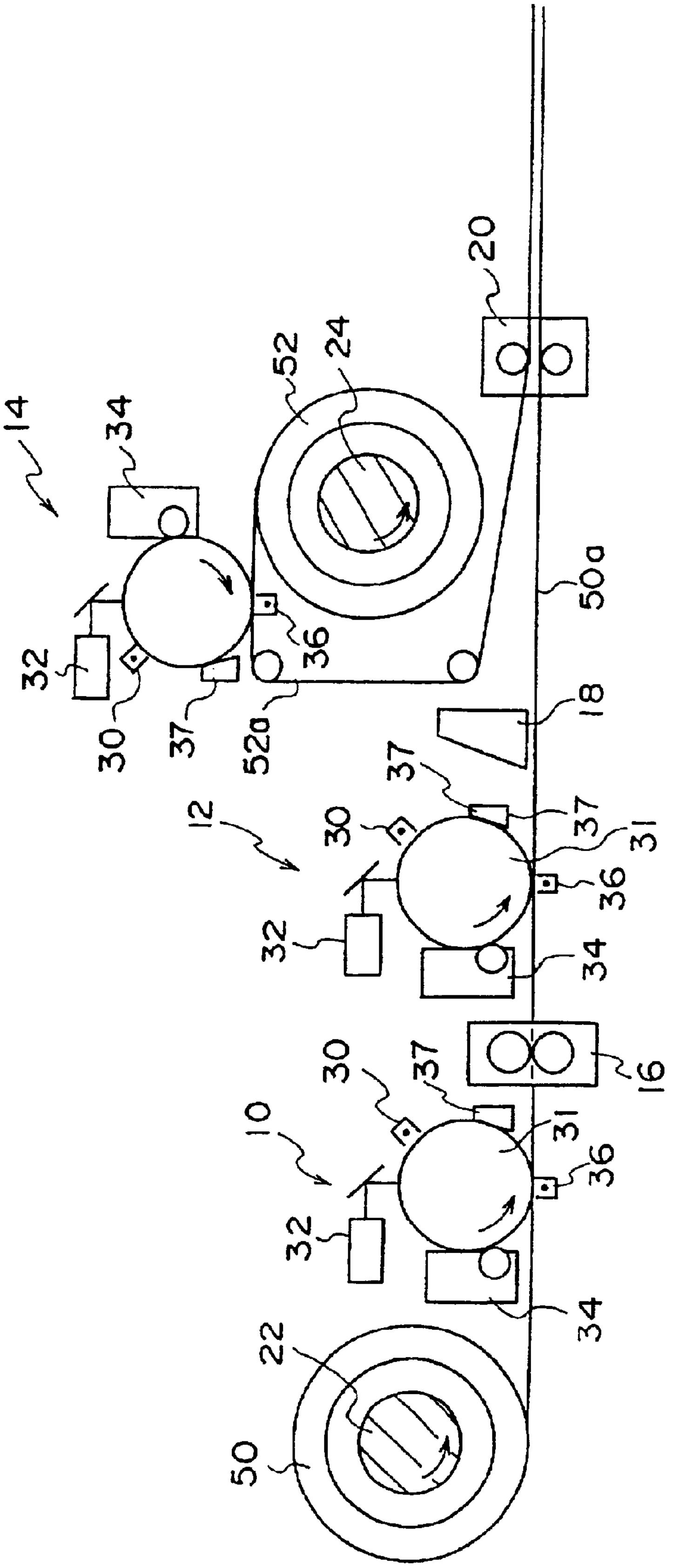
FIG. 5 is an explanatory drawing schematically showing a production line according to a second embodiment of the present invention.

The second embodiment is a modification of the first embodiment. It includes the first electrostatic application apparatus 10, the first fixer 16, the second electrostatic application apparatus 12, and the blade 18 arranged between the first roller holding shaft 22 and the second roller holding shaft 24, in that order from the side of the first roller holding shaft 22 as shown in FIG. 5. The spacer is formed on the first flat substrate 50*a* pulled out from the first film roll 50 by the first electrostatic application apparatus 10 and the first fixer 16, then the black particles 62 are attached over the whole surface thereof by the second electrostatic application apparatus 12. Subsequently, the black particles 62 attached on the upper surfaces of the spacer particles 60 are scraped off by the blade 18 before further conveyance.

The third electrostatic application apparatus 14 is provided at the second flat substrate 52*a* pulled out from the second film roll 52, and the white particles 64 are attached on the second flat substrate 52*a* by the third electrostatic application apparatus 14.

In other words, in the second embodiment, after the spacer is formed, the first flat substrate 50*a* on which the black particles 62 are attached and the second flat substrate 52*a* on which the white particles 64 are attached are superimposed with the black particles 62 and the white particles 64 disposed between the substrates, and then heated by the second fixer 20 to fix the upper surface of the spacer particles 60 and the second flat substrate 52*a*.

Accordingly, an image display medium having the powdered color material particles encapsulated uniformly between the opposed first flat substrate 50*a* and the second flat substrate 52*a* is obtained. According to this method, the black particles 62 and the white particles 64 may be encapsulated between the two substrates without problem even if they are inversely charged and repel each other. In this method, the substrates are fixed with each other in a state in which the white particles 64 are sandwiched between the upper surface of the spacer particles 60 and the second flat substrate 52*a*, but this causes little problem since these particles are concealing particles. Other parts of the construction are the same as in the first embodiment, and thus descriptions will not be given again.

(Third Embodiment)

Figure 6:
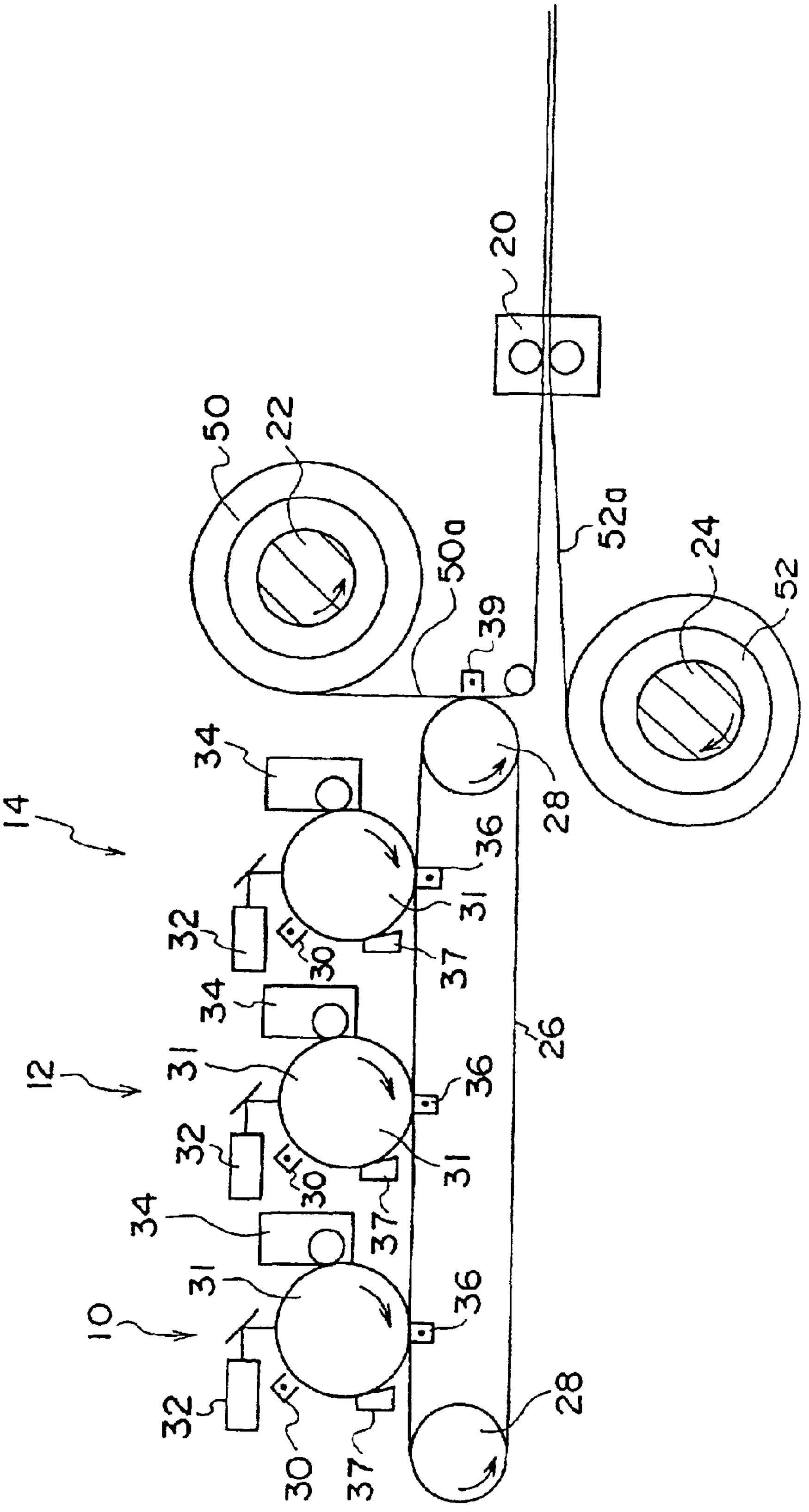
FIG. 6 is an explanatory drawing schematically showing a production line according to a third embodiment of the present invention.

The third embodiment is another modification of the first embodiment. It comprises the first electrostatic application apparatus 10, the second electrostatic application apparatus 12, and the third electrostatic apparatus 14 arranged in this order on an intermediate transfer body 26 which is an endless belt rotated by a pair of rotating rollers 28, as shown in FIG. 6. The spacer particles 60, the black particles 62, and the white particles 64 are transferred respectively to the intermediate transfer body, then the spacer particles 60, the black particles 62, and the white particles 64 are transferred from the intermediate transfer body to the first flat substrate 50*a* all at once by a corotron 39. Subsequently, the second flat substrate 52*a* is superimposed thereon, the layer of thermoplastic resin 56 on the surface of the spacer particles 60 disposed between the first flat substrate 50*a* and the second flat substrate 52*a* is melted by the second fixer 20, and the first flat substrate 50*a* and the second flat substrate 52*a* are fixed via the spacer particles 60 all at once.

The optical writing unit 32 in each of the first electrostatic application apparatus 10, the second electrostatic application apparatus 12, and the third electrostatic application apparatus 14 may be constructed to form an electrostatic latent image of a given pattern on the each photoreceptor drum 31. Accordingly, the particles may be formed on the intermediate transfer body 26 in the given patterns. In this case, a polarity of electric charge of these particles has to be the same.

The amount of the particles supplied can be controlled by a speed of transportation or a charge amount of the intermediate transfer body 26. The transfer method may be any one of contact transfer methods and non-contact transfer methods.

This method has an advantage in that the manufacturing process may be simplified because it requires the step of fixation only once. Other constructions are the same as in the first embodiment, and thus descriptions will not be given.

(Fourth Embodiment)

Figure 7:
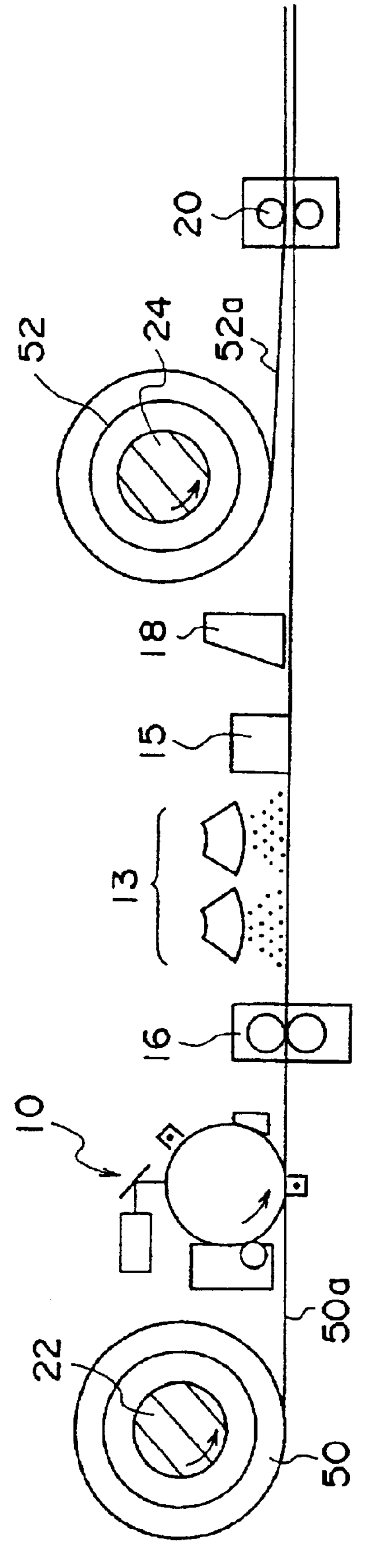
FIG. 7 is an explanatory drawing schematically showing a production line according to a fourth embodiment of the present invention.

The fourth embodiment is a modification of the first embodiment. In this embodiment, instead of providing the second electrostatic application apparatus 12 and the third electrostatic application apparatus 14, the black particles 62, dispersed in carrier fluid, and the white particles 64, dispersed in carrier fluid, are respectively sprayed on the first flat substrate 50*a* by a spraying unit 13, and then the carrier fluid is dried (or dehydrated) by a dryer 15 to attach the black particles 62 and the white particles 64 uniformly on the first flat substrate 50*a*, as shown in FIG. 7.

As a carrier fluid in which the black particles 62 and the white particles 64 are respectively dispersed, a highly volatile solution such as an isopropyl alcohol aqueous solution may be employed.

This method may also be applied to the second embodiment and the third embodiment. This method has an advantage in that a uniform layer of particles can be formed on the substrate in a simple manner. Other constructions are the same as in the first embodiment, and thus descriptions will not be given again.

(Fifth Embodiment)

Figure 8:
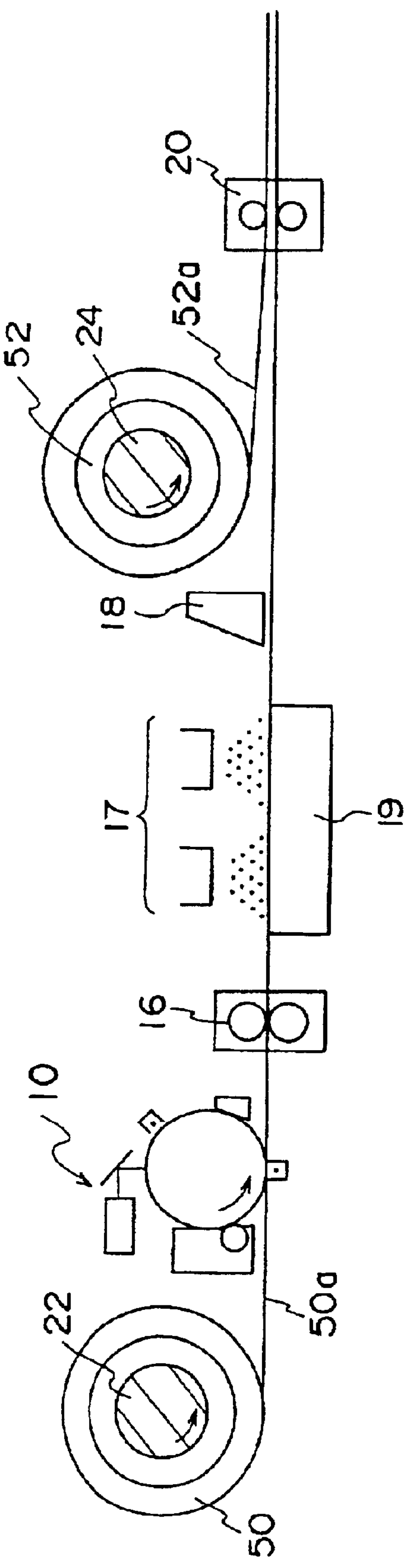
FIG. 8 is an explanatory drawing schematically showing a production line according to a fifth embodiment of the present invention.

The fifth embodiment is a modification of the first embodiment. In this embodiment, instead of the second electrostatic application apparatus 12 and the third electrostatic application apparatus 14, the black particles 62 and the white particles 64 are respectively sprayed on the first flat substrate 50*a* by a powder spray unit 17, and then the first flat substrate 50*a* is shaken by a shaker 19 to hold the black particles 62 and the white particles 64 uniformly on the first flat substrate 50*a*, as shown in FIG. 8. This method can be applied to the second embodiment and the third embodiment.

This method has an advantage in that a layer of particles can be uniformly formed on the substrate in a simple manner. Other constructions are the same as in the first embodiment, and thus descriptions will not be given again.

(Sixth Embodiment)

Figure 9:
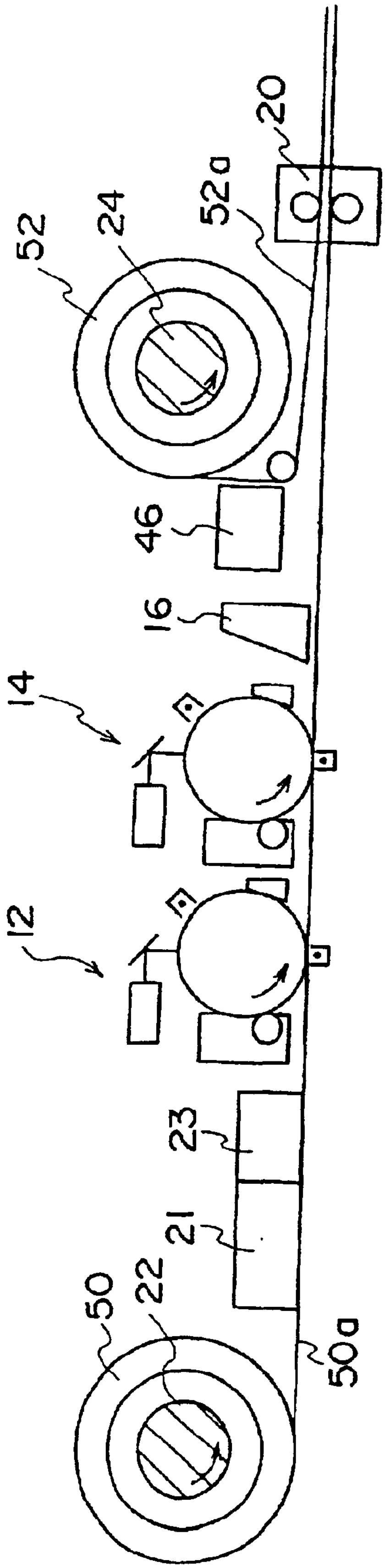
FIG. 9 is an explanatory drawing schematically showing a production line according to a sixth embodiment of the present invention.

The sixth embodiment is a modification of the first embodiment. As shown in FIG. 9, a screen printer 21 and a heater 23 are provided instead of the first electrostatic application apparatus 10.

The screen printer 21 prints, for example, a thermosetting epoxy resin containing dispersed therein insulative spacer particles of 100 μm in mean diameter onto the surface of the first flat substrate 50*a* in a grid pattern of 500 μm×500 μm unit cells.

The heater 23 is provided behind the screen printer 21, and heats the thermosetting epoxy resin including the spacer particles dispersed printed on the surface in the grid pattern, to cure the thermosetting epoxy resin. Consequently, the first flat substrate 50*a* is obtained provided with projecting spacers for keeping a distance from the second flat substrate 52*a* constant.

A thermosetting resin application apparatus 46 is provided for the second flat substrate 52*a* pulled from the second film roll 52. The thermosetting resin application apparatus 46 applies a thermosetting resin on the second flat substrate 52*a* on the side to which the first flat substrate 50*a* is to be adhered, to a thickness of, for example, about 10 μm.

Consequently, the thermosetting resin applied on the second flat substrate 52*a* is cured when it is heated by the second fixer 20, and thus the upper surfaces of the spacer particles 60 provided on the first flat substrate 50*a* and the second flat substrate 52*a* are fixed.

The spacer particles that can be used in the screen printer 21 are, for example, the insulative particles 54 of the crosslinking copolymer containing divinyl benzene as a major component, of 100 μm in mean diameter, that were used in the first embodiment. Though a thermosetting epoxy resin is used as the carrier fluid for the spacer particles in this embodiment, the carrier fluid is not limited thereto, and other types of thermosetting resin, or a stimulation-curable resin as described before, may also be used.

It is also possible to print, by the screen printer 21, the same spacer particles as those used in the first embodiment, dispersed in the carrier fluid. In this case, the thermosetting resin application apparatus 46 is not necessary.

This method of forming the spacer is not limited to the construction described in the first embodiment, but maybe used instead of the method in which the spacer particles are fixed directly on the first flat substrate 50*a* as in the second embodiment, the fourth embodiment, and the fifth embodiment.

(Seventh Embodiment)

Figure 10:
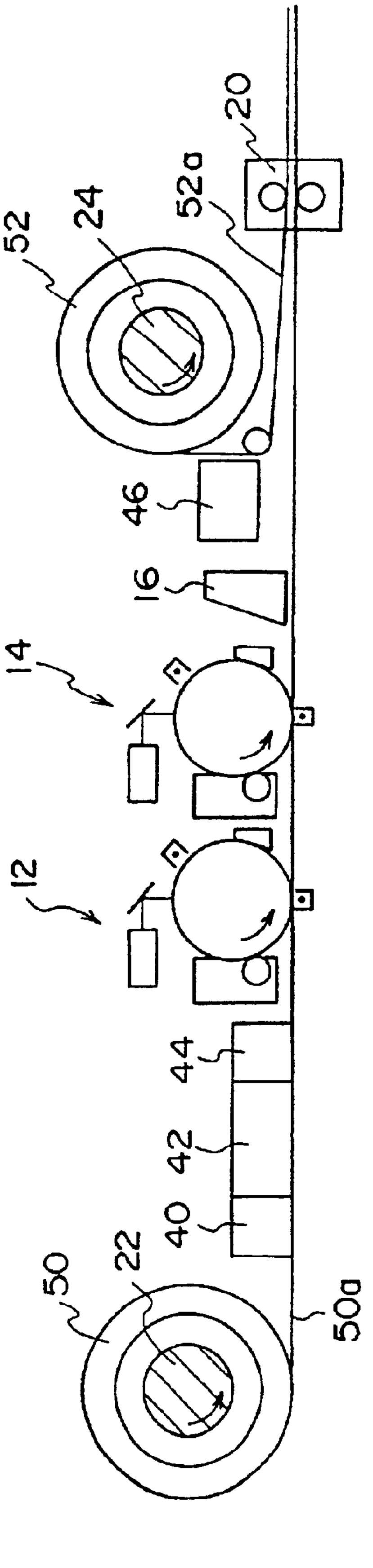
FIG. 10 is an explanatory drawing schematically showing a production line according to a seventh embodiment of the present invention.

The seventh embodiment is a modification of the sixth embodiment. As shown in FIG. 10, a UV-curable resin application apparatus 40, an exposing device 42, and an unexposed resin-removing unit 44 are provided instead of the screen printer 21 and heater 23.

That is, in the seventh embodiment, a layer of UV-curable resin is applied on the surface of the first flat substrate 50*a* by the UV-curable resin application apparatus 40 to a thickness of about 100 μm, and exposed by the exposing device 42 with ultraviolet (UV) rays into a grid pattern of 100 μm×100 μm unit cells defined by walls 10 μm in width.

Subsequently, the UV-curable resin in an unexposed area is removed by the unexposed resin-removing unit 44, and thus the first flat substrate 50*a* is obtained provided with a spacer in a grid pattern of 100 μm×100 μm unit cells.

Though the case where a UV-curable resin is used has been described for the seventh embodiment, another stimulation-curable resin such as an electron beam-curable resin may be used instead of the UV-curable resin.

This method of forming the spacer may be used instead of the method in which the spacer particles are fixed directly on the first flat substrate 50*a* as in the first embodiment, the second embodiment, the fourth embodiment, and the fifth embodiment, as well as the sixth embodiment, described above.

(Eighth Embodiment)

Figure 11:
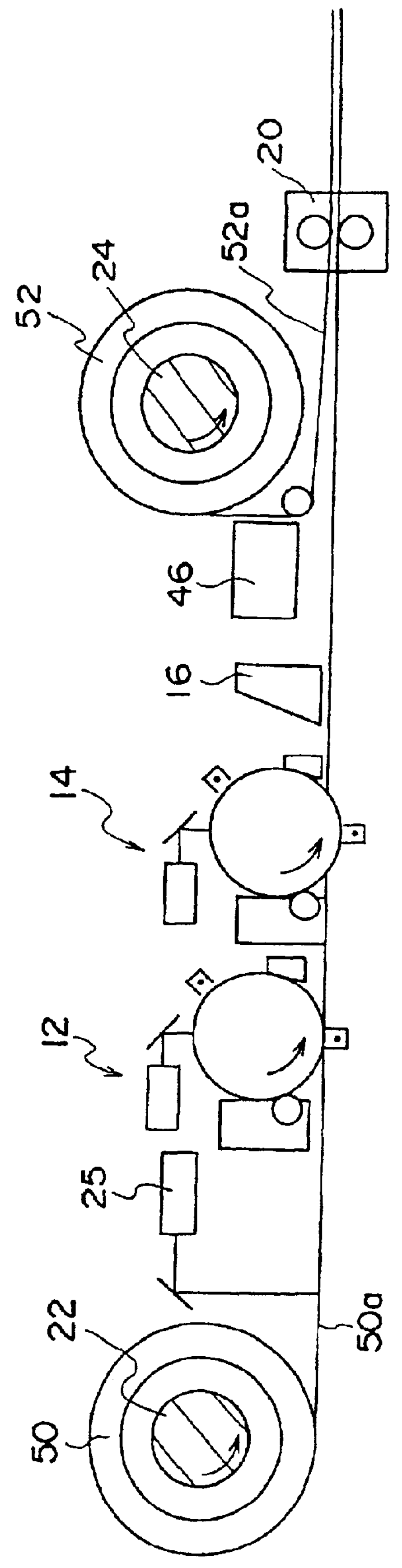
FIG. 11 is an explanatory drawing schematically showing a production line according to an eighth embodiment of the present invention.

The eighth embodiment is a modification of the sixth embodiment. As shown in FIG. 11, an abrasion unit 25 is provided instead of the screen printer 21 and the heater 23.

The abrasion unit 25 is provided with a UV laser, which performs abrasion on the surface of the first flat substrate 50*a* pulled out from the first film roll 50 to a depth of about 100 $\mu$m such that a grid pattern of 100 $\mu$m×100 $\mu$m unit cells remains, defined by walls 10 $\mu$m in width, for example.

Consequently, the first flat substrate 50*a* is obtained provided with a spacer in a grid pattern of 100 $\mu$m×100 $\mu$m unit cells on the surface thereof. According to this method, the spacer may be formed simply and accurately, which is advantageous.

In the eighth embodiment, the first flat substrate 50*a* to be used has a thickness taking the thickness of the spacer into consideration in advance, because the surface of the first flat substrate 50*a* will be scraped away by the UV laser. For example, a flat substrate formed of PET (polyethylene terephthalate), of 150 $\mu$m in thickness and wound into a roll may be used as the first film roll 50.

This method of forming the spacer may be used instead of a method in which the spacer particles are attached directly on the first flat substrate 50*a* as in the first embodiment, the second embodiment, the fourth embodiment, and the fifth embodiment, as well as the sixth embodiment.

(Ninth Embodiment)

The ninth embodiment is a modification of the sixth embodiment. In this embodiment, a flat substrate with spacers is wound into a roll and used as the first film roller 51.

Figure 12:
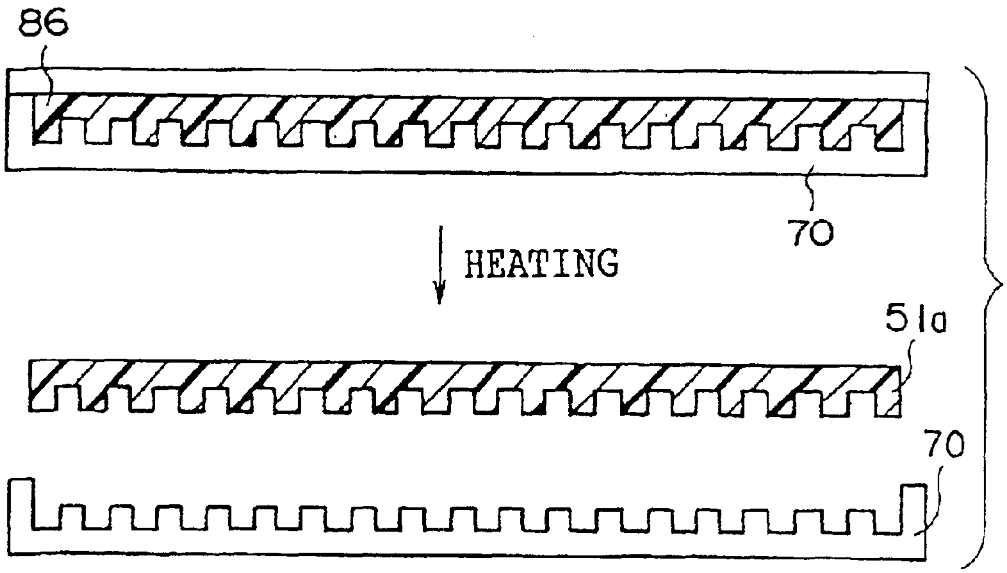
FIG. 12 is an explanatory drawing showing an example of a method of forming a flat substrate provided with a spacer.
Figure 13:
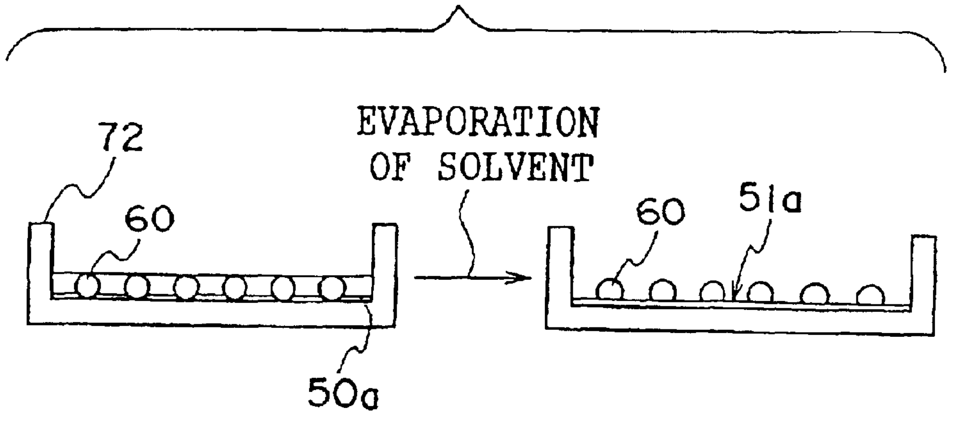
FIG. 13 is an explanatory drawing showing another example of a method of forming a flat substrate provided with a spacer.

The flat substrate with spacers may be formed by performing the steps of forming the spacer as in the first to eighth embodiments separately, or may be formed, for example, by fabricating a die 70 having a grid pattern of 100 $\mu$m depth, 10 $\mu$m interval, 100 $\mu$m×100 $\mu$m unit cells, as shown in FIG. 12 by a discharging process, pouring in a thermosetting resin or a stimulation-curable resin, and applying heat or stimulation to cure as shown in FIG. 12, or by filling a dispersion liquid containing spacer particles dispersed therein in an enclosure 72, which has the flat substrate 50*a* placed on the bottom thereof, and evaporating solvent, as shown in FIG. 13.

In this case, spacer particles formed with the layer of thermoplastic resin 56 (or a layer of stimulation-curable resin) on the surface of the insulative particles 54 described in the first embodiment may be used, and the spacer particles are fixed to the flat substrate by applying heat or an appropriate stimulus after the solvent has evaporated.

Figure 14:
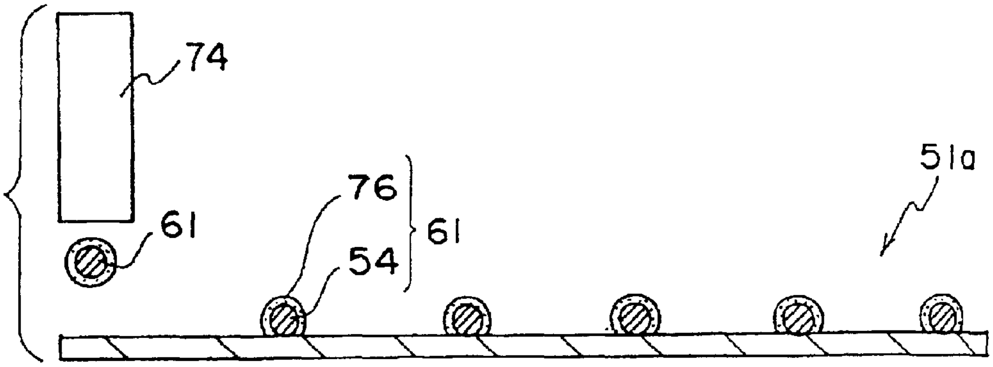
FIG. 14 is an explanatory drawing showing an example of a method of forming a flat substrate provided with a spacer by use of a liquid injection device.

Alternatively, as shown in FIG. 14, the flat substrate with spacers may be obtained by dispersing the insulative particles 54 described in the first embodiment in a medium containing an adhesive agent, and discharging the medium onto the flat substrate in a grid pattern by means of a liquid injection device such as an inkjet recording unit.

Figure 15:
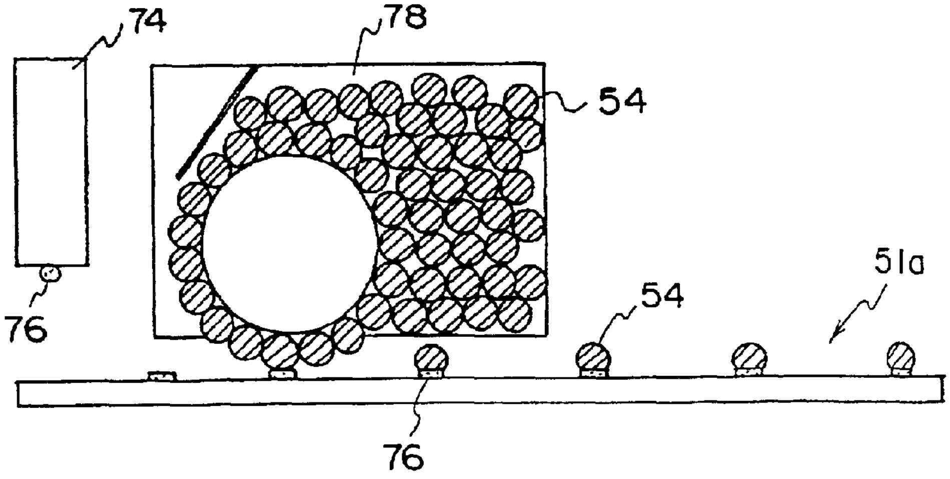
FIG. 15 is an explanatory drawing showing another example of a method of forming a flat substrate provided with a spacer by the use of a liquid injection device.

As another application, as shown in FIG. 15, the flat substrate with spacers may be obtained by discharging an adhesive agent onto the flat substrate in a grid pattern by means of a liquid injection unit such as an inkjet recording unit, and then supplying the insulative particles 54 to the flat substrate by a particle supplying device 78 so as to attach the insulative particles 54 on the adhesive agent.

Figure 16A:
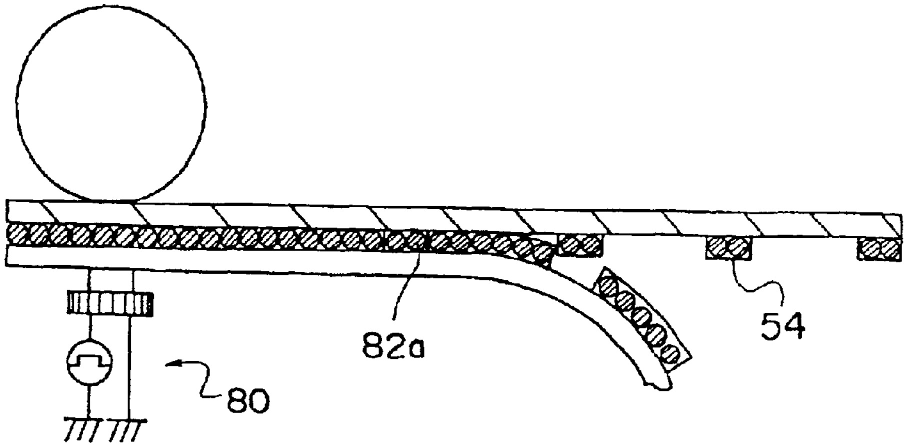
FIGS. 16A and 16B are explanatory drawings showing an example of a method of forming a flat substrate provided with a spacer by use of a thermal head.
Figure 16B:
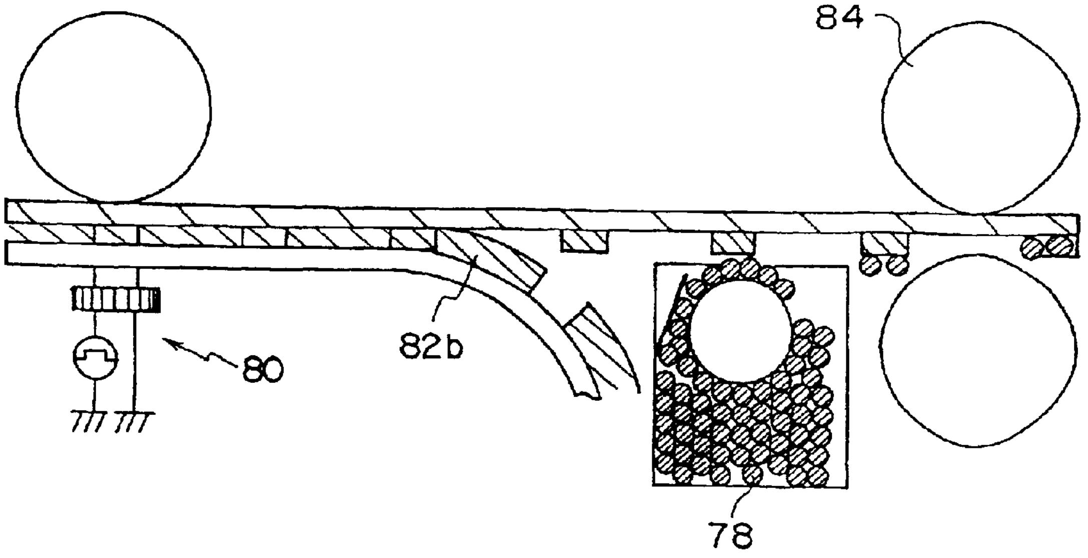

As still another application, as shown in FIG. 16A, the flat substrate with spacers may be obtained by softening a solid transfer material such as an ink ribbon 82, which has the insulative particles 54 dispersed thereon as described in the first embodiment, by a thermal head 80 and transferring the particles onto the flat substrate in a grid pattern or, as shown in FIG. 16B, the flat substrate with spacers may be formed by softening a solid transfer material such as the ink ribbon 82 by the thermal head 80 and transferring the material onto the flat substrate in a grid pattern, and then, before the ink is cured, supplying the insulative particles 54 to the flat substrate by the particle supplying device 78, and then pushing the insulative particles 54 attached on the ink pattern into the ink pattern by means of a pressurizing unit.

Figure 17:
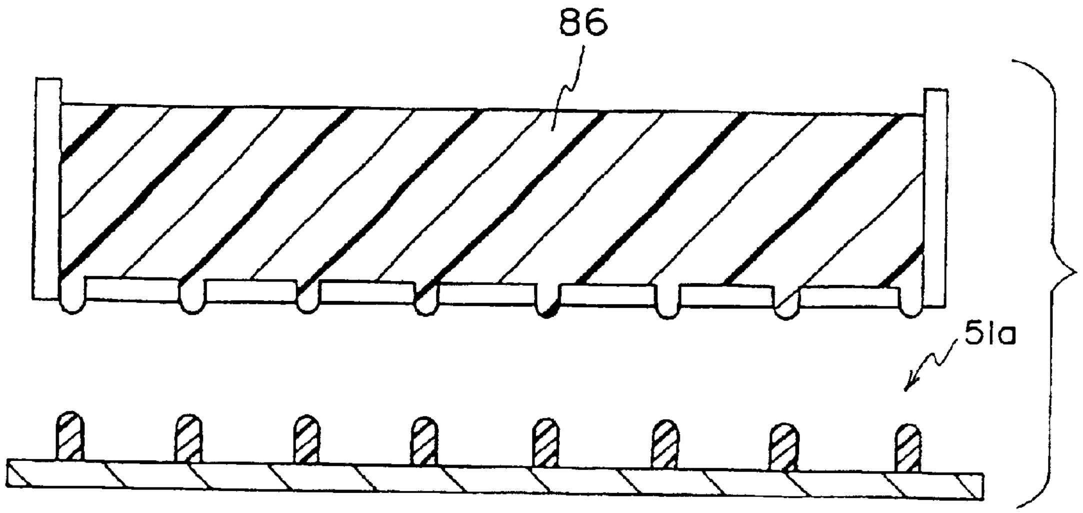
FIG. 17 is an explanatory drawing showing another example of a method of forming a flat substrate provided with a spacer.

As shown in FIG. 17, the flat substrate with spacers may be formed by dropping the fluid resin 86 (the same ones as described above may be used) onto the flat substrate into a grid pattern, and curing the same.

Figure 18A:
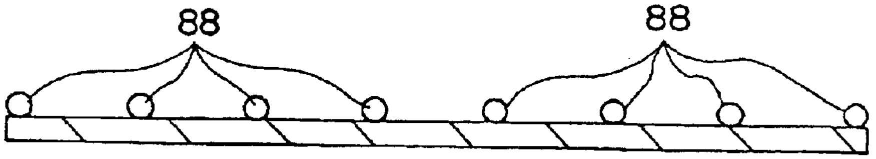
FIGS. 18A and 18B are explanatory drawings showing still another example of a method of forming a flat substrate provided with a spacer.
Figure 18B:
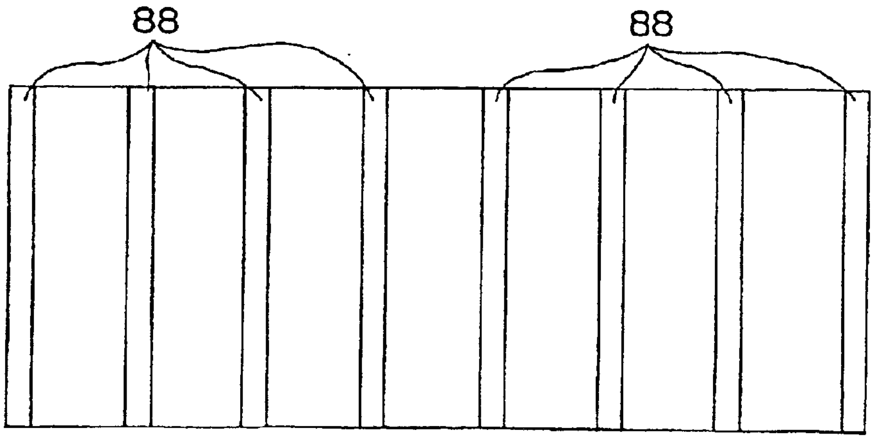

Alternatively, as shown in FIG. 18, the flat substrate with spacers may be formed by arranging rod-shaped spacer members each provided with a layer of thermoplastic resin or a layer of stimulation-curable resin, or rod-shaped spacer members formed of a thermoplastic resin or a stimulation-curable resin on the flat substrate in parallel, and fitting them onto the flat substrate by applying heat or an appropriate stimulus.

Figure 19:
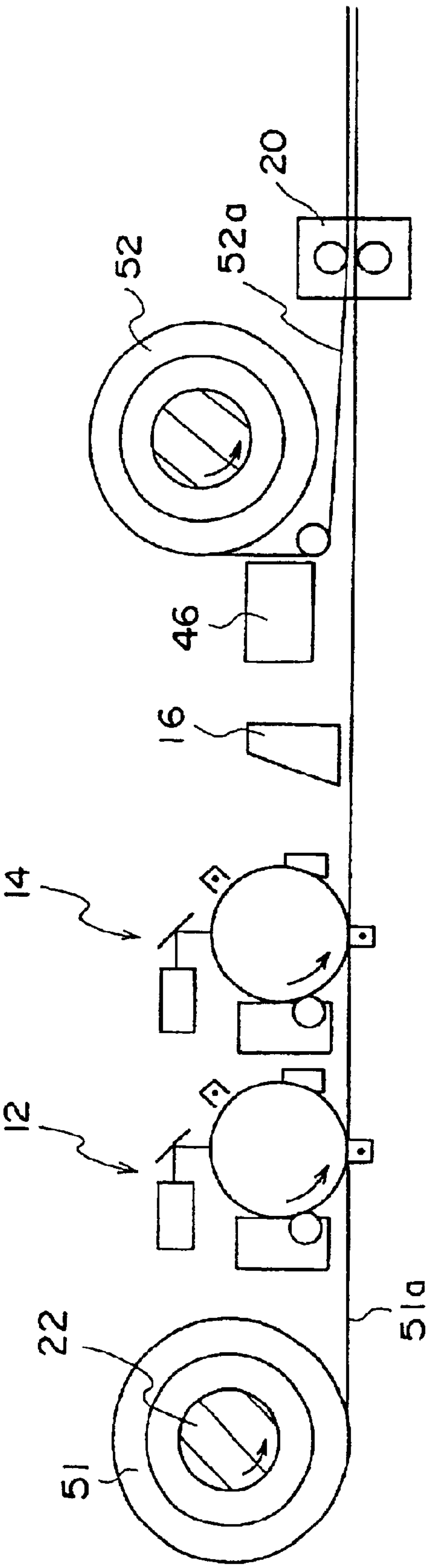
FIG. 19 is an explanatory drawing schematically showing a production line according to a ninth embodiment of the present invention.
Figure 20:
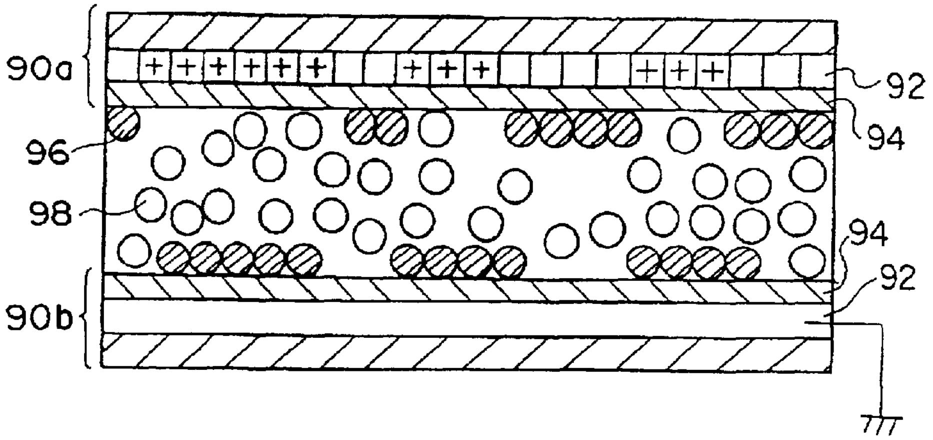
FIG. 20 is a cross sectional view showing a schematic construction of electronic paper of related art.

The flat substrate with spacers obtained in these ways is temporarily wound into a roll and set on the first roller holding shaft 22 in the line shown in FIG. 19.

This line has the same construction as the line shown in the first embodiment, except that the first electrostatic application apparatus 10 is removed. An image display medium with the powdered color material particles encapsulated uniformly between the opposing first flat substrate 51*a* and second flat substrate 52*a* may be formed by applying the black particles 62 and the white particles 64 uniformly on the surface, and adhering the second flat substrate 52*a* thereon as described earlier.

Though in the ninth embodiment the black particles 62 and the white particles 64 are supplied by the electrostatic recording method using an electrostatic recording apparatus, the construction is not particularly limited to the electrostatic recording method, and all the methods described earlier can be employed.

(Tenth Embodiment)

Figure 21:
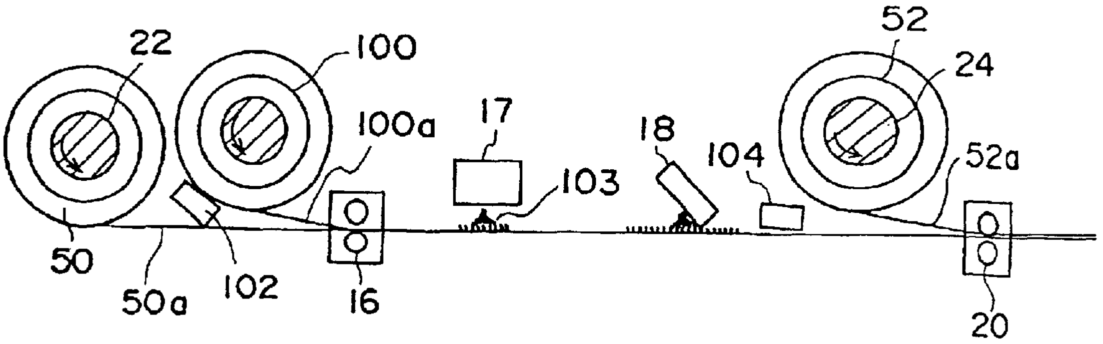
FIG. 21 is an explanatory drawing schematically showing a production line according to a tenth embodiment of the present invention.

The tenth embodiment is a modification of the fifth embodiment. In this embodiment, as shown in FIG. 21, a case where a mesh member 100*a* pulled out from a film roll 100 is adhered or bonded by heat fusion on the first flat substrate 50*a* to form a spacer instead of using the first electrostatic application apparatus 10 will be described.

In a first step, a transparent epoxy-based adhesive agent is applied on the first flat substrate 50*a* pulled out from the film roll 50 by a first adhesive agent application unit 102. Then, the mesh member 100*a* pulled out from the film roll 100 is adhered on the first flat substrate 50*a*. Subsequently, the adhesive agent is heated and thus cured by the first fixer 16, and then color material particles 103 are sprayed on the mesh member 100*a* by the powder spray unit 17.

The sprayed color material particles 103 are evened out uniformly by the blade 18, and applied on the mesh portion of the mesh member 100*a*. Concurrently, the color material particles 103 that are attached on a projected portion of the mesh member 100*a* are removed.

Subsequently, the second flat substrate 52*a* is pulled out from the film roll 52 and a transparent epoxy-based adhesive agent is applied by a second adhesive agent application unit 104. Then, the substrate 52*a* is superimposed on the first flat substrate 50*a* to encapsulate the color material particles 103, and heated by the second fixer 20 to cure the adhesive agent.

The color material particles employed here are insulative particles including white particles and black particles mixed and friction-charged by applying vibrations.

In addition, it is also possible, by applying AC voltage between upper and lower electrodes in advance, to liquidize and thus separate the color material particles 103 which are partly stuck and immobilized, so that application of the color material particles that is uniform and superior in mobility is realized.

With a substrate of such a construction, images can be displayed by applying the electric field and causing the color material particles 103 to attach thereon according to image data.

Figure 22:
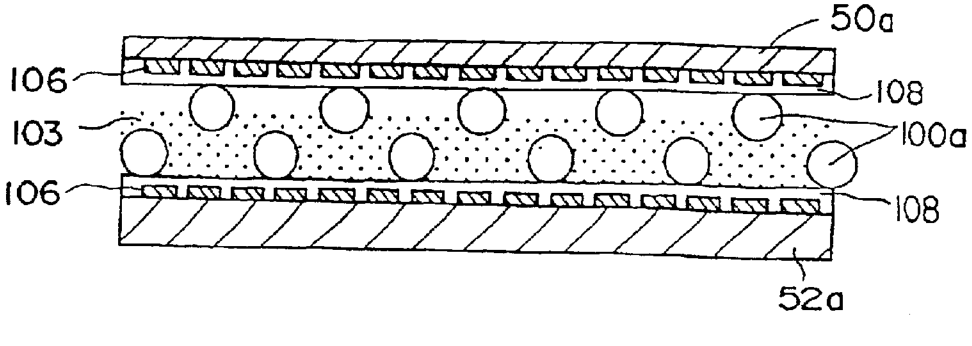
FIG. 22 is a cross sectional view showing a schematic construction of an image display medium according to the tenth embodiment of the present invention.

Alternatively, as shown in FIG. 22 for example, the first flat substrate 50*a*, having a glass plate provided with a plurality of ITO picture element electrodes 106 thereon, and the second flat substrate 52*a*, having a glass plate provided with a plurality of the ITO electrodes 106 over the whole surface thereof, may be combined. In this case, a substrate provided with an insulating layer 108 formed of a dielectric material on the surface of the ITO picture element electrode 106 can be used. Consequently, images can be displayed by applying the electric field from the side of a flat substrate provided with a plurality of the ITO picture element electrodes 106 to allow the color material particles 103 to attach according to image data.

In this way, by using the mesh material as a spacer, the cell construction can be produced in a simple manner. In addition, this enables application of the color material particles in a simple manner independent of electric properties of the particles and the like. It also enables the application of a plurality of particles mixed together.

(Eleventh Embodiment)

In the eleventh embodiment, a case where an electrode band is disposed on the substrate, a die is superimposed thereon, and a resin is injected between the substrate and the die and cured, so that the electrode is fixed and concurrently an insulative film is formed on the substrate will be described.

Figure 23A:
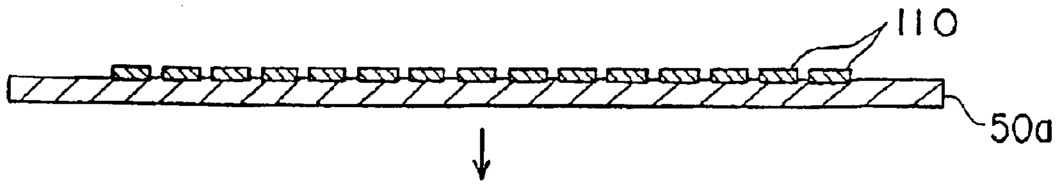
FIGS. 23A to 23D are cross sectional views showing a schematic construction of an image display medium according to an eleventh embodiment of the present invention.
Figure 23B:
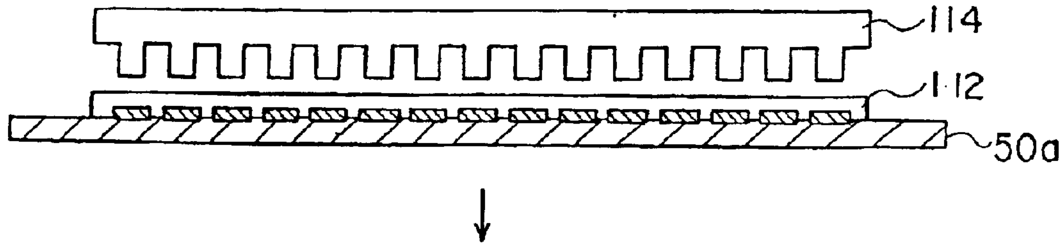

First, ITO evaporated PET film (Toray) strips 110 of 9 mm in width and 120 mm in length are placed at 1 mm intervals on the first flat substrate 50*a*, which is formed of an acryl substrate of 5 mm in thickness and 120 mm×120 mm in other dimensions, with the surface of the ITO faced upward as shown in FIG. 23A. Then, upper ends and lower ends of the PET film strips are respectively held, and a transparent epoxy-based adhesive agent 112 is applied on the arranged ITO as shown in FIG. 23B. Subsequently, the adhesive agent 112 is heated and cured, and holders on the upper ends and lower ends are removed, so that electrodes are obtained.

Figure 23C:
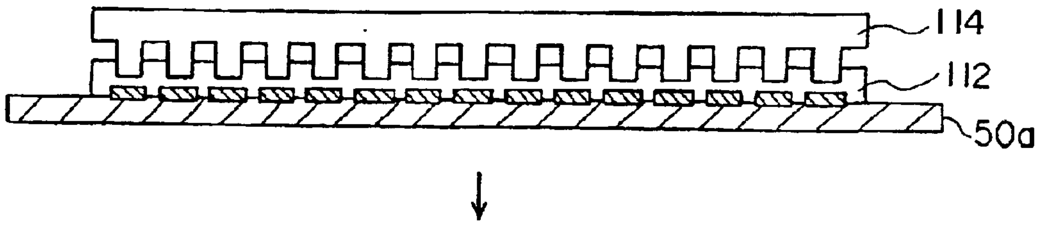
Figure 23D:
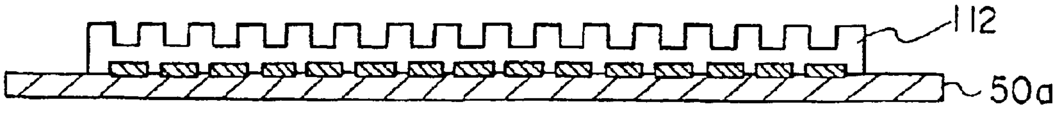

When the transparent epoxy-based adhesive agent 112 is applied on the substrate, a die 114 having given projections and recesses thereon is placed on the adhesive agent 112 as shown in FIG. 23C, so that a spacer having given projections and recesses as shown in FIG. 23D is formed by the transparent epoxy-based adhesive agent.

In the same manner, the ITO evaporated PET films 110 are placed also on the second flat substrate 52*a*, and the upper ends and lower ends of the PET films 110 are respectively held. Then the transparent epoxy-based adhesive agent 112 is applied on the arranged ITO, and subsequently is heated and cured, and the holders on the upper ends and the lower ends are removed, so that electrodes are obtained. Application of the color material particles 103 is performed in the same manner as in the tenth embodiment, and thus the description will not be given again. In this manner, a cell construction having a matrix of electrodes can be formed easily by using an adhesive agent. In addition, with a substrate in this construction, images can be displayed by applying the electric field and causing the color material particles 103 to attach thereon according to image data.

(Twelfth Embodiment)

In the twelfth embodiment, a dry screen application unit is used, and the color material particles alone in a state of powder bodies are applied by screen printing, by the use of a mesh and a blade. This enables application of the color material particles only on a required area by simultaneous use of a mask.

Figure 24:
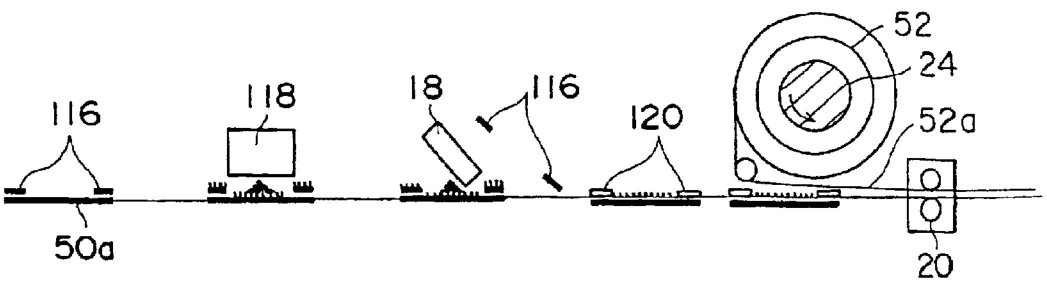
FIG. 24 is an explanatory drawing schematically showing a production line according to a twelfth embodiment of the present invention.

First, a desired electrode pattern is formed by etching on the first flat substrate 50*a* and the second flat substrate 52*a*, which are each formed of a glass plate with ITO electrodes evaporated thereon. Then, as shown in FIG. 24, a mask 116 is placed on the first flat substrate 50*a* so as to prevent the color material particles 103 from being applied on areas other than those required.

Then, the color material particles 103 are placed on the screen mesh by the dry screen application unit 118 and evened out by the blade 18 to apply the color material particles uniformly. Subsequently, the mask 116 is removed by a mask removing unit, not shown, and a spacer member 120 applied with an epoxy-based adhesive agent on both sides and the second flat substrate 52*a* are adhered thereon. Other constructions are the same as is the tenth embodiment, and thus descriptions will not be given again.

Figure 25:
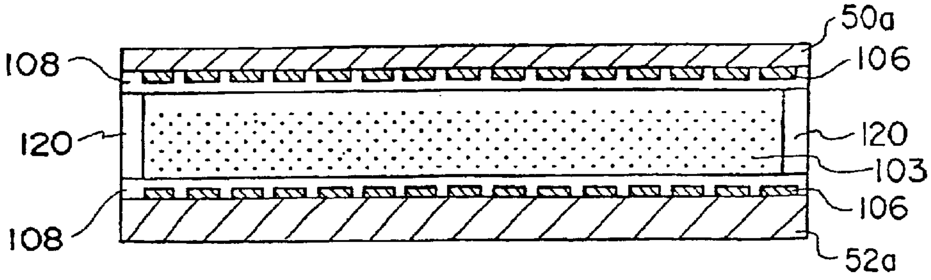
FIG. 25 is a cross sectional view showing a schematic construction of the image display medium according to the twelfth embodiment of the present invention.

The first flat substrate 50*a* and the second flat substrate 52*a* are flat substrates formed with a plurality of the ITO picture element electrodes 106 as shown in FIG. 25. In this case, a substrate provided with the insulating layer 108 formed of a dielectric material on the surface of the ITO electrodes 106 is used. Consequently, images can be displayed by applying the electric field from the side of a flat substrate provided with a plurality of ITO picture element electrodes and causing the color material particles to attach thereon according to image data.

In this way, the color material particles may be applied easily irrespective of electrical properties of the particles. Application with mixing a plurality of particles is also possible. In addition, by using the mask when applying the color material particles, the color material particles 103 are prevented from being applied in areas other than those required, and may be applied in the required areas only.

(Thirteenth Embodiment)

Figure 26:
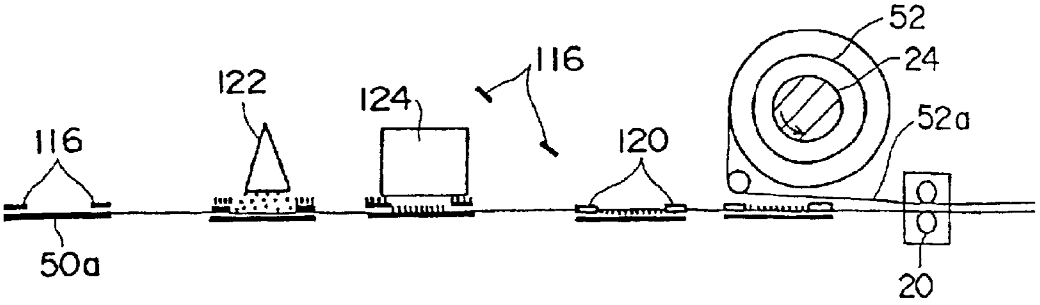
FIG. 26 is an explanatory drawing schematically showing a production line according to a thirteenth embodiment of the present invention.

The thirteenth embodiment is a modification of the twelfth embodiment. As shown in FIG. 26, a spray application unit (wet type) 122 is provided instead of the dry screen application unit 118.

The spray application unit 122 applies the color material particles 103, dispersed in a carrier fluid, by spraying. Subsequently, the fluid is heated at 100° C. for half an hour by a vacuum dryer 124 to evaporate the carrier fluid completely, and the mask 116 is removed by the mask removing unit, not shown. After the spacer member 120 applied with an epoxy-based adhesive agent on both sides has been placed, the second flat substrate 52*a* is adhered. Other constructions are the same as in the twelfth embodiment, and thus descriptions will not be given again.

(Fourteenth Embodiment)

Figure 27:
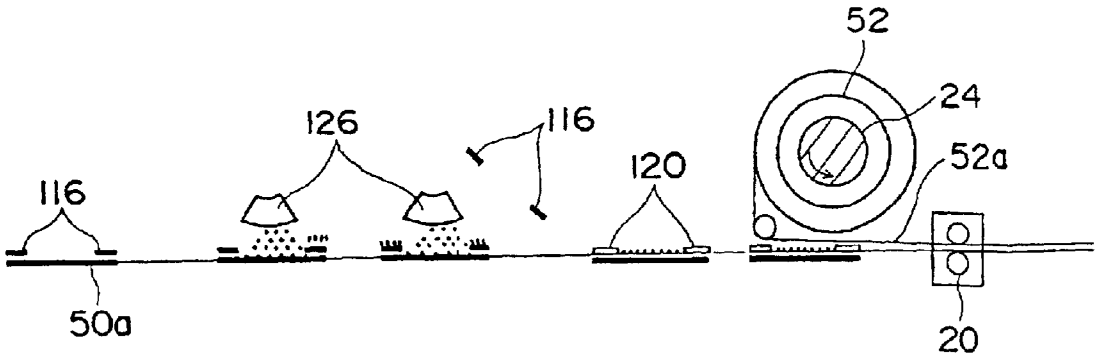
FIG. 27 is an explanatory drawing schematically showing a production line according to a fourteenth embodiment of the present invention.

The fourteenth embodiment is a modification of the thirteenth embodiment. As shown in FIG. 27, powder spray application units (dry type) 126 are provided instead of the spray application unit (wet type) 122, and the color material particles of white and black are suspended on air currents in closed spaces respectively by spraying, and then allowed to fall on the substrate.

In this way, by allowing the color material particles to suspend and fall, the particles can be applied uniformly on the substrate. The amount of application can be controlled accurately by adjusting a falling time. Other constructions are the same as in the thirteenth embodiment, and descriptions thereof need not be repeated.

(Fifteenth Embodiment)

Figure 28:
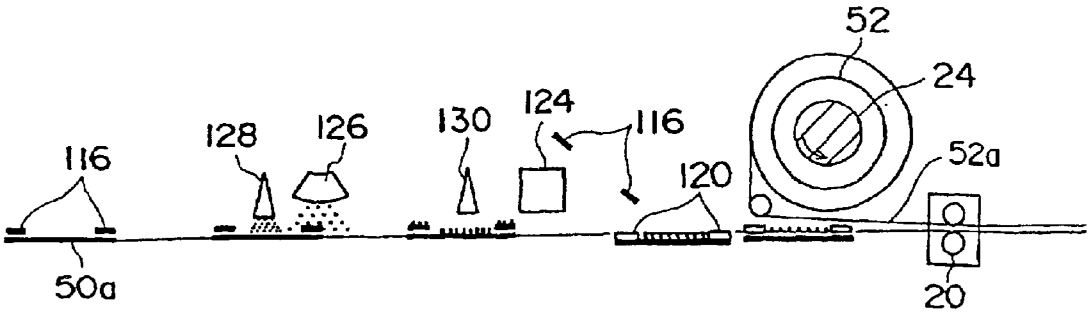
FIG. 28 is an explanatory drawing schematically showing a production line according to a fifteenth embodiment of the present invention.

The fifteenth embodiment is a modification of the fourteenth embodiment. As shown in FIG. 28, a liquid application unit 128 for applying a volatile solvent is provided such that the volatile solvent is applied in advance by the liquid application unit 128. Then, the white and black color material particles are respectively applied by the powder spray unit 126 to adhere them on areas where the volatile liquid is applied. Subsequently, excess color material particles are removed by blowing air with an air blowing unit 130. Then, after the volatile liquid has been heated by the vacuum dryer 124 at 100° C. for half an hour to evaporate it completely, the spacer member 120 applied with an epoxy-based adhesive agent on both sides and the second flat substrate 52*a* are adhered.

Figure 29:
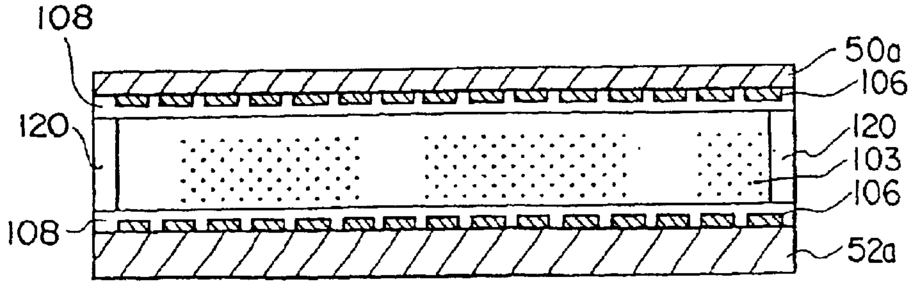
FIG. 29 is a cross sectional view showing a schematic construction of an image display medium according to the fifteenth embodiment of the present invention.

In this manner, in dry spray application, the color material particles can be applied in given patterns by forming a pattern on the first flat-shaped substrate 50*a* with the volatile solvent in advance, applying the color material particles 103 by spraying, blowing the excess color material particles by air, and then drying the volatile solvent. Consequently, the substrate shown in FIG. 29 is obtained. Other constructions are the same as in the fourteenth embodiment, and descriptions will not be repeated.

(Sixteenth Embodiment)

Figure 30:
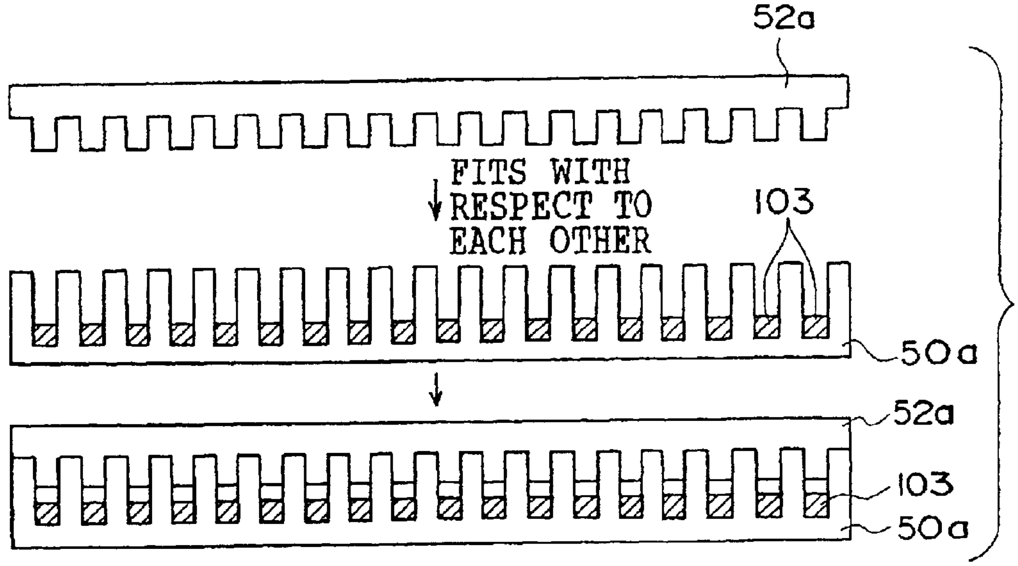
FIG. 30 is a cross sectional view showing a schematic construction of an image display medium according to a sixteenth embodiment of the present invention.

In the sixteenth embodiment, the first flat substrate 50*a* and the second flat substrate 52*a* are configured so that they can be fitted with each other as shown in FIG. 30. This is fabricated as follows.

In a first step, the first flat substrate 50*a*, of acryl plate, is formed with a given concavo-convex pattern by a cutting tool, and the second flat substrate 52*a* is formed with a concavo-convex pattern that can be fitted with the concavo-convex pattern on the first flat substrate 50*a*, by a cutting tool. In other words, the concavo-convex patterns are formed such that projections on the first flat substrate 50*a* are fitted in recesses on the second flat substrate 52*a* and recesses on the first flat substrate 50*a* are fitted with projections on the second flat substrate 52*a*. The concavo-convex patterns may be formed not only by cutting, but also by molding, UV curing, laser abrasion or the like.

In the next step, the color material particles 103 are sprayed on the concavo-convex pattern on the first flat substrate 50*a*. The sprayed color material particles 103 are evened out uniformly by a squeegee, and applied in the recesses of the concavo-convex pattern as shown in FIG. 30. Then, the concavo-convex pattern on the first substrate and the concavo-convex pattern on the second substrate are superimposed as shown in FIG. 30.

As described above, by engaging the first flat substrate 50*a* and the second flat substrate 52*a*, an image display medium can be manufactured in a simple manner without a step of adhesion or the like.

(Seventeenth Embodiment)

Figure 31A:
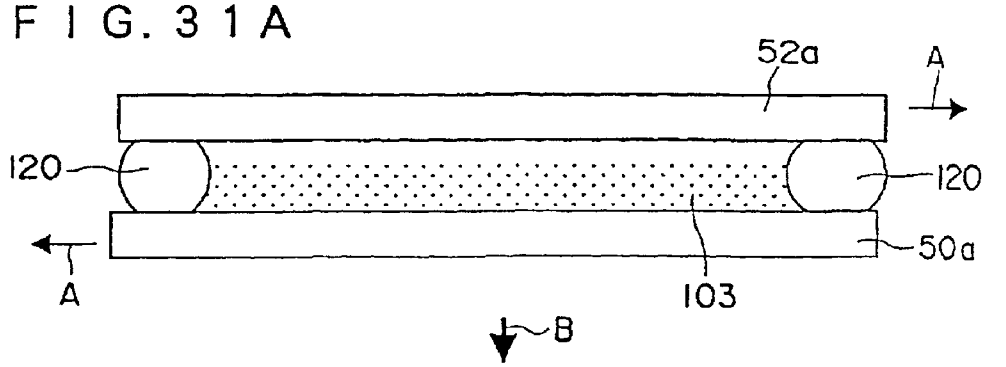
FIGS. 31A and 31B are cross sectional views showing a schematic construction of an image display medium according to a seventeenth embodiment of the present invention.
Figure 32A:
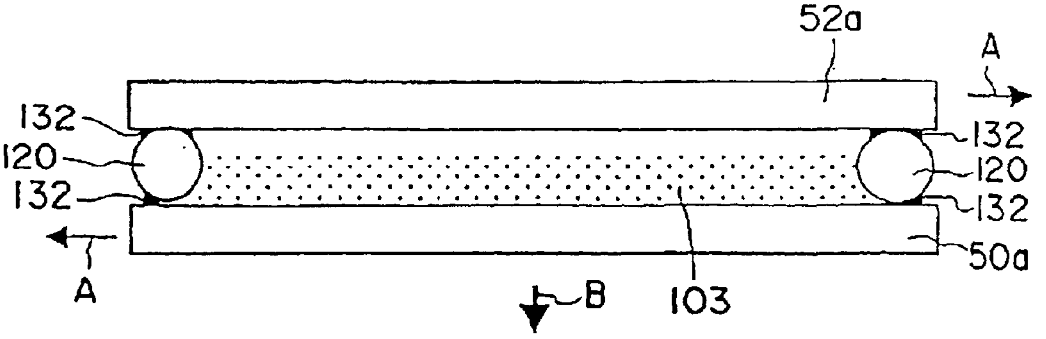
FIGS. 32A and 32B are cross sectional views showing a schematic construction of the image display medium according to the seventeenth embodiment of the present invention.

In the seventeenth embodiment, a resilient material is used as the spacer member 120 as shown in FIG. 31A, or a resilient material is used as an adhesive agent 132 for the spacer as shown in FIG. 32A.

Figure 31B:
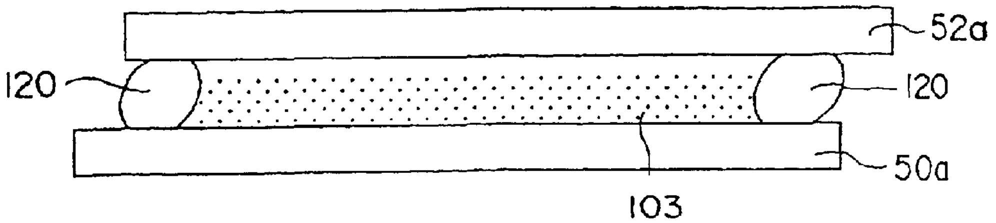

Using a resilient material as the spacer member 120 allows the spacer member 120 to expand and contract even in the case where a force is exerted laterally (in direction A in the figure) as shown in FIG. 31A, and in the case where a force is exerted vertically (in the direction B in the figure) as shown in FIG. 31B, and thus prevents adhesion from being separated.

Figure 32B:
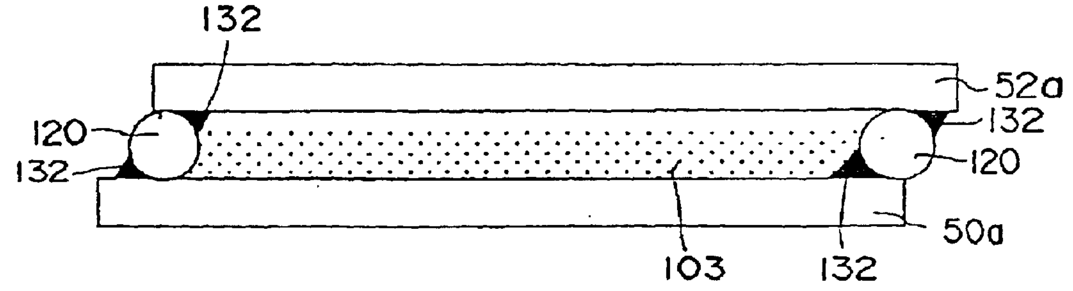

In the same manner, using a resilient material as the adhesive agent 132 for the spacer allows the adhesive agent 132 to expand and compress even in the case where a force is exerted laterally as shown in FIG. 32A and in a case where a force is exerted vertically as shown in FIG. 32B, and thus prevents adhesion from being separated.

Conductive particles and insulative particles can be used in all the embodiments described so far. The conductive particles can move electric charge by contact with the substrate, and have an advantage in that they can stably hold electric charge. Therefore, using the conductive particles preferably improves the stability of the particles in repetitive use. The insulative particles can be driven by applying an electric field and have an electric charge distribution given by friction charging of a single type of particles or a plurality of types of particles having different properties.

Materials having a capability of moving electric charge by contact with the substrate include, for example, carbon black and metal particles such as nickel, silver, gold, tin, and particles that are coated by these materials on the surface thereof or that contain these materials.

More specifically, spherical conductive particles applied with electroless nickel-plating on the surface of fine particles of a crosslinking copolymer containing divinyl benzene as a main proportions (Micropearl NI (Trade name); Sekisui Chemical Co., Ltd.), and the spherical conductive particles applied with gold substitution plating thereafter (Micropearl AU (Trade name); Sekisui Chemical Co., Ltd.) are included.

Spherical conductive particles of amorphous carbon obtained by carbonizing calcination of a thermosetting phenol resin (UniveksGCP, H-type (Trade name); UNITICA LTD.: volume specific resistance$\leqq 10^{-2}$ Ω·cm) spherical conductive particles coated with metal such as gold or silver (Univeks GCP conductive particles (Trade name); UNITIKA LTD.: volume specific resistance $\leqq 10^{-4}$ Ω·cm), spherical conductive particles obtained by coating silver (Ag) and tin oxide on the surface of fine particles of spherical oxides of silica, alumina (Admafine (Trade name): Admatechs), or particles obtained by attaching or mounting conductive fine powder on the surface of mother particles formed of various materials such as styrene, acryl, phenol resin, silicone resin, or glass can be mentioned.

The insulative particles are not limited to the types described above, and the following materials may be used. In the embodiments described later, the following materials may be used as well.

Insulative white particles include spherical fine particles of crosslinking polymethyl-methacrylate containing titanium oxide (MBX-white from Sekisui Plastics Co., Ltd.), spherical fine particles of crosslinking polymethyl-methacrylate (Chemisnow MX from Soken Chemical &

Engineering Co., Ltd.), fine particles of polytetrafluoroethylene (Lubron L from Daikin Industries Ltd., SST-2 from Shamrock Technologies Inc.), fine particles of fluorocarbon (CF-100 from Nippon Carbon Co., Ltd.; CFGL and CFGM from Daikin Industries Ltd.), fine particles of silicone resin (Tospearl from Toshiba Silicone), fine particles of polyester-containing titanium oxide (Biryusia PL 1000 white T from NIPPON PAINT Co., Ltd.), fine particles of polyester-acryl-containing titanium oxide (KONAC No.1800 White from NOF CORPORATION), and spherical fine particles of silica (HIPRESICA from Ube-Nitto Kasei Co., Ltd.).

Insulative black particles include spherical particles of crosslinking copolymer containing divinyl benzene as a major component (Micropearl BB and Micropearl BBP from Sekisui Chemical Co., Ltd.), and spherical fine particles of crosslinking polymethyl-methacrylate (MBX-black from Sekisui Plastics Co., Ltd.), and the conductive black particles can include fine particles of amorphous carbon obtained by calcining the phenol resin particles (Univeks GCP from UNITICA LTD), and spherical fine particles of carbon and graphite (NICA beads ICB, NICA beads MC and NICA beads PC from Nippon Carbon Co., Ltd.).

(Eighteenth Embodiment)

In the eighteenth embodiment, the particles are attached on the surface of the substrate by electrostatic adherence by use of an electric field. Components identical with those in the embodiments described above are designated by identical reference numerals, and detailed descriptions are not given.

Figure 33A:
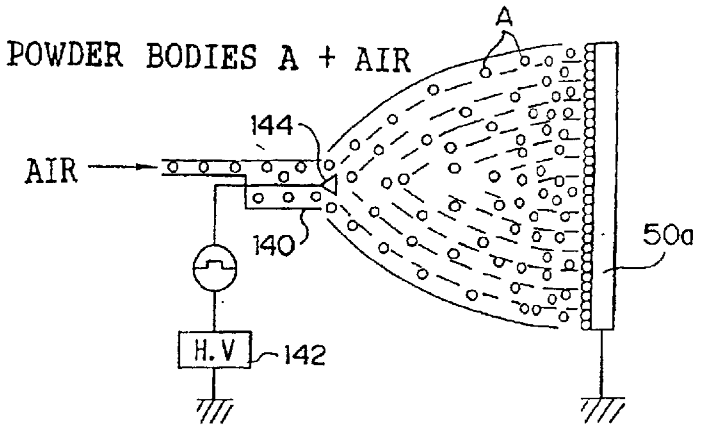
FIGS. 33A and 33B are explanatory drawings showing a method of supplying particles to a substrate according to a eighteenth embodiment of the present invention.

The eighteenth embodiment includes an electrostatic painting gun 140 as shown in FIG. 33A. The electrostatic painting gun 140 is connected to a high-voltage generator 142.

For the first flat substrate 50*a*, if the first flat substrate 50*a* has been provided with an electrode such as an ITO electrode or the like, the electrode is grounded. If the first flat substrate 50*a* has not been provided with an electrode, a grounded back plate, not shown, is set to the back side of the first flat substrate 50*a*.

Then, for example, powder bodies A formed of white particles are supplied in air into the electrostatic painting gun 140. A high voltage (several volts to several kilovolts) is applied to an electrode 144 by the high-voltage generator 142 to form a corona discharge area from the electrode 144 toward the first flat substrate 50*a*. Consequently, the powder bodies A flown from the electrostatic paint gun 140 are charged when passing through the corona discharge area, and fly along an electrostatic field formed between the electrode 144 and the first flat substrate 50*a*, and finally attach to the first flat substrate 50*a*. Concurrently, the amount of the powder bodies A supplied into the electrostatic painting gun 140, the time period of application of the high voltage to the electrode 142, the strength of the electric field, and so on are controlled to form a uniform layer of the powder bodies A, consisting of from several layers to several tens of layers, on the first flat substrate 50*a*. The amount of the particles attached may be controlled by controlling the distance from the substrate and the spraying conditions of the particles.

When, for example, MBX20-white (Sekisui Plastics Co., Ltd.) was used as the powder body A at a flow rate of 0.03 m/sec, about 5 layers of particles of the powder bodies A were formed on the first flat substrate 50*a*.

In the same manner, an image display medium can be formed by forming a layer of powder bodies formed of the black particles on the second flat substrate 52*a*, and adhering it with the first flat substrate 50*a*. The direction of the electric field may be switched according to charging polarity of the powder bodies.

Figure 33B:
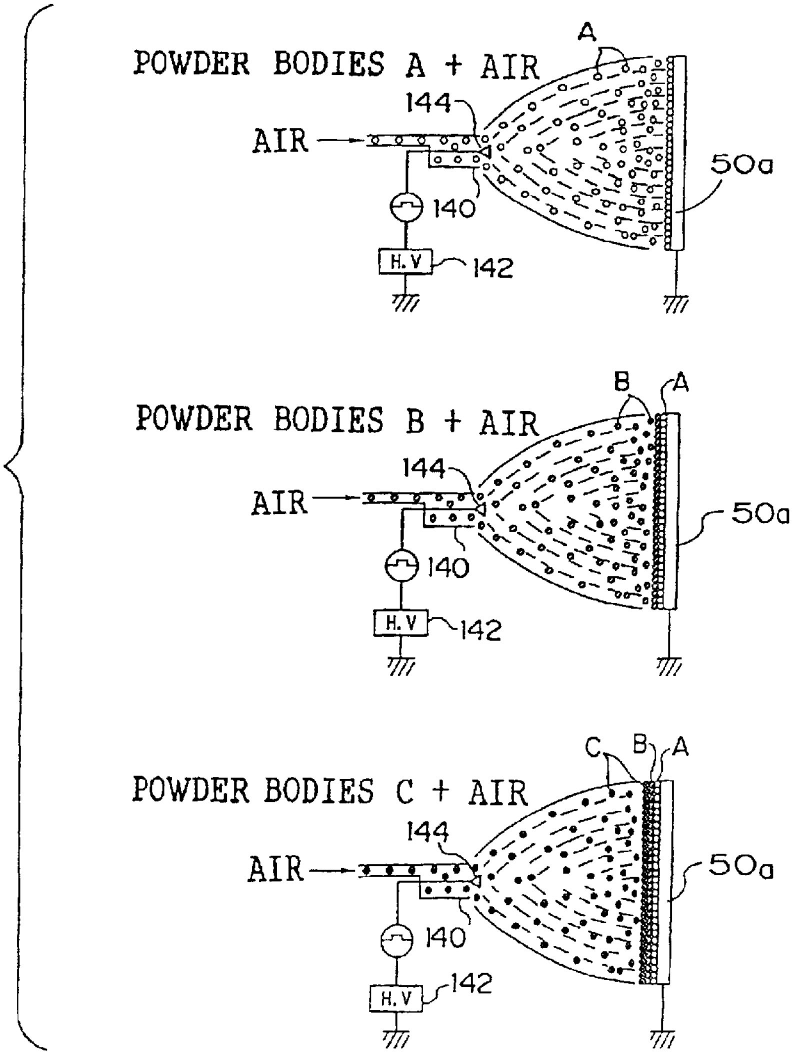

In order to form a plurality of types of the powder bodies on the first flat substrate 50*a*, as shown in FIG. 33B, electrostatic painting guns 140A, 140B, and 140C for supplying, for example, powder bodies A, B, and C that differ from each other are provided, and layers of the powder bodies A, B, and C, including from several to several tens of uniform layers respectively, are formed on the first flat substrate 50*a* in sequence by controlling the respective amounts of the powder bodies to be supplied into the nozzle of the electrostatic painting guns 140, the time period of application of high voltage to the electrode 144, the strength of the electric field and so on.

When a plurality of types of particle groups that differ in charging polarity from each other are supplied to one of the substrates, the particles supplied first may become detached. Therefore, preferably, each particle group is supplied to the substrate separately, and these substrates are adhered with each other. Supplying each particle group onto the substrate separately enables concurrent control of particle ratios, whereby efficiency of a manufacturing process is improved.

When divided electrodes are formed on the substrate side, the electric field may be selectively formed for each electrode, and the particles may be selectively encapsulated in each of predetermined sections. For example, color material particles of R(red), G(green), B (blue), Y(yellow), M(magenta), and C(cyan) may be respectively encapsulated in the predetermined sections to realize a color display.

It is also possible to attach the spacer particles on the substrate by the electrostatic painting gun 140, before or after formation of the particles, or to mix the particles with the spacer particles and attach the spacer particles to the substrate together with the particles by the electrostatic painting gun 140.

(Nineteenth Embodiment)

The nineteenth embodiment is a modification of the eighteenth embodiment. Components identical to the embodiment described above are designated with identical reference numerals and detailed descriptions thereof will not be given.

Figure 34A:
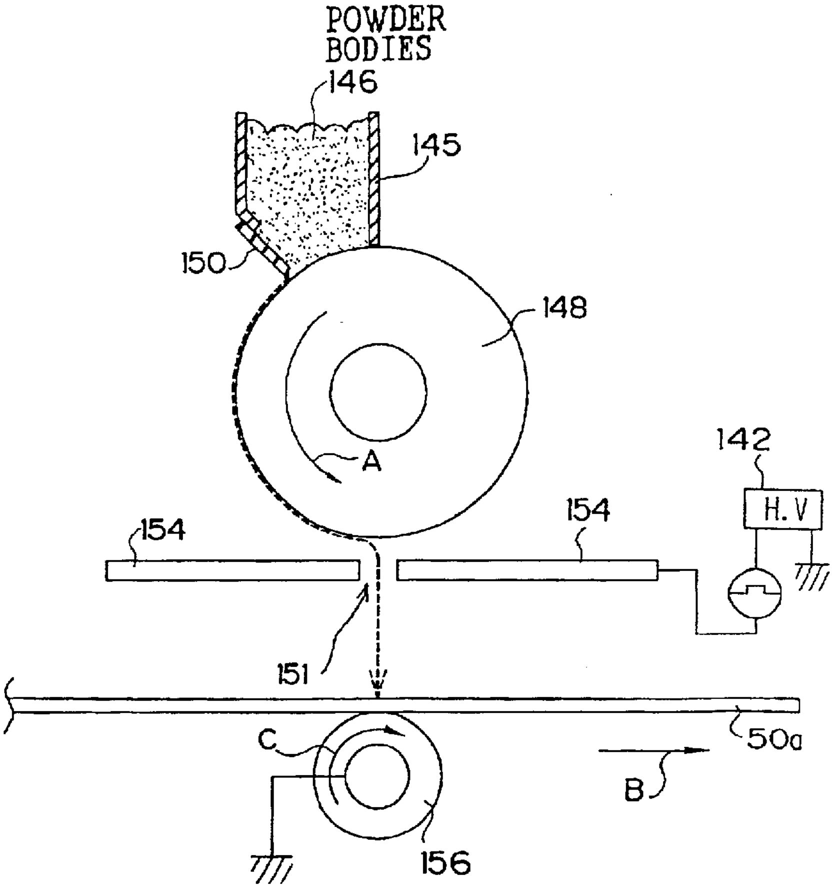
FIGS. 34A and 34B are explanatory drawings showing a method of supplying particles to a substrate according to a nineteenth embodiment of the present invention.

In the nineteenth embodiment, as shown in FIG. 34A, a toner jet unit including a carrier roll 148 for carrying powder bodies 146, for example, of white particles, stored in an enclosure 145 is provided. A charger that is not shown in the figure is disposed at the periphery of the carrier roll 148 and the charger charges the carrier roll 148. Control electrodes 154 having an aperture 151 substantially at the center thereof are provided below the carrier roll 148, and each electrode is connected to the high-voltage generator 142.

The powder bodies 146 are carried on the carrier roll 148, which rotates in the direction shown by the arrow A in the figure, and are charged, with an amount to be supplied being controlled by a blade 150. Then, a high voltage (several hundreds of volts to several tens of kilovolts) is applied to the control electrodes 154 by the high-voltage generator 142, and the voltage and time period of application to the control electrode 154 are controlled such that the powder bodies 146 are caused to fly toward the first flat substrate 50*a*, which is being carried in the direction shown by the arrow B in the figure by a carrier roller 156 which is grounded and rotated in the direction shown by the arrow C in the figure.

In the same manner, a picture display medium can be formed by forming a layer of powder body particles, for example, of black particles, on the second flat substrate 52*a* and adhering it with the first flat substrate 50*a*. The direction of the electric field may be switched according to charging polarity of the powder bodies. It is also possible to form a layer of white particles on the first flat substrate 50*a*, and then a layer of black particle thereon, and adhere the same with the second flat substrate 52*a*. Alternatively it is also applicable to form a layer of the powder body particles in which the white particles and the black particles are mixed on the first flat substrate 50*a*, and then adhere with the second flat substrate 52*a*.

Figure 34B:
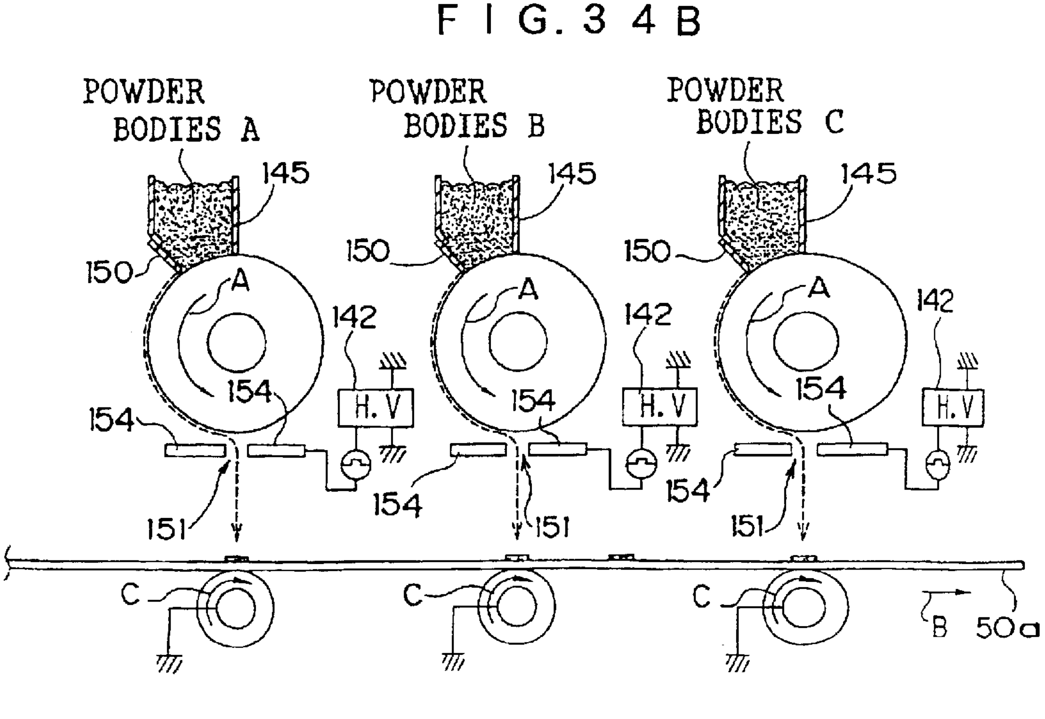

A plurality of the toner jet units shown in FIG. 34A may be provided in order to form layers of a plurality of powder body particles separately on the first flat substrate 50*a*. For example, as shown in FIG. 34B, toner jet units for supplying the powder bodies of a plurality of different types A, B, and C may be arranged in the direction of travel B of the first flat substrate 50*a*. In the same manner, the toner jet units for different types of the powder bodies may be arranged side by side for selectively supplying the powder bodies to the substrate.

The diameter of the aperture 151 is, for example, approximately 50 to 100 μm.

The amount of the particles to be supplied may be controlled by controlling the amplitude of the voltage applied to the control electrode 154, the time period of voltage application, and the traveling speed of the first flat substrate 50*a*, for example by turning the voltage application on and off every given period of time. Alternatively, the amount of particles to be supplied may be controlled by varying the diameter of the aperture.

It is also possible to provide a plurality of the apertures 151 and the control electrodes 154. In this case, the powder bodies 146 can be supplied to desired positions on the first flat substrate 50*a* by selecting electrodes to be applied with voltage as needed. In this case, the resolution of each aperture (intervals of arrangement) is approximately 150 to 300 dpi.

The particles may be selectively supplied only to predetermined cells by providing a plurality of the apertures 151 on the control electrodes 154 and determining configurations and intervals of arrangement of the apertures 151 as for the predetermined cells.

(Twentieth Embodiment)

According to the twentieth embodiment, the particles are distributed uniformly on the substrate by supplying the particles onto the substrate dispersingly by a gas. Component identical with those in the embodiment described above are designated by identical reference numerals, and detailed descriptions thereof are not given.

Figure 35A:
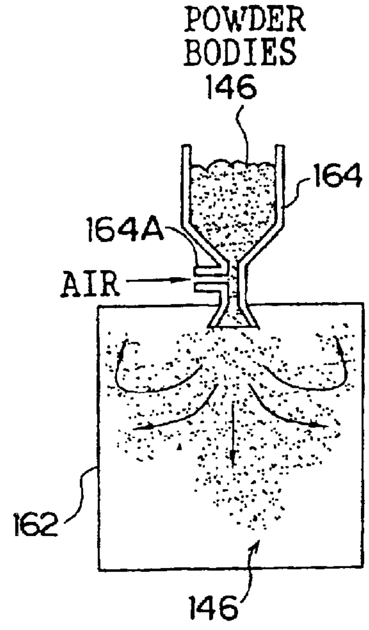
FIGS. 35A to 35E are explanatory drawings showing a method of supplying particles to a substrate according to a twentieth embodiment of the present invention.

The twentieth embodiment features a sealed container 162 provided with a spray gun 164 containing the powder bodies 146, for example, white particles, in an upper portion thereof, as shown in FIG. 35A. The spray gun 164 is provided with an air inlet 164A.

Figure 35B:
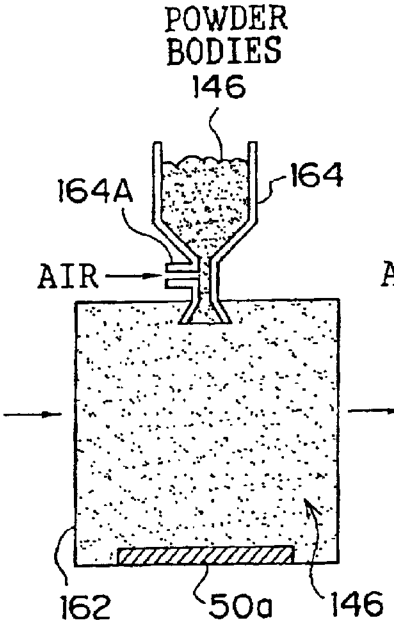
Figure 35C:
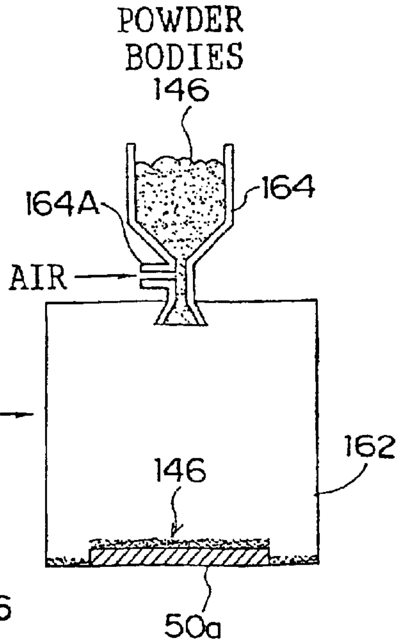

As shown in FIG. 35A, a mixing gas mixed with the powder bodies 146 is injected uniformly into the sealed container 162 by feeding air into the spray gun 164 through the air inlet 164A. Then, as shown in FIG. 35B, the first flat substrate 50*a* is placed in the sealed container 162 containing the uniformly suspended powder bodies 146 with a side to which the particles are to be supplied faced upward. Accordingly, as shown in FIG. 35C, the powder bodies 146 settle by gravitation and accumulate uniformly on the first flat substrate 50*a* over time.

The amount of the powder bodies 146 supplied on the first flat substrate 50*a* may be controlled by controlling a settling and accumulating time period, a time period during which the first flat substrate 50*a* is left to stand, a flow rate of air, or an amount of air to be supplied.

In the same manner, an image display medium can be formed by forming a layer of powder body particles, for example, black particles, on the second flat substrate 52*a*, and adhering it with the first flat substrate 50*a*. It is also possible to form a layer of white particles on the first flat substrate 50*a* and then a layer of black particles thereon, and adhere the same with the second flat substrate 52*a*. It is also possible to form a layer of powder body particles containing white particles and black particles mixed together on the flat substrate 50*a* and adhere the second flat substrate 52*a* thereon.

Figure 35D:
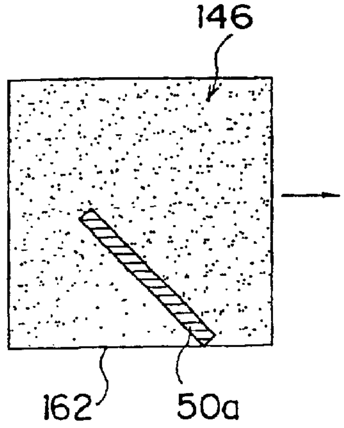
Figure 35E:
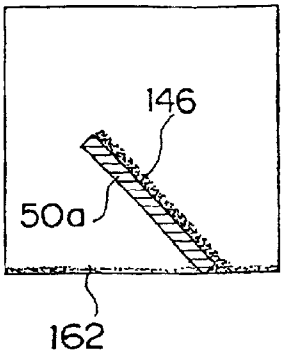

It is also possible to place the first flat substrate 50*a* in the sealed container 162 in a slanted state at a prescribed angle, as shown in FIG. 35D, and allow the powder bodies 146 to settle and accumulate uniformly on the first flat substrate 50*a*, as shown in FIG. 35E. The amount of the powder bodies 146 to be accumulated may be controlled by the inclination angle of the first flat substrate 50*a*.

For example, when the powder bodies 146 (for example, MBX20-white; Sekisui Plastics Co., Ltd.) were supplied into the sealed container at a speed of 0.05 m/sec by the spray gun 164 for about 5 seconds, and left to stand for about 10 minutes, about ten layers of the powder body particles were formed on the substrate. On the other hand, when the substrate was inclined by about 45 degrees, about six layers of the powder bodies were formed.

It is also possible to distribute the powder bodies 146 uniformly by facing the surface of the first flat substrate 50*a* formed with a layer of the powder bodies 146 downward for a time and applying vibrations or impacts to cause excess powder bodies 146 to fall. In this case, one to several uniform layers of the powder body particles will remain due to an electrostatic adhesive force or non-electrostatic adhesive force (van der Waals forces).

(Twenty-First Embodiment)

In the twenty-first embodiment, the particles are distributed uniformly on the substrate by dispersing the particles by gas and supplying them to the substrate. Components identical with those in the embodiment described above are designated by identical reference numerals, and detailed descriptions thereof are not given.

Figure 36A:
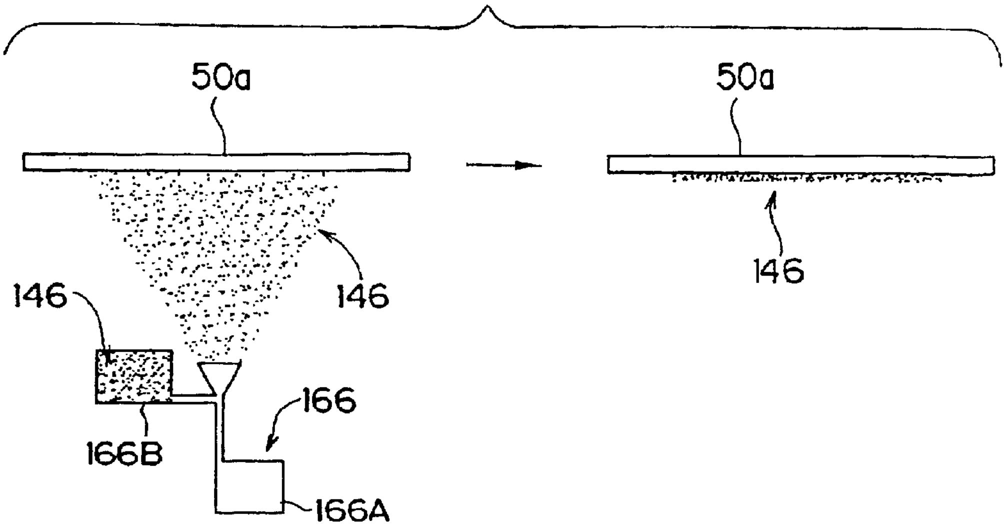
FIGS. 36A and 36B are explanatory drawings showing a method of supplying particles to a substrate according to a twenty-first embodiment of the present invention.

The twenty-first embodiment is provided with a spray gun 166 as shown in FIG. 36A. The spray gun 166 features a container 166A containing compressed air and a container 166B containing the powder bodies 146, for example, white particles. The particles are attached on the first flat substrate 50*a* by van der Waals forces or the like by injecting the powder bodies 146 by the compressed air to the first flat substrate 50*a* from below.

For example, when the powder bodies 146 (for example MBX20-white: Sekisui Plastics Co., Ltd.) were supplied for about 10 seconds at a speed of 0.05 m/sec from the spray gun 166, about two layers of the powder bodies 146 were formed, and when supplied for five seconds, about one layer of the powder bodies 146 was formed.

In the same manner, an image display medium may be formed by forming a layer of the powder body particles, for example, black particles, on the second flat substrate 52*a*, and adhering this with the first flat substrate 50*a*. It is also possible to form a layer of white particles on the first flat substrate 50*a*, and then a layer of black particles thereon, and adhere this with the second flat substrate 52*a*. Alternatively, it is also applicable to form a layer of the powder body particles in which the white particles and the black particles are mixed on the first flat substrate 50*a*, and adhere this with the second flat substrate 52*a*.

Figure 36B:
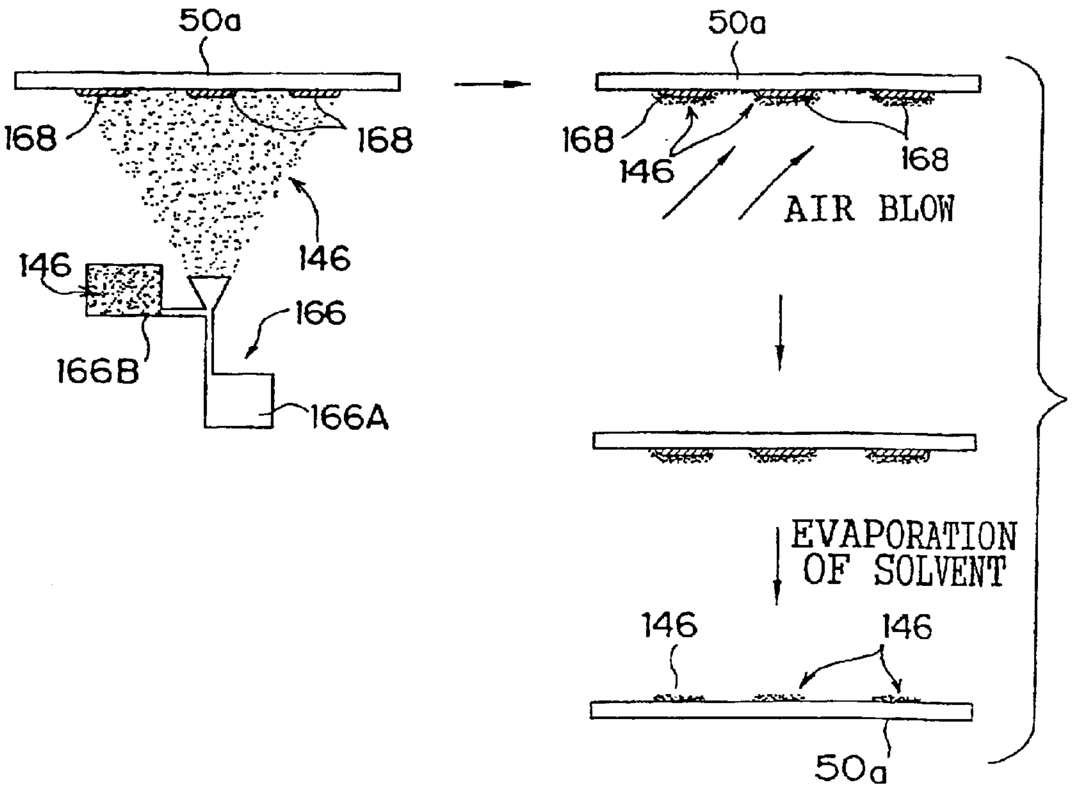

As shown in FIG. 36B, a layer of particles of the powder bodies 146 may be formed on the first flat substrate 50*a* by supplying and attaching a liquid 168 on the first flat substrate 50*a*, then supplying the powder bodies 146 thereto, and then blowing the powder bodies 146 with air, and evaporating the liquid 168. Applying the liquid 168 in advance may improve the efficiency of attachment of the powder bodies 146 and allows the powder bodies 146 to attach uniformly at a portion on which the liquid 168 has been applied in advance. The powder bodies 146 attached on an area on which the liquid 168 is not applied may be removed, for example, by applying vibrations or blowing air to the first flat substrate 50*a*. The amount of the powder bodies 146 to be attached may be controlled by controlling a time period of injecting the powder bodies 146, or of blowing air.

It is preferable to face the first flat substrate 50*a* upward when being dried (or dehydrated). In addition, a portion that is not desired to have the particles attached, for example, ribs, may be coated, for example, with a fluorine-based resin or the like to make it water-repellent. As a consequence, the liquid 168 is applied only in a desired area, and thus the powder bodies 146 may be attached only on that area.

(Twenty-Second Embodiment)

In the twenty-second embodiment, the particles are distributed uniformly on the substrate by accumulating the particles dispersingly on the substrate (cascade process). Components that are the same as in the embodiments described above are assigned the same reference numerals, and detailed descriptions thereof are not repeated.

Figure 37:
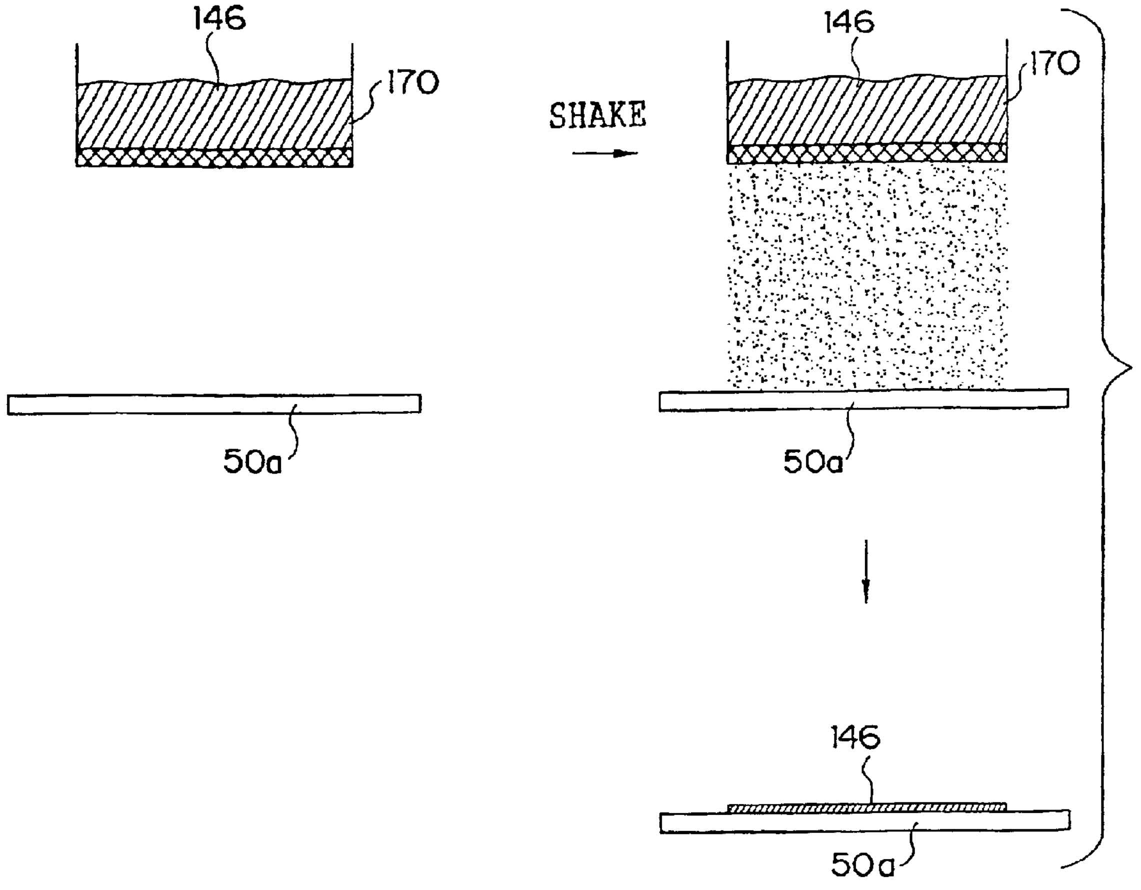
FIG. 37 is an explanatory drawing showing a method of supplying particles to a substrate according to a twenty-second embodiment of the present invention.

The twenty-second embodiment features a powder spray unit 170 having a meshed bottom and in which the powder bodies 146 are stored, as shown in FIG. 37. The powder bodies 146 are shaken out onto the first flat substrate 50*a* by shaking the powder spray unit 170 by a shaker comprising a piezoelectric vibrator or the like. Accordingly, the powder bodies 146 are attached uniformly on the first flat substrate 50*a*.

The amount of the powder bodies 146 to be accumulated maybe controlled by shaking duration, shaking force, amplitude, mesh diameter, mesh configuration, and so on.

In the same manner, an image display medium may be formed by forming a layer of the powder body particles, for example, black particles, on the second flat substrate 52*a* and adhering this with the first flat substrate 50*a*. It is also possible to form a layer of white particles on the first flat substrate 50*a* and then a layer of black particles thereon, and adhere this with the second flat substrate 52*a*. Alternatively, it is also applicable to form a layer of the powder body particles in which the white particles and the black particles are mixed on the first flat substrate 50*a*, and adhere this with the second flat substrate 52*a*.

For example, when the powder bodies 146 (for example, MBX20-white (Sekisui Plastics Co., Ltd.) were supplied in the powder spray unit 170, provided at the bottom thereof with a mesh pattern of about 100 $\mu$m in diameter, the first flat substrate 50*a* was disposed 10 mm below the bottom of the container 170, and then a shaker having a piezoelectric vibrator, etc. was driven for about 5 seconds to shake the powder spray unit 170, approximately ten layers of particles of the powder bodies 146 were formed on the first flat substrate 50*a*.

(Twenty-Third Embodiment)

In the twenty-third embodiment, the particles are distributed uniformly on the substrate by being fluidized and attached on the substrate (fluidized bed coating process). Components that are the same as in the embodiments described above are assigned the same reference numerals, and detailed descriptions thereof are not repeated.

Figure 38:
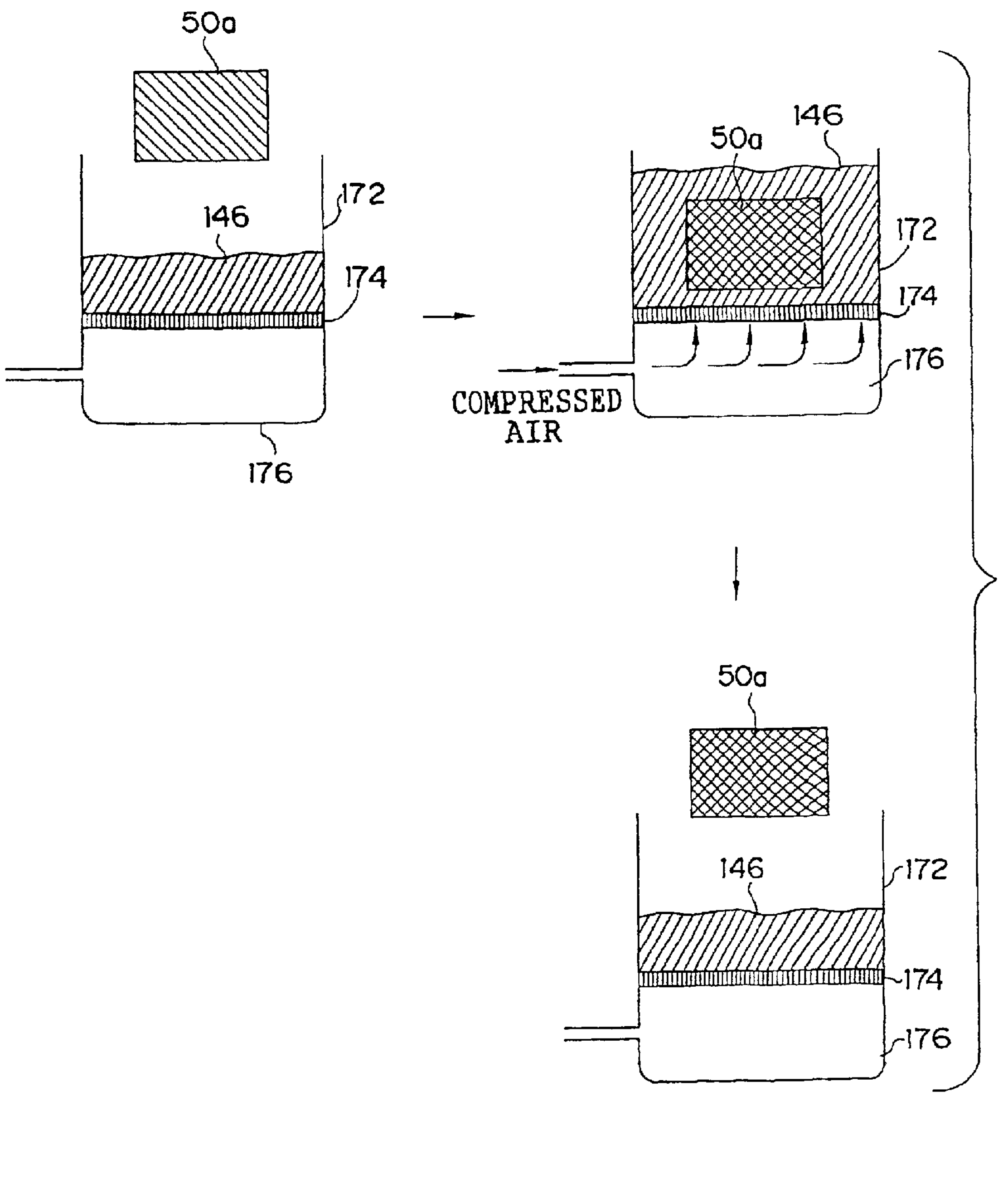
FIG. 38 is an explanatory drawing showing a method of supplying particles to a substrate according to a twenty-third embodiment of the present invention.

The twenty-third embodiment features, as shown in FIG. 38, a powder fluidizing unit having a porous board 174 at bottom of a fluidizing tank 172, and a compressed air chamber 176 therebelow. The fluidizing tank 172 contains the powder bodies 146, for example, white particles.

First, compressed air is supplied into the compressed air chamber 176 to shake the porous board 174, and fluidize (disperse) the powder bodies 146 in the fluidizing tank 172. Then, the first flat substrate 50*a*, one side of which is masked, is placed in the fluidizing tank 172 in which the powder bodies 146 are fluidized, and then is taken out after a prescribed time period has passed. Consequently, the powder bodies 146 can be distributed uniformly on one side of the first flat substrate 50*a*. The amount of the powder bodies 146 to be attached may be controlled by the time period during which the powder bodies 146 are fluidized or by the amount of compressed air.

In the same manner, an image display medium can be formed by forming a layer of the powder body particles, for example, black particles, on the second flat substrate 52*a*, and adhering this with the first flat substrate 50*a*. It is also possible to form a layer of white particles on the first flat substrate 50*a*, and then a layer of black particles thereon, and adhere this with the second flat substrate 52*a*. Alternatively, it is also applicable to form a layer of the powder body particles in which the white particles and the black particles are mixed on the first flat substrate 50*a*, and adhere this with the second flat substrate 52*a*.

For example, thirty grams of the powder bodies 146 (for example MBX20-white) were introduced into the fluidizing tank 172, of dimensions 200×100×200 mm, and compressed air was fed to the compressed air chamber 176 at the speed of 0.05 m/sec to suspend the powder bodies 146. Then an ITO glass plate of dimensions 100×50×2 mm was hanged in the fluidizing tank 172 as the first flat substrate 50*a*. When this was taken out after about 30 seconds, approximately 1.5 layers of the powder body particles had formed on the substrate.

(Twenty-Fourth Embodiment)

In the twenty-fourth embodiment, the particles are distributed uniformly on the substrate by supplying a liquid containing the particles dispersed therein to the substrate by a wet roller, and evaporating carrier fluid. Components that are the same as in the embodiments described above are assigned the same reference numerals, and detailed descriptions thereof are not repeated.

Figure 39:
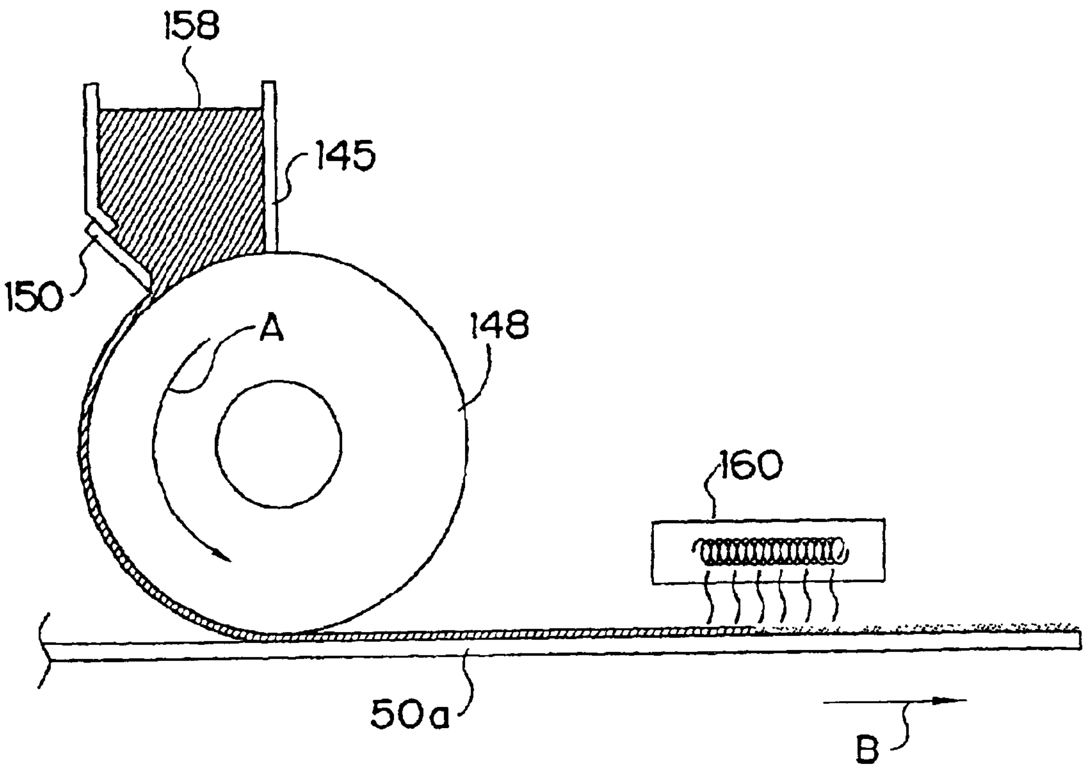
FIG. 39 is an explanatory drawing showing a method of supplying particles to a substrate according to a twenty-fourth embodiment of the present invention.

In the twenty fourth embodiment, as shown in FIG. 39, a dispersion liquid 158 obtained by dispersing, for example, white particles in a carrier fluid is contained in a container 145. A carrier roller 148 is formed of a porous roller. A heater 160 is provided at a downstream side of the first flat substrate 50*a* in the direction of travel.

A volatile solution such as water, methanol, ethanol, or an alcohol aqueous solution such as an isopropyl alcohol aqueous solution may be used as the carrier fluid.

The dispersion liquid 158 is impregnated into the carrier roller formed of the porous roller and carried thereby, with an amount to be supplied being controlled by a blade 150. Accordingly, the dispersion liquid 158 is applied on the first flat substrate 50*a* by the carrier roll 148. Then, the first flat substrate 50*a* is heated by the heater 160, and the carrier fluid on the first flat substrate 50*a* is evaporated, so that a layer of particles alone is formed uniformly.

The amount of the particles to be attached may be controlled by the traveling speed of the first flat substrate 50*a* or control of the dispersed liquid 158 by the blade 150.

In the same manner, an image display medium can be formed by forming a layer of the powder body particles of the black particles on the second flat substrate 52*a*, and adhering it with the first flat substrate 50*a*. It is also possible to form a layer of white particles on the first flat substrate 50*a*, and then a layer of black particles thereon, and adhere it with the second flat substrate 52*a*. Alternatively, it is also applicable to form a layer of the powder body particles in which the white particles and the black particles are mixed on the first flat substrate 50*a*, and adhere it with the second flat substrate 52*a*.

(Twenty-Fifth Embodiment)

In the twenty-fifth embodiment, the particles may be distributed uniformly on the substrate by supplying a liquid with the particles dispersed therein on the substrate by screen printing, and evaporating the carrier fluid. The identical components are designated by the identical reference numerals, and the detailed description will not be made.

Figure 40:
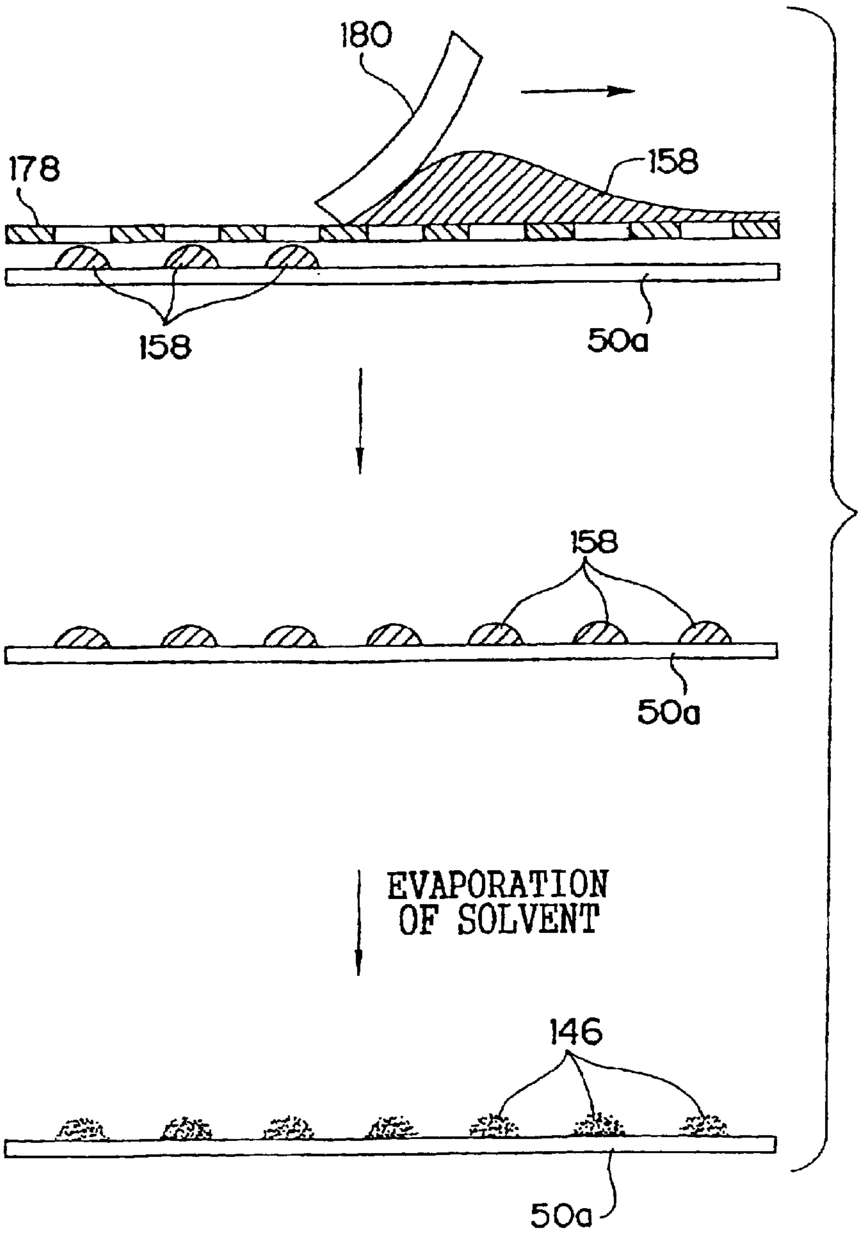
FIG. 40 is an explanatory drawing showing a method of supplying particles to a substrate according to a twenty-fifth embodiment of the present invention.

In the twenty-fifth embodiment, as shown in FIG. 40, a meshed screen (mask) 178 having openings arranged in a prescribed pattern is placed on the first flat substrate 50*a*, and then the dispersion liquid 158 obtained by mixing the powder bodies, for example, white particles, with a liquid to the extent of moistening is supplied thereon, and excess the dispersion liquid 158 on the screen 178 is removed by a blade 180. Accordingly, a layer of the dispersion liquid 158 is formed on the first flat substrate 50*a* according to the configuration of the screen 178. Then the carrier fluid is evaporated by drying the first flat substrate 50*a* for a prescribed time period. As a consequence, a layer of the particles of the powder bodies 146 only is formed uniformly on the first flat substrate 50*a* in a prescribed configuration.

In the same manner, an image display medium can be formed by forming a layer of the powder body particles, for example, of the black particles on the second flat substrate 52*a*, and adhering it with the first flat substrate 50*a*. It is also possible to form a layer of white particles on the first flat substrate 50*a*, and then a layer of black particles thereon, and adhere it with the second flat substrate 52*a*. Alternatively, it is also applicable to form a layer of the powder body particles in which the white particles and the black particles are mixed on the first flat substrate 50*a*, and adhere it with the second flat substrate 52*a*.

(Twenty-Sixth Embodiment)

In the twenty-sixth embodiment, the particles are distributed uniformly on the substrate by supplying a liquid with particles dispersed therein to the substrate by relief printing, and evaporating the carrier fluid. Components that are the same as in the embodiments described above are assigned the same reference numerals, and descriptions thereof are not repeated.

Figure 41:
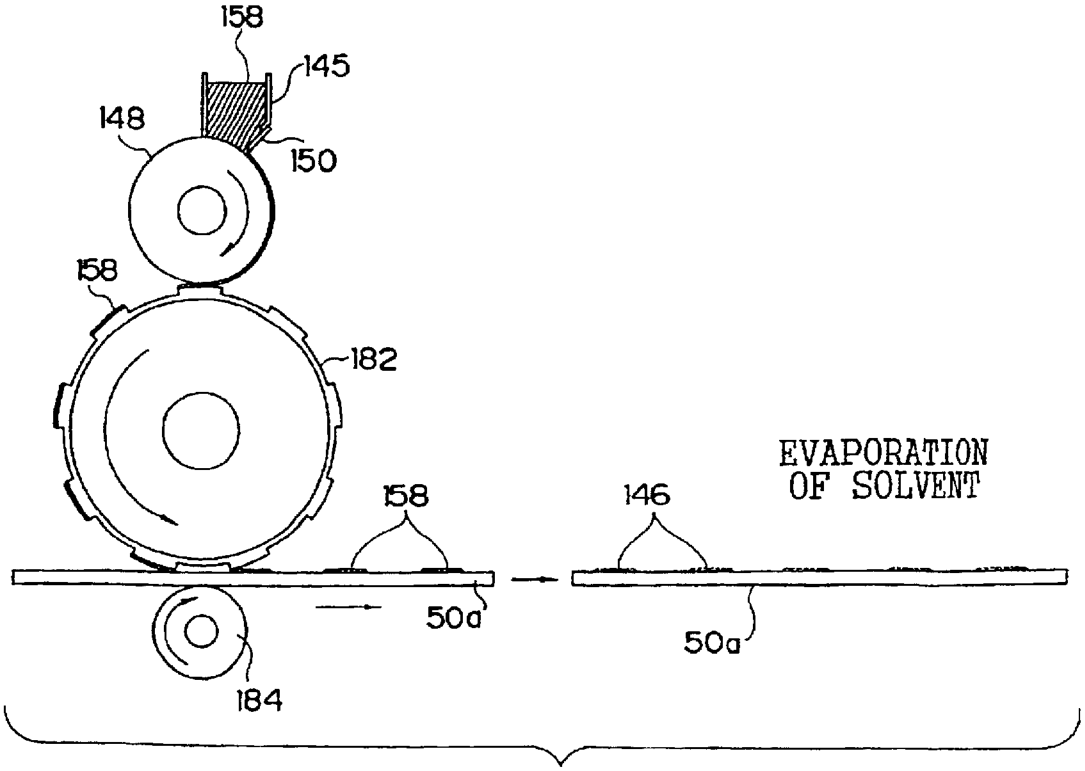
FIG. 41 is an explanatory drawing showing a method of supplying particles to a substrate according to a twenty-sixth embodiment of the present invention.

The twenty-sixth embodiment comprises, as shown in FIG. 41, the container 145 containing the dispersion liquid 158 obtained by dispersing, for example, white particles into the carrier fluid, the blade 150 for controlling the amount of the dispersion liquid 158 to be supplied, the carrier roll 148 for carrying the dispersion liquid 158, a relief printing roll 182 supplying the dispersion liquid 158 from the carrier roll 148 to the first flat substrate 50*a* and having projections of a predetermined pattern, and a pressure roll 184 for applying a predetermined pressure on the first flat substrate 50*a*.

The dispersion liquid 158 contained in the container 145 is supplied to the carrier roll 148, with the amount to be supplied being controlled by the blade 150. The dispersion liquid 158 is impregnated into the surface of the carrier roll 148 and carried and supplied to the projections of the relief printing roll 182. The dispersion liquid 158 supplied to the projections of the relief printing roll 182 is transferred to the first flat substrate 50*a*, which is pressurized by the pressure roll 184 from a back side. Then, the substrate is dried for a prescribed time period so that a layer only of particles of the powder bodies 146 is obtained on the first flat substrate 50*a*.

In the same manner, an image display medium can be formed by forming a layer of the powder body particles, for example, of the black particles on the second flat substrate 52*a*, and adhering it with the first flat substrate 50*a*. It is also possible to form a layer of white particles on the first flat substrate 50*a*, and then a layer of black particles thereon, and adhere it with the second flat substrate 52*a*. Alternatively, it is also applicable to form a layer of the powder body particles in which the white particles and the black particles are mixed on the first flat substrate 50*a*, and adhere it with the second flat substrate 52*a*.

(Twenty-Seventh Embodiment)

In the twenty-seventh embodiment, the particles can be distributed uniformly on the substrate by injecting a liquid with particles dispersed therein onto the substrate, and then evaporating carrier fluid. Components that are the same as in the embodiments described above are assigned the same reference numerals, and descriptions thereof are not repeated.

Figure 42A:
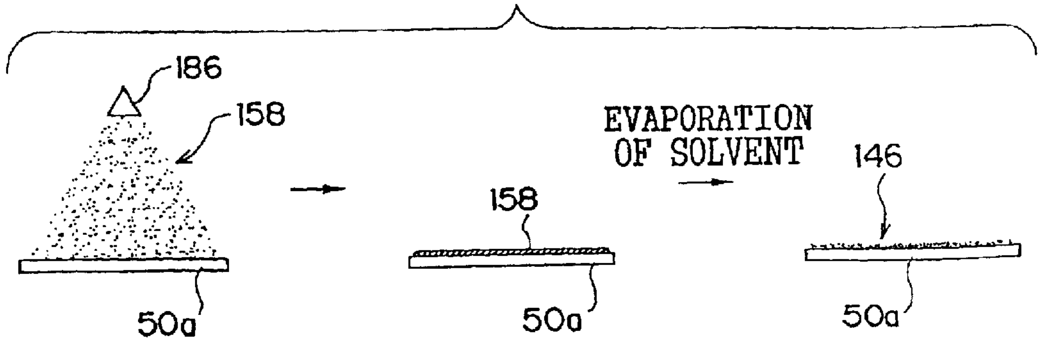
FIGS. 42A to 42C are explanatory drawings showing a method of supplying particles to a substrate according to a twenty-seventh embodiment of the present invention.

In the twenty-seventh embodiment, as shown in FIG. 42A, the dispersion liquid 158, which is obtained by dispersing, for example, the white particles in the carrier fluid, is sprayed on the first flat substrate 50*a*, and dried for a prescribed period of time. As a consequence, the carrier fluid is evaporated and only the powder bodies 146 remain on the first flat substrate 50*a*. The amount of the powder bodies 146 to be attached can be controlled by controlling the time period of spraying the powder bodies 146 or the traveling speed of the first flat substrate 50*a*.

In the same manner, an image display medium can be formed by forming a layer of the powder body particles, for example, of the black particles on the second flat substrate 52*a*, and adhering it with the first flat substrate 50*a*. It is also possible to form a layer of white particles on the first flat substrate 50*a*, and then a layer of black particles thereon, and adhere it with the second flat substrate 52*a*. Alternatively, it is also applicable to form a layer of the powder body particles in which the white particles and the black particles are mixed on the first flat substrate 50*a*, and adhere it with the second flat substrate 52*a*.

Figure 42B:
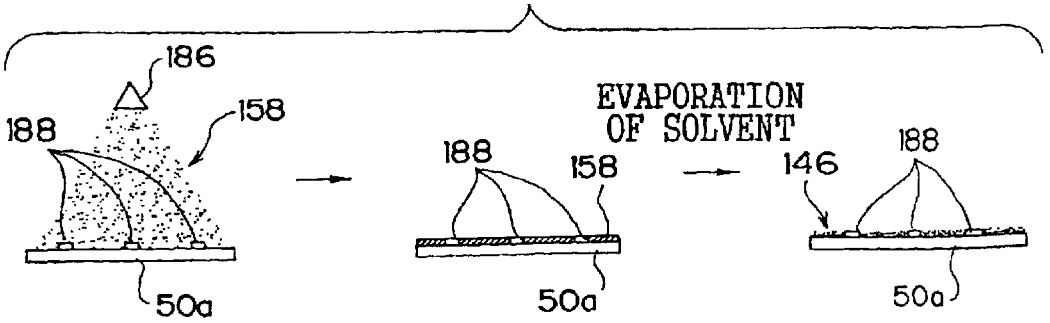

As shown in FIG. 42B, if a spacer 188 is provided on the first flat substrate 50*a*, preferably, upper surfaces of the spacer 188 are subjected to a water-repelling treatment such as coating with a material having low surface energy, for example, a water-repellent material such as CYTOP (Asahi Glass Company) so as to repel the dispersion liquid. As a consequence, the spacer 188 can be prevented from being attached with the dispersion liquid 158 on the upper surfaces thereof, thereby preventing trapping of the particles between the spacer 188 and the second flat substrate 52*a*.

Figure 42C:
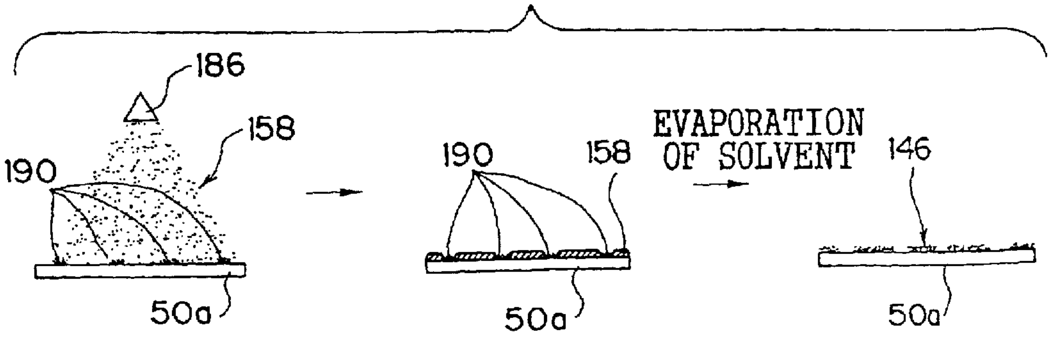

As shown in FIG. 42C, it is also possible to apply a water-repelling treatment directly onto the first flat substrate 50*a* in a prescribed pattern using a water-repellent material such as CYTOP as described above to form a water-repellent portion 190. Accordingly, the dispersion liquid 158 does not attach on the water-repellent portion 190, and thus a layer of the particles may be formed in the prescribed pattern.

(Twenty-Eighth Embodiment)

In the twenty-eighth embodiment, the particles are distributed uniformly on the substrate by immersing the substrate into a liquid containing the particles and then taking out and drying the substrate. Components that are the same as in the embodiments described above are assigned the same reference numerals, and descriptions thereof are not repeated.

Figure 43A:
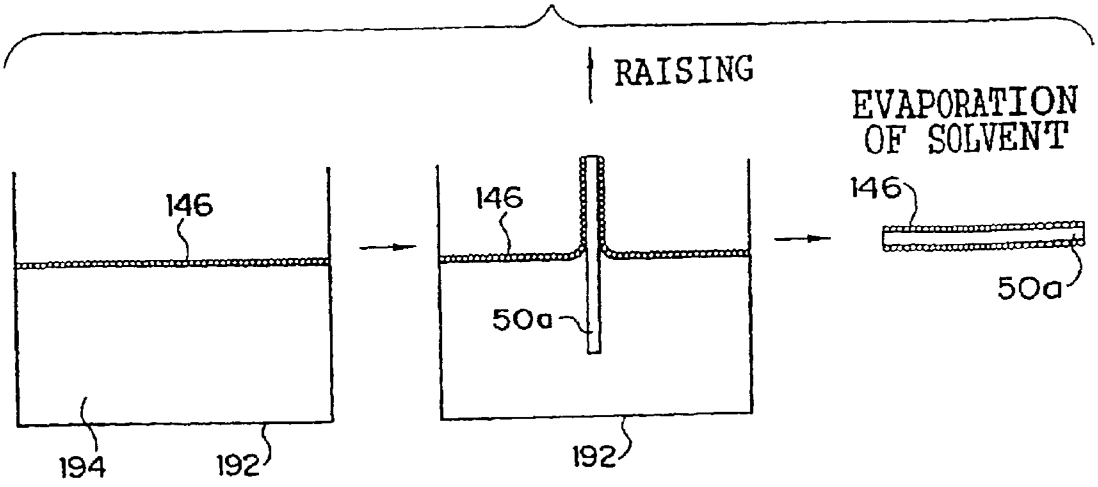
FIGS. 43A and 43B are explanatory drawings showing a method of supplying particles to a substrate according to a twenty-eighth embodiment of the present invention.

The twenty-eighth embodiment, as shown in FIG. 43A, comprises a carrier fluid 194 and a container 192 containing the powder bodies 146, for example, the white particles, which are lower in relative density than the carrier fluid 194. Since the relative density of the powder bodies 146 is lower than that of the carrier fluid 194, the powder bodies 146 float on the surface of the liquid as shown in FIG. 43A.

The first flat substrate 50*a* is placed into the container 192 vertically with respect to the surface of the liquid, and is taken out after soaking for a prescribed time period. As a consequence, a layer of the powder bodies 146 is formed uniformly on the first flat substrate 50*a*. Then the substrate is dried for a prescribed time period to make the carrier fluid 194 evaporate, so that only a layer of particles of the powder bodies 146 is formed on the first flat substrate 50*a*. The amount of the powder bodies 146 to be attached can be controlled by controlling the speed of raising the first flat substrate 50*a*, viscosity of the carrier fluid and so on.

In the same manner, an image display medium can be formed by forming a layer of the powder body particles, for example, of the black particles on the second flat substrate 52*a*, and adhering it with the first flat substrate 50*a*. Alternatively, it is also applicable to form a layer of the powder body particles in which the white particles and the black particles are mixed on the first flat substrate 50*a*, and adhere it with the second flat substrate 52*a*.

A volatile solution such as water, methanol, ethanol, or an alcohol aqueous solution such as an isopropyl alcohol aqueous solution may be used as the carrier fluid.

Figure 43B:
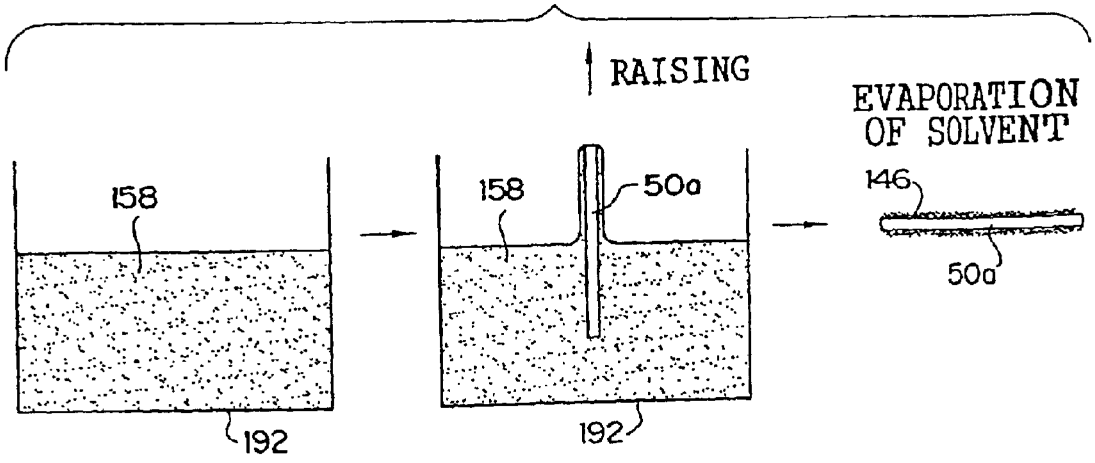

Alternatively, as shown in FIG. 43B, a layer of particles of the powder body 146 may be formed uniformly on the first flat substrate 50*a* by soaking the first flat substrate 50*a* into the container 192 filled with the dispersion liquid 158, which is obtained by dispersing the powder bodies 146 in the carrier fluid, for a prescribed time period, then taking out and drying the substrate for a prescribed time period. In this case, the relative densities of the carrier fluid and the powder bodies 146 are preferably almost equal. The dispersing property may be improved by a surface-active agent or the like.

(Twenty-Ninth Embodiment)

In the twenty-ninth embodiment, the particles may be distributed uniformly on the substrate by supplying the dispersion liquid onto the substrate by an ink jet and then drying it. Components that are the same as in the embodiments described above are assigned the same reference numerals, and descriptions thereof are not repeated.

Figure 44A:
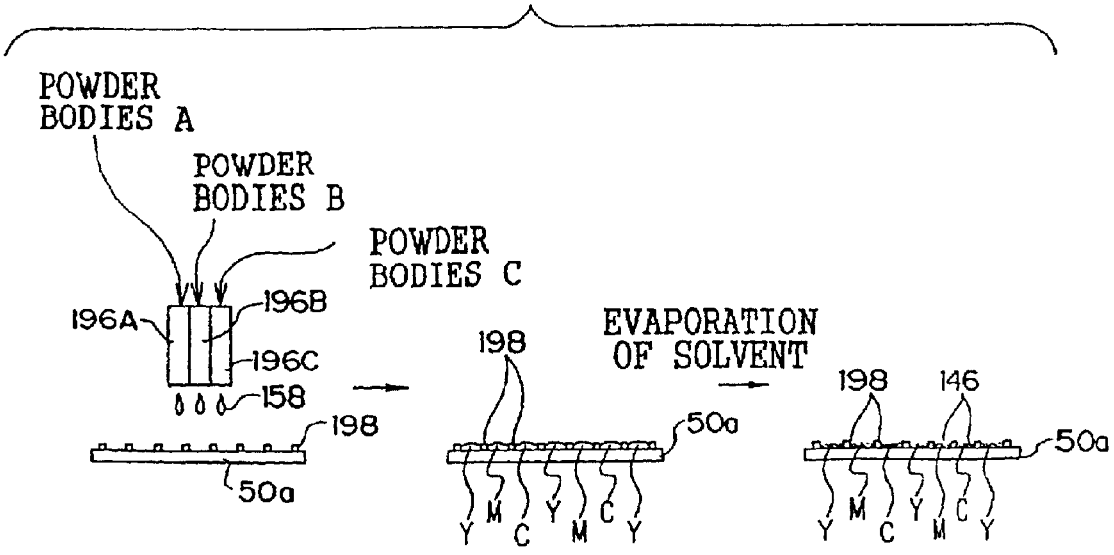
FIGS. 44A and 44B are explanatory drawings showing a method of supplying particles to a substrate according to a twenty-ninth embodiment of the present invention.
Figure 44B:
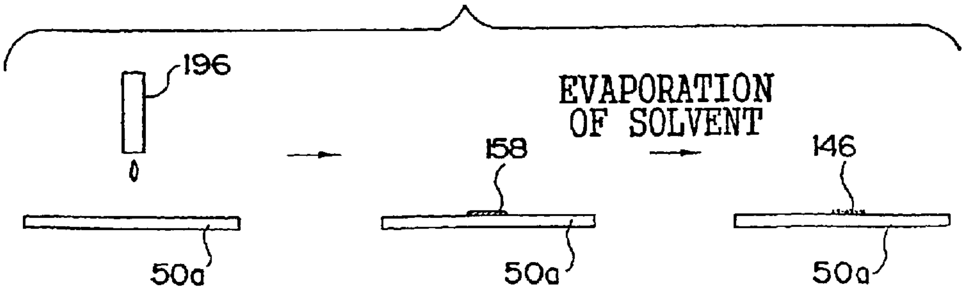

The twenty-ninth embodiment comprises, as shown in FIG. 44B, an ink-jet head 196 for injecting the dispersion liquid 158 onto the first flat substrate 50*a*. The powder bodies 146 may be distributed uniformly on the first flat substrate 50*a* by injecting the dispersion liquid 158 on the first flat substrate 50*a* by the ink-jet head 196 and drying the substrate it for a prescribed time period.

In the same manner, an image display medium can be formed by forming a layer of the powder body particles, for example, of the black particles on the second flat substrate 52*a*, and adhering it with the first flat substrate 50*a*. It is also possible to form a layer of white particles on the first flat substrate 50*a*, and then a layer of black particles thereon, and adhere it with the second flat substrate 52*a*. Alternatively, it is also applicable to form a layer of the powder body particles in which the white particles and the black particles are mixed on the first flat substrate 50*a*, and adhere it with the second flat substrate 52*a*.

The ink-jet head 196 is preferably of a piezoelectric system, and may be a thermal system that controls at a temperature suitable to a volatile liquid.

As shown in FIG. 44A, for example, an ink-jet head 196A for supplying powder bodies A for yellow (Y) particles, an ink-jet head 196B for supplying powder bodies B for Magenta (M) particles, and an ink-jet head 196C for supplying powder bodies C for cyan(C) particles may be provided for selectively supplying the powder bodies into corresponding cells formed by a spacer 198 in a grid pattern.

(Thirtieth Embodiment)

In the thirtieth embodiment, the particles are distributed uniformly on the substrate by transferring a certain amount of the powder bodies onto the substrate (fixed-quantity method). Components that are the same as in the embodiments described above are assigned the same reference numerals, and descriptions thereof are not repeated.

Figure 45:
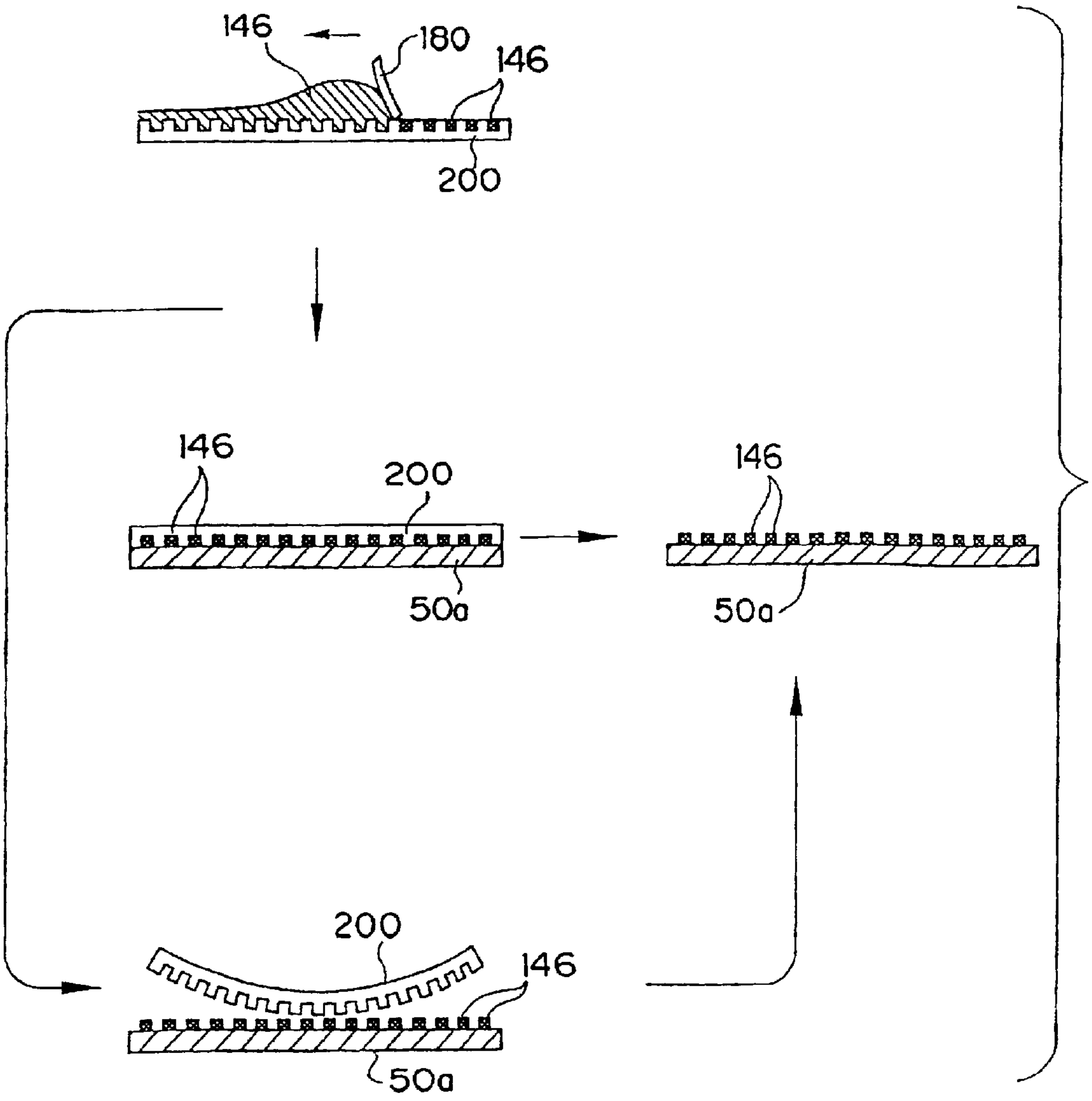
FIG. 45 is an explanatory drawing showing a method of supplying particles to a substrate according to a thirtieth embodiment of the present invention.

As shown in FIG. 45, the thirtieth embodiment includes a fixed-quantity substrate 200 formed with a given pattern of recesses. The powder bodies 146 are supplied on this fixed-quantity substrate 200, and then the blade 180 is used to even out and remove excess powder bodies 146 on the fixed-quantity substrate 200. Consequently, the powder bodies 146 remain only in the recesses on the fixed-quantity substrate 200.

Then, the fixed-quantity substrate 200 is superimposed on the first flat substrate 50*a* with the surface supplied with the powder bodies 146 faced downward, and vibrations or impacts are applied such that the powder bodies 146 in the recesses of the fixed-quantity substrate 200 are transferred to the first flat substrate 50*a*. Consequently, the powder bodies 146 can be distributed uniformly on the first flat substrate 50*a* in a prescribed pattern.

Alternatively, it is also possible to superimpose the first flat substrate 50*a* with the fixed-quantity substrate 200 which is constructed of a resilient member and deform the fixed-quantity substrate 200 such that the powder bodies 146 are transferred. In this case, the particles can easily be separated from the fixed-quantity substrate 200 when being transferred, and thus transfer efficiency is improved.

The fixed-quantity substrate 200 used here may be, for example, a glass epoxy substrate of 1.5 mm in thickness having portions in a grid pattern formed by a dry photo-etching method. The portions employed here may be constructed in a manner in which 36 in total of 1 mm×1 mm cells are arranged into 6 rows and 6 columns at intervals of 0.2 mm on a powder body supplying area which is 8 mm×8 mm. The depth of the cell may be, for example, 0.15 mm, 0.2 mm, or 0.25 mm, and an amount to be supplied may be controlled by selecting the fixed-quantity substrate as needed according to the amount of particles to be disposed.

(Thirty-First Embodiment)

In the thirty-first embodiment, the particles are distributed uniformly by supplying the particles onto the substrate by means of a carrier roller. Components that are the same as in the embodiments described above are assigned the same reference numerals, and descriptions thereof are not repeated.

Figure 46A:
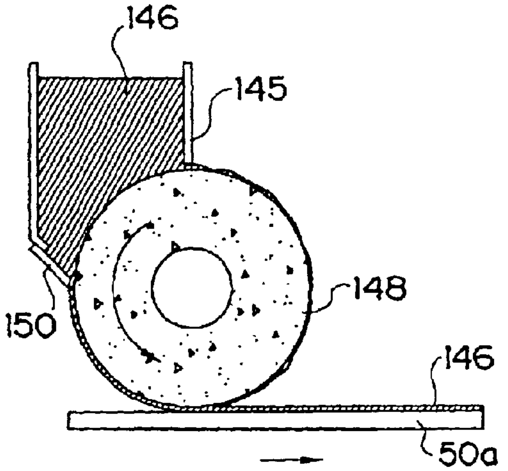
FIGS. 46A to 46C are explanatory drawings showing a method of supplying particles to a substrate according to a thirty-first embodiment of the present invention.

According to the thirty-first embodiment, as shown in FIG. 46A, the powder bodies 146 comprising, for example, white particles and black particles mixed together are contained in the container 145, and the powder bodies 146 are carried by the carrier roller 148, which is formed of a porous roll, with the amount to be supplied being controlled by the blade 150, and transferred to the first flat substrate 50*a*. The amount of the powder bodies 146 to be attached may be controlled by controlling the traveling speed of the first flat substrate 50*a* or by restraining with the blade 150.

Figure 46B:
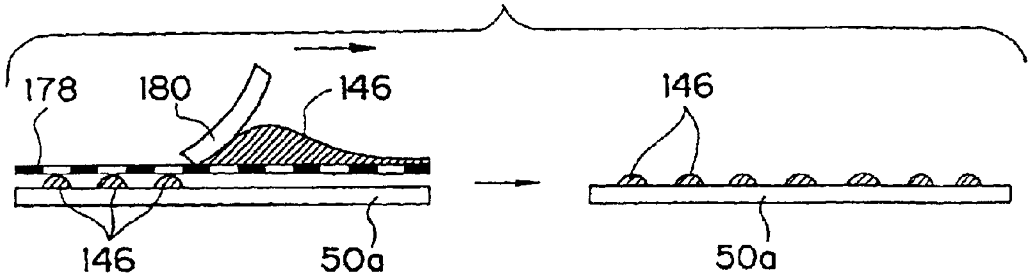

As shown in FIG. 46B, it is also possible to place the meshed screen (mask) 178 having openings arranged in a prescribed pattern on the first flat substrate 50*a*, supply the powder bodies 146 from above the screen, and scrape excess powder bodies 146 off from the surface of the screen 178 by means of the blade 180. As a consequence, the powder bodies 146 are formed on the first flat substrate 50*a* according to the configuration of the screen 178. The amount of the powder bodies to be attached may be controlled by controlling the area of openings on the screen 178, pressing force of the blade 180, dimensions of the mesh, configuration, and traveling speed of the screen 178.

Figure 46C:
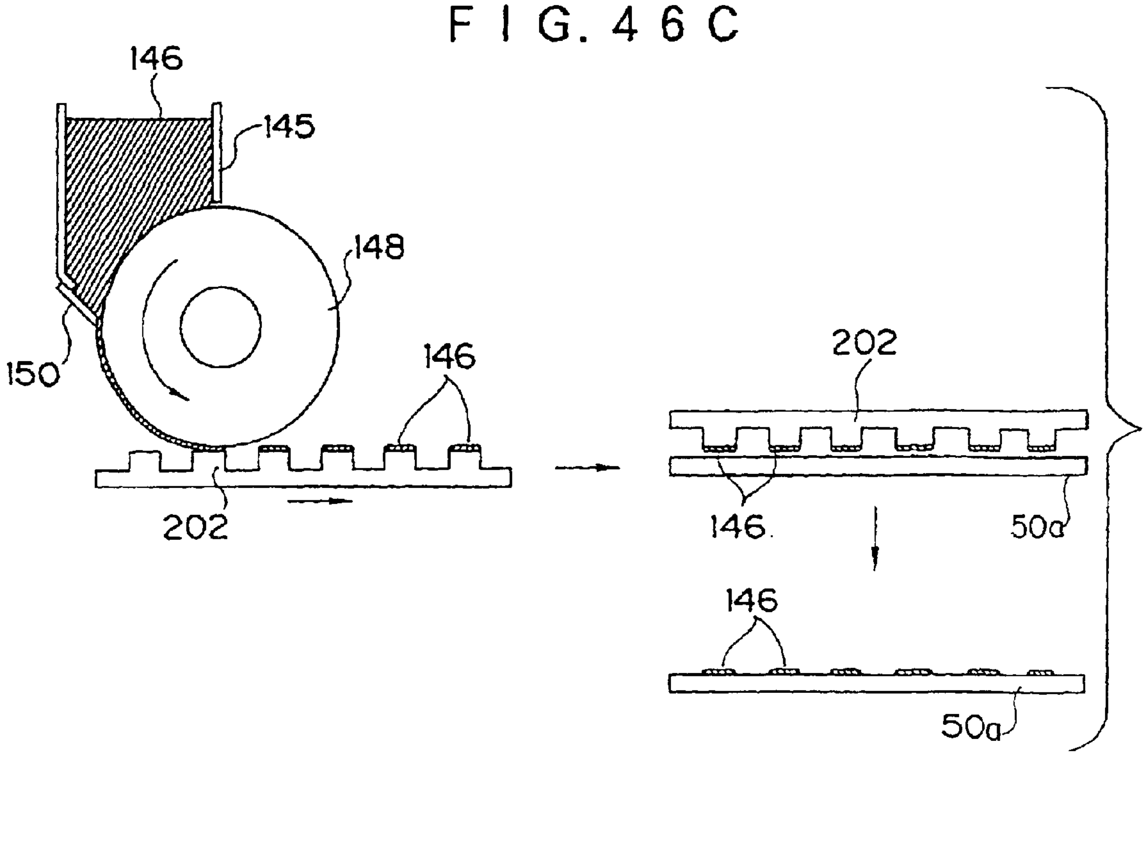

As shown in FIG. 46C, the powder bodies 146 may be transferred on the first flat substrate 50*a* by transferring the powder bodies 146 carried on the carrier roll 148 onto projections of a concavo-convex substrate 202 having a prescribed pattern of projections, and superimposing the concavo-convex substrate 202 onto the first flat substrate 50*a* with the projections on the concavo-convex substrate 202 faced downward. Consequently, the powder bodies 146 may be formed uniformly in a prescribed pattern on the first flat substrate 50*a*. The amount of the powder bodies 146 to be attached may be controlled by controlling the traveling speed of the first flat substrate 50*a* or by restraining with the blade 150.

(Thirty-Second Embodiment)

In the thirty-second embodiment, the particles on the substrate are uniformly distributed by supplying the particles to the substrate and then shaking the substrate. Components that are the same as in the embodiments described above are assigned the same reference numerals, and descriptions thereof are not repeated.

Figure 47A:
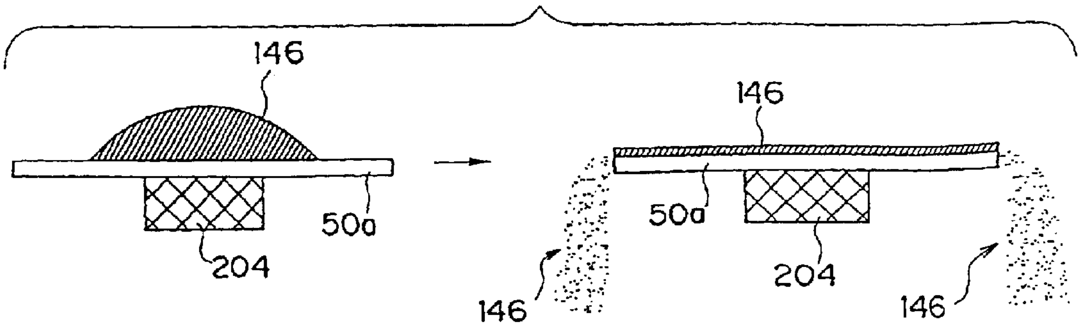
FIGS. 47A to 47C are explanatory drawings showing a method of supplying particles to a substrate according to a thirty-second embodiment of the present invention.

The thirty-second embodiment includes a vibrator 204 as shown in FIG. 47A. After the powder bodies 146 including, for example, white particles and black particles mixed together have been supplied to the first flat substrate 50*a*, the first flat substrate 50*a* is shaken by the vibrator 204 from below. As a consequence, excess powder bodies 146 on the first flat substrate 50*a* fall down from each side of the first flat substrate 50*a*, and the powder bodies 146 on the first flat substrate 50*a* are made uniform. The amount of the powder bodies 146 to be formed on the first flat substrate 50*a* may be controlled by controlling the vibration frequency or the amplitude of the vibrator 204.

Figure 47B:
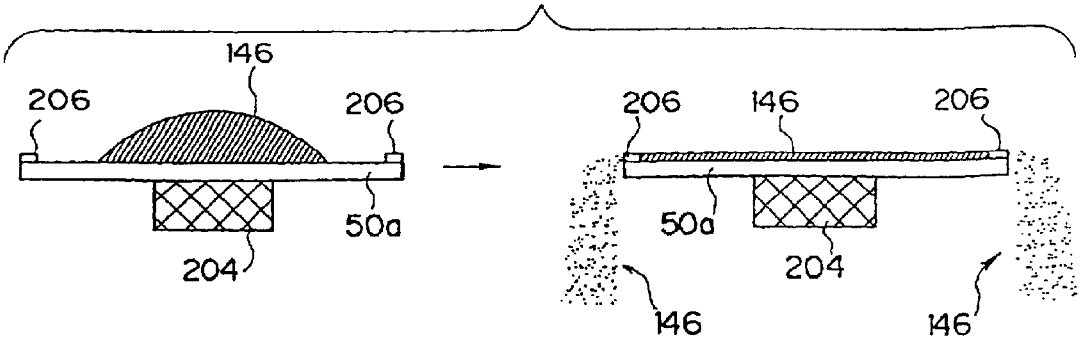

It is also possible to control the amount of the powder bodies 146 by providing spacers 206 at both ends of the first flat substrate 50*a* as shown in FIG. 47B and adjusting height of the spacers 206.

Figure 47C:
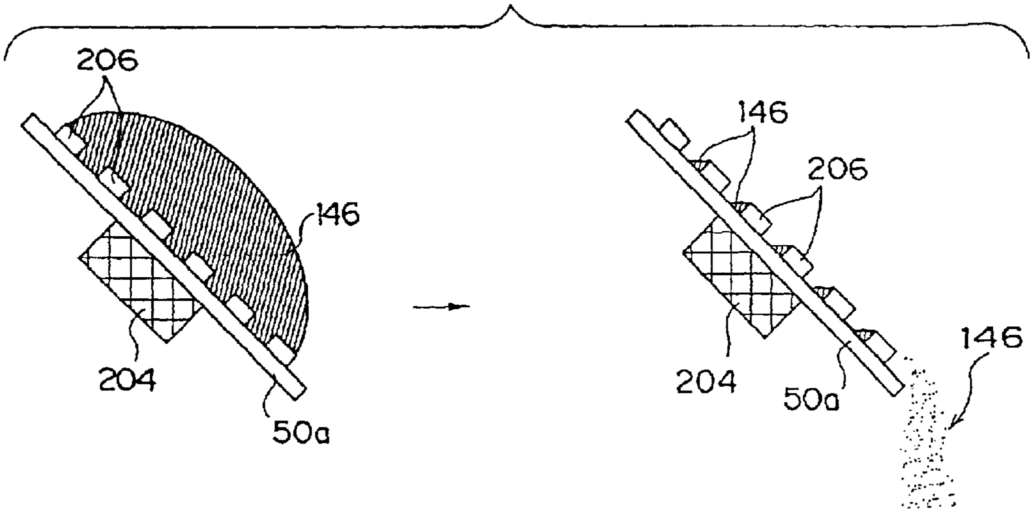

Alternatively, as shown in FIG. 47C, a number of the spacers 206 may be provided on the first flat substrate 50*a*, and the first flat substrate 50*a* shaken in an inclined state so that the amount of the powder bodies 146 may be made uniform between spacer positions or at cells divided by the spacers. The amount of the powder bodies 146 may be controlled by adjusting the angle of inclination of the first flat substrate 50*a*.

(Thirty-Third Embodiment)

In the thirty-third embodiment, trapping of the particles between the substrates is prevented by supplying the particles in a state in which the spacer is masked by a masking member corresponding to the spacer formed on the substrate. Components that are the same as in the embodiments described above are assigned the same reference numerals, and descriptions thereof are not repeated.

Figure 48:
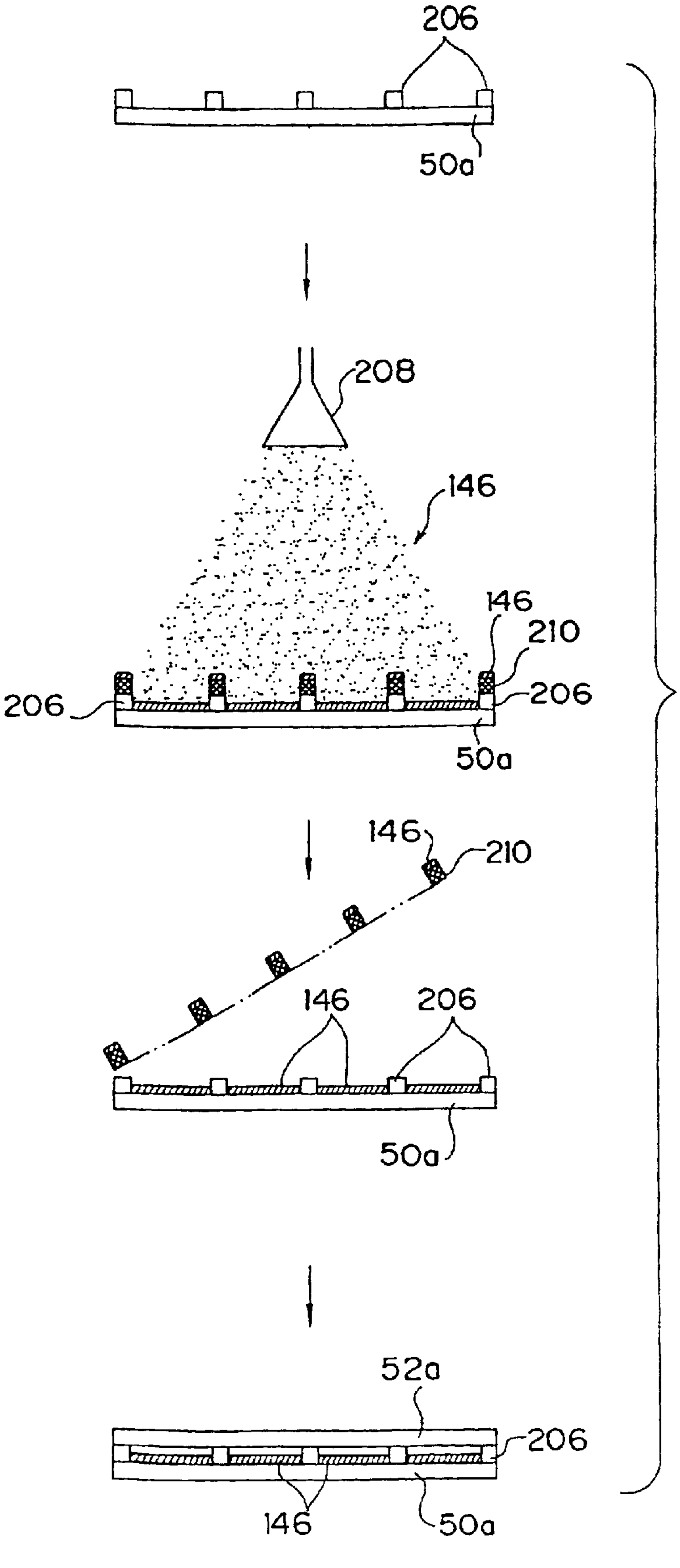
FIG. 48 is an explanatory drawing showing a method of supplying particles to a substrate according to a thirty-third embodiment of the present invention.

In the thirty-third embodiment, as shown in FIG. 48, a masking member 210 having the same pattern as the spacers 206 is placed on the first flat substrate 50*a*, which is formed with the spacers 206 in a prescribed pattern. Subsequently, the powder bodies 146 including, for example, the white particles and the black particles mixed together are sprayed by an injection nozzle 208 for a prescribed time period, and then the masking member 210 is removed and the second flat substrate 52 a is adhered. Since the powder bodies 146 are sprayed with the masking member 210 corresponding to the spacer 206 locations, the powder bodies 146 do not remain on the spacers 206, thereby preventing trapping of the powder bodies 146 between the substrates, and preventing distance between the substrates from being uneven. Therefore, irregularity of image due to trapping of the powder bodies may be prevented from occurring, and thus good quality images may be displayed.

The masking member may be fabricated by punching a resin such as polyethylene or polystyrene or a metal such as stainless steel or copper in accordance with the configuration of the spacers 206, or by etching or laser beam machining or the like. Alternatively, a metal mesh formed by knitting stainless steel wire may be employed. The thickness may be selected as needed according to the area to be masked. However, the masking member 210 may be bent when being removed if too thin, and thus the particles may not be removed completely. On the other hand, the masking member 210 may create a clearance from the surface of the spacers 206 if too thick, which may result in attachment of the particles on the spacers 206. Therefore, if the area of the substrate is about A4 size, the masking member 210 is preferably of about 0.1 mm to 1 mm in thickness.

The masking member 210 is aligned with a marking on the edge or periphery of the first flat substrate 50*a* so as to cover the spacer 206. The masking member 210 is preferably the same configuration as the spacers 206, but slightly larger than the spacers 206 (a masking area being slightly larger than a corresponding spacer.). Consequently, the spacers 206 can be completely covered and the particles may be prevented from being attached accidentally on the spacer 206 by misplacement of the masking member 210.

It is also preferable to apply an adhesive agent on the spacer 206, and place the masking member 210 on that area in a sticky state. Consequently, the spacer 206 and the masking member 210 are closely stucks and thus displacement is prevented from occurring. In this case, the powder bodies 146 are injected, then the masking member 210 is removed before the adhesive agent is completely cured, and the second flat substrate 52*a* is adhered.

Preferably, a stimulation-curable adhesive agent such as a hot-melt adhesive or a UV-curable adhesive is used as an adhesive agent. This realizes separation and adhesive strength of the masking member 210 concurrently.

Supply of the powder bodies 146 is not limited to the method using the injection nozzle 208, and various methods described in conjunction with the embodiments described above may be employed.

(Thirty-Fourth Embodiment)

The thirty-fourth embodiment is a modification of the thirty-third embodiment. In this embodiment, trapping of the particles between the substrates is prevented by processing the spacer such that the particles are not attached thereon. Components that are the same as in the embodiments described above are assigned the same reference numerals, and detailed descriptions thereof are not repeated.

In the thirty-forth embodiment, the spacers 206 is applied with a water-repellent finish on the upper surface thereof, or the spacer 206 is formed of an inherently water-repellent material, and the first flat substrate 50*a* is formed of a material that is high in wettability, or low in water repellency. For example, the surface of the first flat substrate 50*a* may be formed of a material on which the contact angle of a dispersion liquid is smaller than on the surface of the spacer 206. For example, the first flat substrate 50*a* maybe formed of a hard glass (contact angle of distilled water: 23°), polycarbonate resin (contact angle of distilled water: 82 to 83°), or the like, and the spacer 206 may be made, for example, of polyethylene resin (contact angle of distilled water: 91 to 92°), silicone resin (contact angle of distilled water: 95° or more), or PTFE resin (contact angle of distilled water: 110° or more)

It is also possible to make the first flat substrate 50*a* wettable by modifying the surface of a resin by a UV laser or electron beam.

Alternatively, the surfaces of the spacers 206 may be applied with a transparent fluorine contained resin (for example, Cytop (Trade name: Asahi Glass Company) and dried to increase water-repellency. It is also possible to cut a PTFE adhesive sheet of about 0.1 to 0.2 mm thickness in conformity with the spacer 206 configuration, adhere it on the first flat substrate 50*a*, and form the spacer 206 of a fluorine-based resin.

Figure 49:
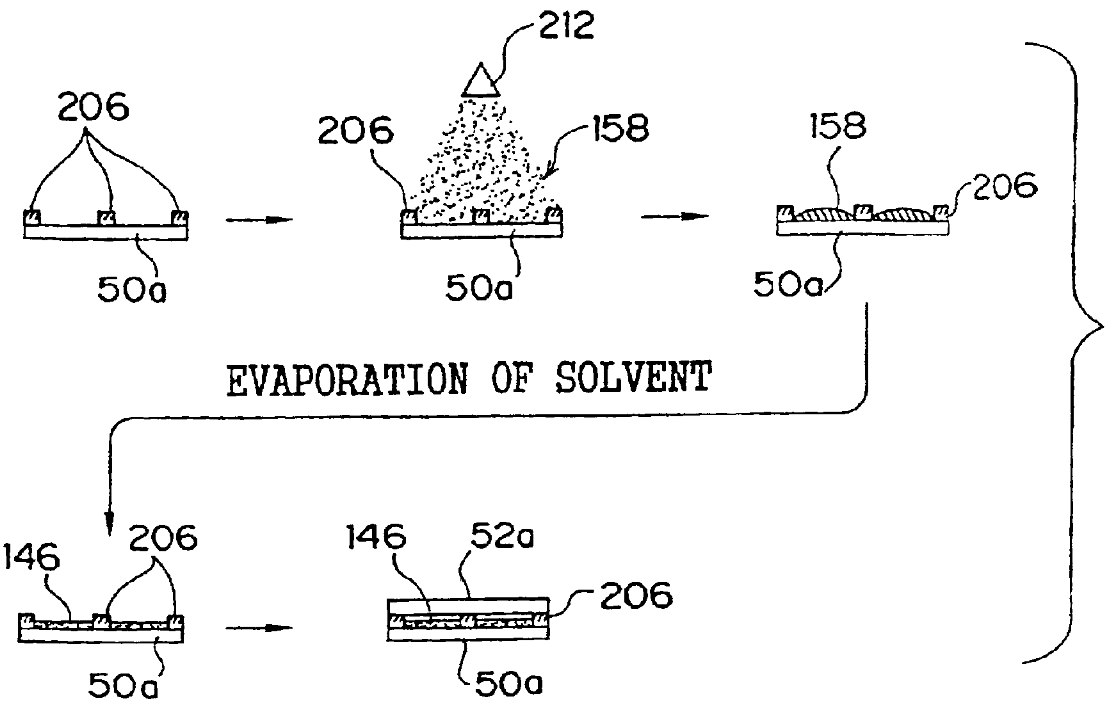
FIG. 49 is an explanatory drawing showing a method of supplying particles to a substrate according to a thirty-fourth embodiment of the present invention.

As shown in FIG. 49, the dispersion liquid 158 having, for example, white particles and black particles mixed therein is sprayed onto the first flat substrate 50*a* by an injection nozzle 212. In order to make the attached particles uniform, the dispersion liquid is preferably sprayed in a thoroughly mixed state. Since the upper surfaces of the spacers 206 are high in water repellency, the dispersed liquid 158 does not attach thereon, and thus the particles do not remain thereon after evaporation of solvent. Accordingly, trapping of the powder bodies 146 between the substrates may be prevented from occurring and thus distance between the substrates is prevented from being uneven. Therefore, irregularity of images can be prevented, and thus good quality image can be displayed.

Liquids higher in surface tension than the critical surface tension of PTFE (distilled water, ethyl alcohol, 1-propanol, etc.) may be used as a carrier fluid. This prevents the spacers 206 from getting wet and increases water repellency thereof. By filling the carrier fluid to the same level as the height of the spacer 206 or lower, the carrier fluid is repelled and prevented from attaching on the spacer 206.

(Thirty-Fifth Embodiment)

In the thirty-fifth embodiment, trapping of the particles between the substrates is prevented by forming the spacer into a configuration that resists attachment of the particles. Components that are the same as in the embodiments described above are assigned the same reference numerals, and descriptions thereof are not repeated.

Figure 50A:
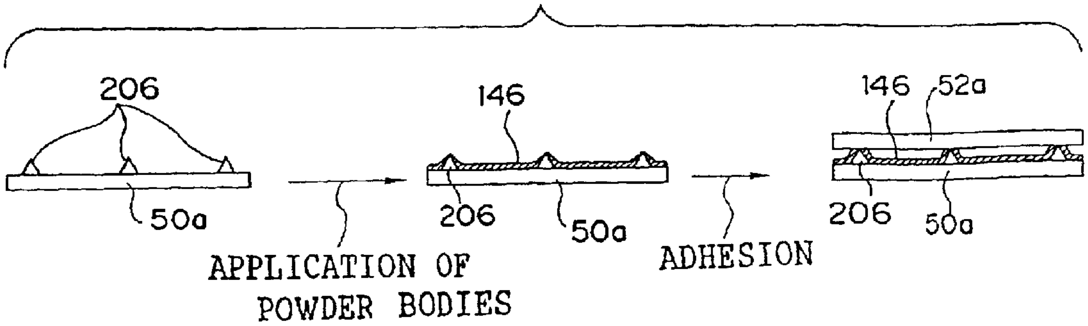
FIGS. 50A and 50B are explanatory drawings showing a method of supplying particles to a substrate according to a thirty-fifth embodiment of the present invention.

In the thirty-fifth embodiment, as shown in FIG. 50A, the tip of the spacer 206 is tapered. As a consequence, when adhering the second flat substrate 52*a* after the powder bodies 146 have been applied, trapping of the powder bodies 146 between the second flat substrate 52*a* and the spacer 206 can be prevented because the contact area between the second flat substrate 52*a* and the spacer 206 is small.

When screen printing in which the spacer 206 is fabricated by laminating spacer material repeatedly is employed, for example, the width of spacer material is gradually decreased every time of printing, so that the width of an upper portion of the spacer 206 decreases.

The spacer may be formed, for example, of a glass paste (Okuno Chemical Industries Co., Ltd.) by forming a first layer of about 20 μm in thickness and 100 μm in width, drying it, and then calcining it so that it is fixed on the first flat substrate 50*a*. Subsequently, a second layer having a width smaller than the first layer by about 5 μm is formed on the first layer in the same manner. In the same manner, approximately six layers, for example, are formed while reducing the widths by about 5 μm, to form a tapered configuration.

Even if the configuration before calcination is not tapered, by employing a spacer material that reaches melting point for a time and is then fluidized by calcining as described above, a tip can be rounded by surface tension during calcination (so called leveling occurs), and thus a tapered configuration can be obtained.

When a spacer having a width of 100 μm at a side of the first flat substrate 50*a* and 20 μm at a tip portion was fabricated, and a group of particles of 30 μm mean diameter was dispersed according to a procedure described above, the particles were not attached on the tips of the spacer 206 but disposed only on the first flat substrate 50*a*.

Figure 50B:
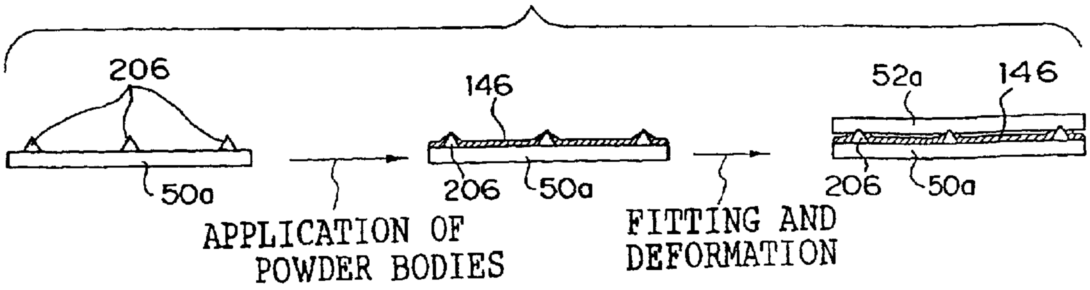

It is also possible to provide a recess corresponding to the tip portion of the spacer 206 at a side of the second flat substrate 52*a*, and fit the tip portion of the spacer 206 into the recess as shown in FIG. 50B. Alternatively, the second flat substrate 52*a* may be formed of a deformable member so that the tip portion of the spacer 206 digs into the deformable member. As a consequence, the image display medium can be formed without using an adhesive agent.

The spacer 206 may be formed of a deformable material (for example, a thermoplastic resin, resilient body or the like). Consequently, the tip is crushed when it is adhered and thus contact area increases, thereby increasing adhesion and thus adhering strength.

The spacer 206 to be used here may be fabricated with a die by using a silicone rubber member of a regular triangular prism shape having in cross section, for example, a regular triangle shape of 0.5 mm length of sides. When the such spacer 206 was disposed on the first flat substrate 50*a* formed of a glass plate, and a group of particles of 30 μm in mean diameter was sprayed thereon, the particles did not attached to the tip of the spacer 206 but attached only to the first flat substrate 50*a*. Then, the second flat substrate 52*a* was faced toward the spacer so that the tip of the spacer was brought into contact therewith and adhered to the first flat substrate 50*a* with pressure such that the distance between the substrates became about 300 μm. As a consequence, the tip of the spacer 206 was crushed and thus contact area increased, and thus adhesiveness was satisfactory.

(Thirty-Sixth Embodiment)

In the thirty-sixth embodiment, trapping of the particles between the substrates is prevented by preventing the particles from being attached on the spacer by the use of electrostatic force. Components that are the same as in the embodiments described above are assigned the same reference numerals, and descriptions thereof are not repeated.

Figure 51:
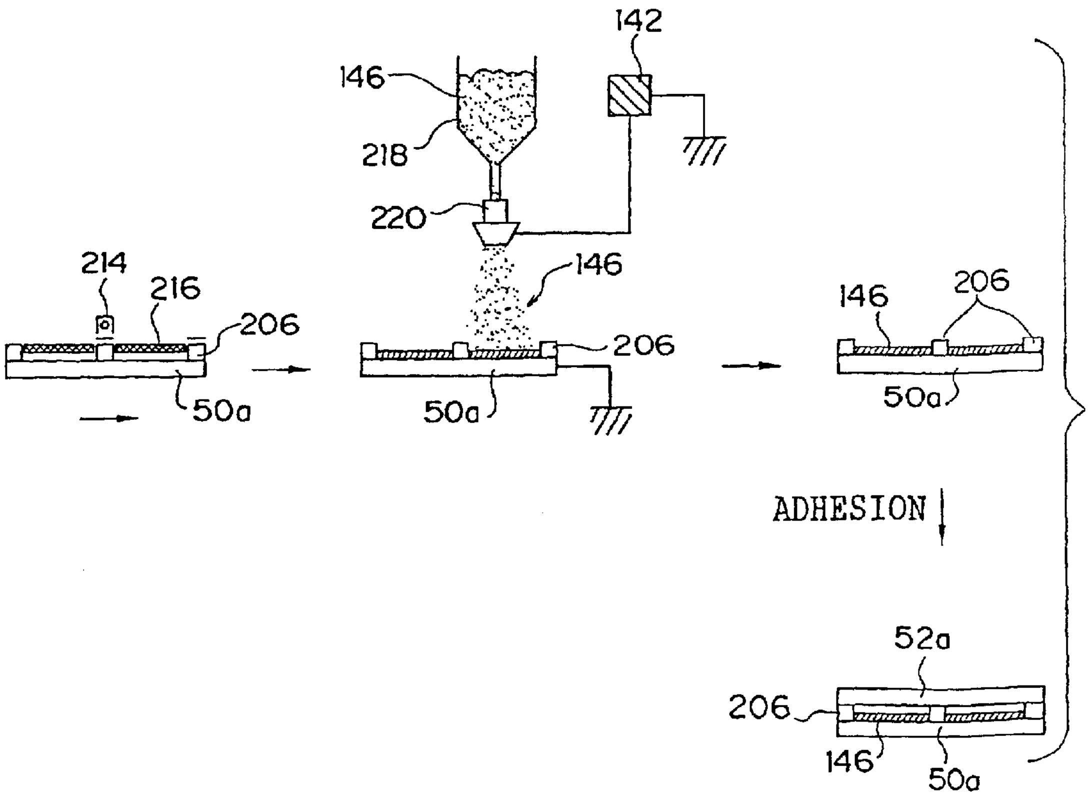
FIG. 51 is an explanatory drawing showing a method of supplying particles to a substrate according to a thirty-sixth embodiment of the present invention.

In the thirty-sixth embodiment, the spacer 206 is formed of a member having an electrostatic property. As shown in FIG. 51, the surface of the first flat substrate 50*a* to which the particles are to be supplied is masked by a masking member 216, and the spacer 206 is negatively charged by a charger 214. The powder bodies 146 supplied from a container 218 are negatively charged, the same as the spacer, with a high voltage generated by the high-voltage generator 142, and the powder bodies 146 are electrostatically applied on the first flat substrate 50*a*. Subsequently, the second flat substrate 52*a* is adhered thereon.

In this manner, by charging the spacer 206 and the powder bodies 146 to the same polarity, the powder bodies 146 may be prevented from being attached on the spacer 206 by the effect of an electrostatic reaction force. A corotron or a charging roller may be used as a charger.

The spacer 206 used here may be formed, for example, of silicone rubber 200 μm in thickness and 2 mm in width. For example, such a spacer was disposed on the first flat substrate 50*a* formed of a glass plate, and charged with a grounded charger constructed of a stainless steel plate having a slit of 2 mm width (a tungsten wire was strained therein and a voltage of +2 kV applied to a portion between the wire and the stainless steel plate) for about 10 seconds in a state in which a distance between the surface of the stainless steel plate and the spacer was kept to about 0.5 mm.

As a consequence, while the surface potential of the first flat substrate 50*a* was about 0V, the surface potential of the spacer 206 was 200V. When the positively charged particles were sprayed thereon, the particles did not attach on the surface of the spacer 206 because of a reactive force due to the charges of the same polarity, and attached only on the surface of the first flat substrate 50*a*.

Also, when the spacer 206 was used with a negative charge, and negatively charged powder bodies, which had been charged with a negative charge (surface voltage: −200 V) by the same method (i.e., the powder bodies had the same polarity of charge), were sprayed on, the powder bodies were disposed only on the first flat substrate 50*a*, and did not attach to the surface of the spacer 206.

(Thirty-Seventh Embodiment)

In the thirty-seventh embodiment, the particles are selectively supplied to the substrate such that the particles are prevented from being attached on the spacer, and thus trapping of the particles between the substrates is prevented. Components that are the same as in the embodiments described above are assigned the same reference numerals, and descriptions thereof are not repeated.

Figure 52A:
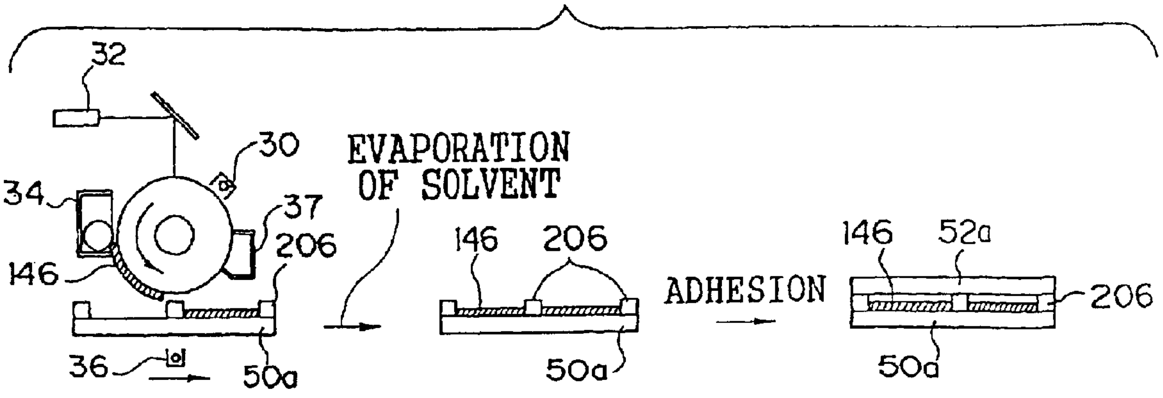
FIGS. 52A to 52C are explanatory drawings showing a method of supplying particles to a substrate according to a thirty-seventh embodiment of the present invention.

In the thirty-seventh embodiment, as shown in FIG. 52A, an electrostatic application apparatus as described in conjunction with the first embodiment is provided, and an electrostatic latent image in a desired pattern is formed on a photoreceptor drum by the optical writing unit 32 and developed by the developer 34. As a consequence, the powder bodies 146 are formed on the photoreceptor drum in a desired pattern, and transferred onto the first flat substrate 50*a* by the corotron 36. Subsequently, the second flat substrate 52*a* is attached to form an image display medium.

Figure 52B:
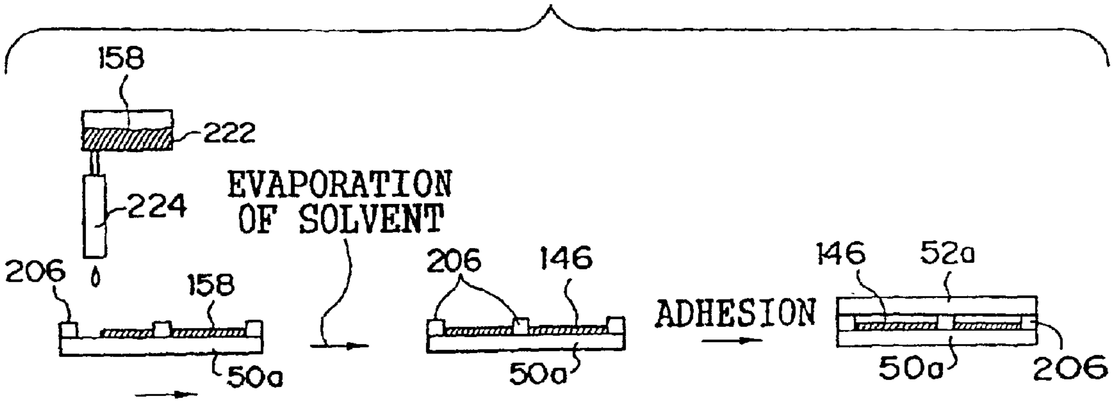

As shown in FIG. 52B, the dispersion liquid 158 filled in the container 22 may be selectively injected on the first flat substrate 50*a* by an ink-jet head 224. Subsequently, the liquid is dried (or dehydrated) for a prescribed time period, and the second flat substrate 52*a* is adhered to form an image display medium.

Figure 52C:
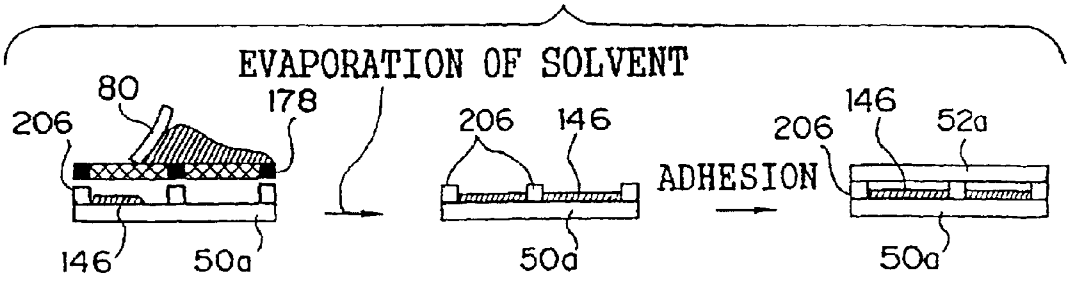

As shown in FIG. 52C, an image display medium may be formed by placing the meshed screen (mask) 178 having openings in a prescribed pattern on the first flat substrate 50*a*, supplying the powder bodies 146 thereon, removing excess powder bodies 146 on the screen 178 by the blade 180, and adhering the second flat substrate 52*a*.

In this manner, by selectively supplying the powder bodies 146, the powder bodies 146 may be prevented from being attached on the spacer 206.

(Thirty-Eighth Embodiment)

In the thirty-eighth embodiment, trapping of the particles between the substrates is prevented by removing particles attached on the spacer. Components that are the same as in the embodiments described above are assigned the same reference numerals, and descriptions thereof are not repeated.

Figure 53A:
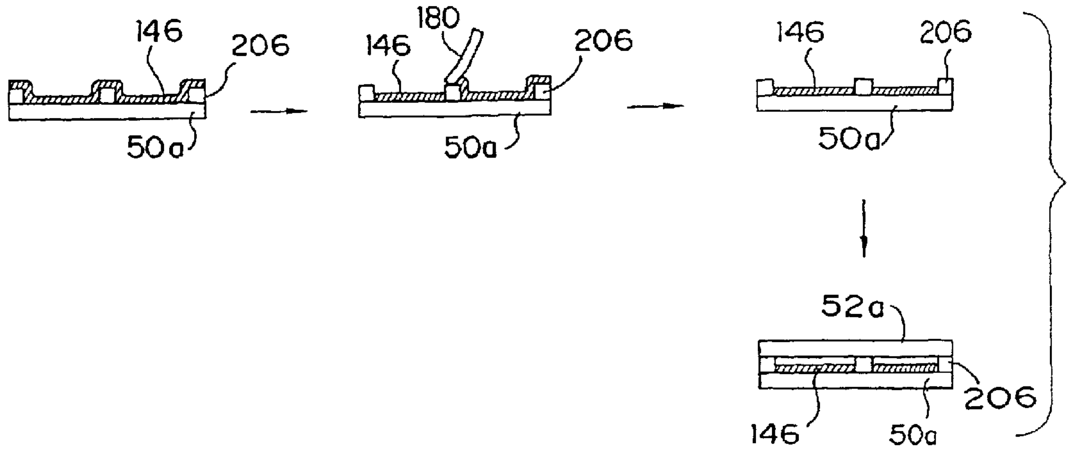
FIGS. 53A and 53B are explanatory drawings showing a method of supplying particles to a substrate according to a thirty-eighth embodiment of the present invention.

In the thirty-eighth embodiment, as shown in FIG. 53A, the excess powder bodies 146 supplied to the first flat substrate 50*a* and the spacer 206 are removed by the blade 180, and the second flat substrate 52*a* is adhered.

The spacer 206 used here may be formed, for example, of epoxy resin of 200 μm in height and 2 mm in width. Such the spacers 206 were arranged on the first flat substrate 50*a* at longitudinal and lateral intervals of 60 mm to form a plurality of square cells, and the powder bodies 146 of about 30 μm in diameter were sprayed on the first flat substrate 50*a* from above by use of a strainer of stainless steel mesh to form about one layer of the powder bodies 146 on the first flat substrate. Subsequently, the blade 180 formed of resilient urethane rubber plate (30 degrees hardness) 1.5 mm in thickness, 200 mm in width, 15 mm in free end was pressed against the upper surface of the spacers 206 so as to be in contact only with the surface of the spacers 206 at 20 g/cm line pressure, and moved at a speed of 10 mm/s to remove particles on the spacer 206. Some of the removed particles attached to the blade 180, but most of them dropped on the first flat substrate 50*a*. The amounts of the particles in each cell on the first flat substrate 50*a* were substantially the same as each other. Then, the second flat substrate 52*a* is adhered to form an image display medium.

Figure 53B:
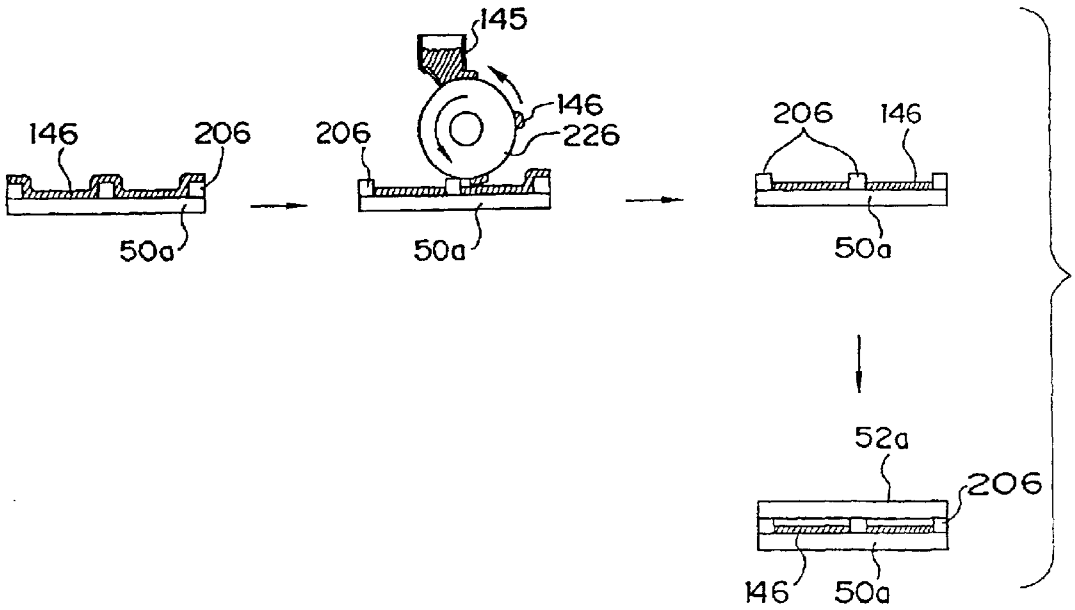

As shown in FIG. 53B, it is also possible to provide adhesiveness on a cylindrical roller 226 by arranging double-faced adhesive tape on the cylindrical roller 226, which has, for example, a surface of resilient rubber of 30 mm in diameter and 200 mm in width, with no space between adjacent tapes. The roller 226 may be pressed against the upper surface of the spacers 206 so as to be kept in contact therewith at a line pressure of 50 g/cm, and moved at a speed of 10 mm/s. Accordingly, the powder bodies 146 on the spacers 206 are removed and simultaneously attached on the cylindrical roller 226 and collected into the container 145 for recycling. Preferably, the powder bodies 146 attached on the surface of the cylindrical roller 226 are scraped by a scraper or the like. As a consequence, excess powder bodies on the spacer 206 can always be removed in a state such that none of the powder bodies 146 are attached on the surface of the cylindrical roller 226. Subsequently, the second flat substrate 52*a* is adhered to form an image display medium.

(Thirty-Ninth Embodiment)

In the thirty-ninth embodiment, trapping of the particles between the substrates is prevented by removing the particles attached on the spacer. Components that are the same as in the embodiments described above are assigned the same reference numerals, and descriptions thereof are not repeated.

Figure 54A:
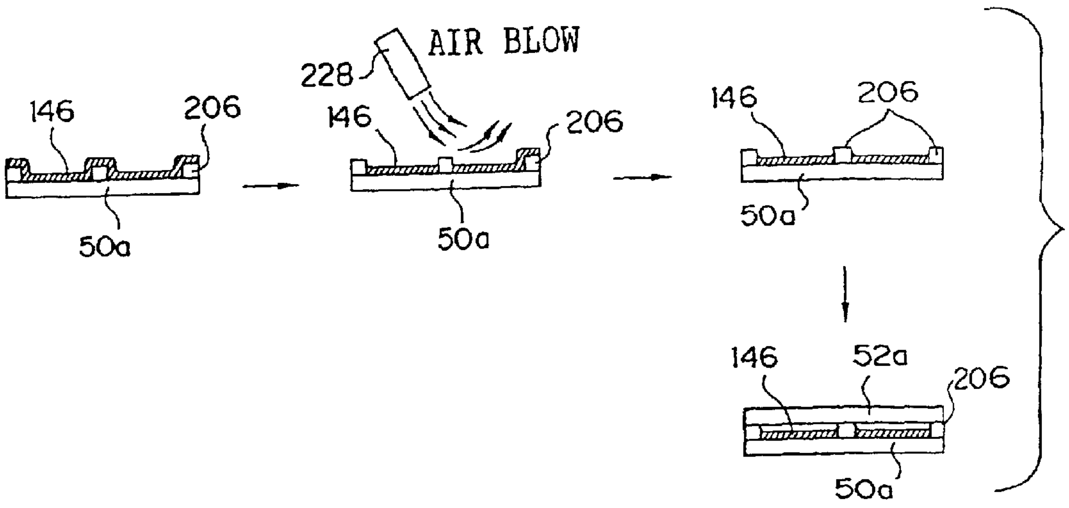
FIGS. 54A and 54B are explanatory drawings showing a method of supplying particles to a substrate according to a thirty-ninth embodiment of the present invention.

In the thirty-ninth embodiment, as shown in FIG. 54A, an excess of powder bodies 146 supplied on the first flat substrate 50$a$ and the spacer 206 are removed by blowing air by an air blow unit 228, and the second flat substrate 52$a$ is attached.

The air blow unit 228 has a nozzle of, for example, 1 mm in inner diameter, and airflow is blown from the nozzle at 20 mm/s in speed. When airflow was blown at an angle of about 45° with the tip of the nozzle placed at a distance about 3 cm away from the surface of the spacers 206 by use of the air blow unit 226, the powder bodies 146 on the spacers 206 were removed by airflow, and most of them fell down to the first flat substrate 50$a$. Some of the powder bodies 146 on the first flat substrate 50$a$ were moved slightly by the airflow, but they did not spill out of the cells. Subsequently, the second flat substrate 52$a$ is adhered to form an image display medium.

The spacer 206 may be made of a material having relatively low surface energy, for example, a fluorine-based material. In this case, since non-electrostatic adherence is low, the removing efficiency increases.

Figure 54B:
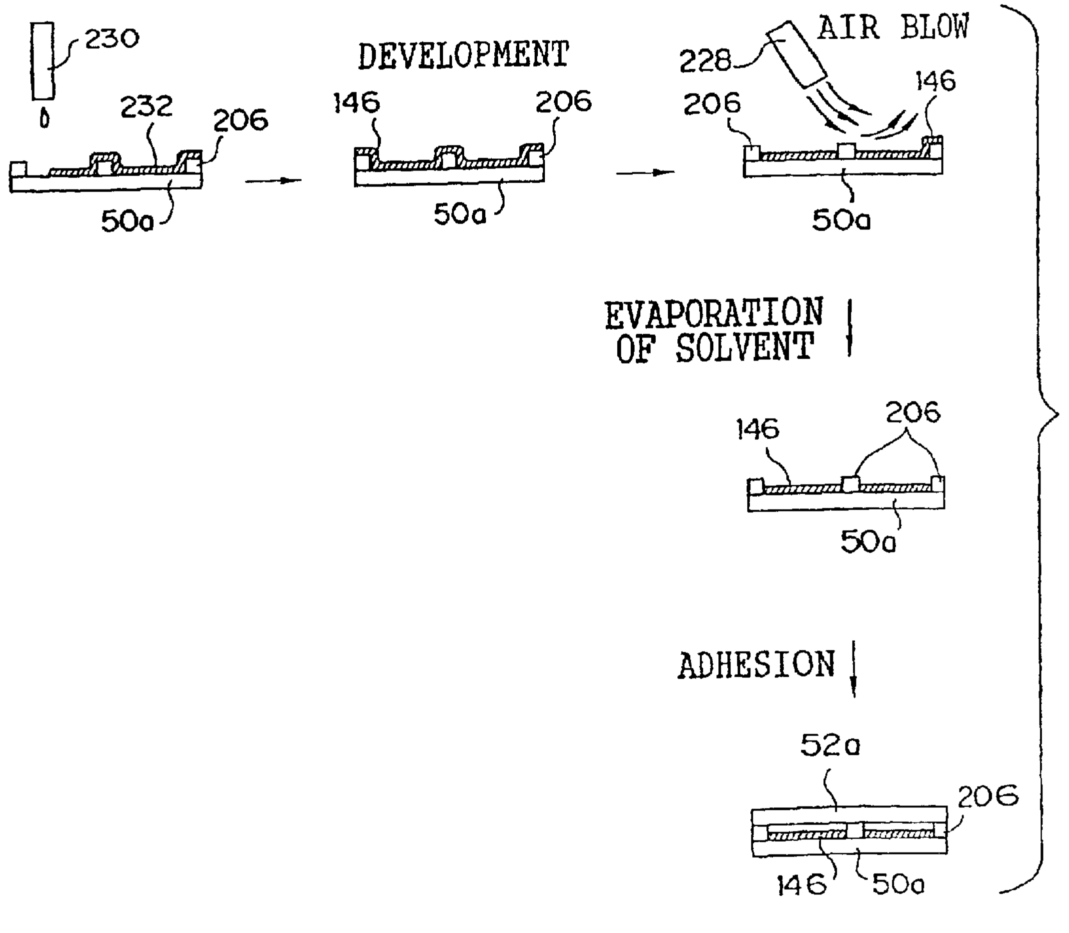

As shown in FIG. 54B, it is also possible to apply a volatile liquid 232 by an ink-jet head 230 in advance only on an area of the first flat substrate 50$a$ where the powder body particles are to be disposed, then develop, for example, according to a cascade process, and then supply the powder bodies 146 onto the first flat substrate 50$a$, and finally remove the powder bodies 146 on the spacers 206 by blowing an airflow by the air blow unit 228. In this way, by applying the volatile liquid 232 in advance at the position where the powder bodies 146 are to be attached, the powder bodies 146 on the first flat substrate 50$a$ may be prevented from being removed by the airflow and only excess the powder bodies 146 on the spacers 206 may be removed. Additionally, the powder bodies 146 on the spacers 206 may be removed by shaking the first flat substrate 50$a$.

In the same manner, adherability of the surface of the spacer 206 is made relatively lower than adherability of the surface of the first flat substrate 50$a$ and a volatile liquid (a liquid that vaporizes at a temperature at which the substrate and the powder bodies are not melted or decomposed, for example, distilled water, ethanol, 1-propanol, or the like) is supplied so that only the portion (surface of the substrate) on which the powder bodies are to be supplied is wetted with the liquid. In this state, the powder bodies 146 may be supplied, for example, by spraying, from a reservoir of the powder bodies, or by a roll or dispenser on which the powder bodies are attached, and are attached by surface tension. Accordingly, when the powder bodies 146 on the spacer 206 are to be removed by blowing airflow or by shaking, the powder bodies 146 held by the liquid resist moving, and thus strong airflow or vibrations may be applied, thereby enabling removal of the powder bodies 146 on the spacer 206 in a shorter time. Then, the second flat substrate 52$a$ is adhered to form an image display medium.

(Fortieth Embodiment)

In the fortieth embodiment, particles are supplied on the substrate on which the spacer is formed, and particles on the spacer are removed, for example, by shaking the substrate, so that trapping of the particles between the substrates is prevented. Components that are the same as in the embodiments described above are assigned the same reference numerals, and descriptions thereof are not repeated.

Figure 55:
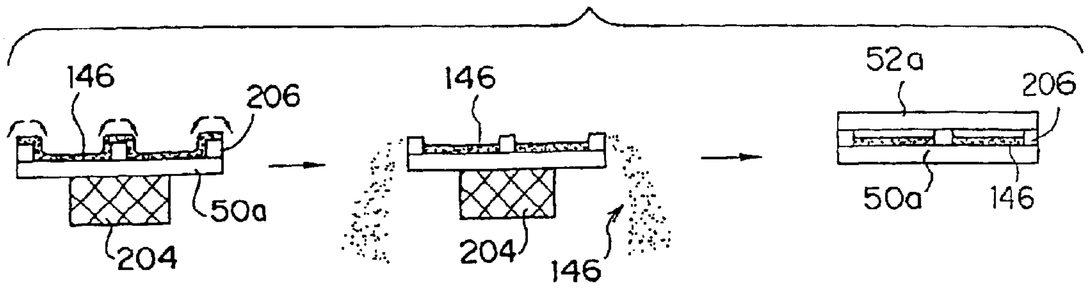
FIG. 55 is an explanatory drawing showing a method of supplying particles to a substrate according to a fortieth embodiment of the present invention.

The fortieth embodiment comprises the vibrator 204 as shown in FIG. 55. The powder bodies 146 including, for example, white particles and black particles are supplied on the first flat substrate 50$a$ formed with the spacer 206, and then the first flat substrate 50$a$ is shaken by use of the vibrator 204 from below. Accordingly, excess powder bodies 146 on the spacer 206 fall on the inside or outside of the first flat substrate 50$a$ by gravitation. Subsequently, the second flat substrate 52$a$ is adhered. In this way, trapping of the powder bodies 146 between the substrates may be prevented because excess powder bodies 146 on the spacer 206 are removed by applying vibrations before adhering the second flat substrate 52$a$.

For example, when the vibrator 204 was fixed on the first flat substrate 50$a$ and vibrations of an amplitude of 0.2 mm at 100 Hz in vibration frequency were applied, the powder bodies 146 on the spacer 206 were removed by vibrations and most fell onto the first flat substrate 50$a$. Some of the powder bodies 146 on the first flat substrate 50$a$ were moved by the vibrations, but nonuniformity or spillage of the powder bodies from the grid was not observed. Subsequently, the second flat substrate 52$a$ is adhered thereon to form an image display medium.

It is also possible to shake the first flat substrate 50$a$ to form a standing wave at the first flat substrate 50$a$ or in the airspace over the first flat substrate 50$a$ such that all the upper surfaces of the spacers 206 have positions corresponding to antinodes of the vibrations. In this case, the spacers 206 are arranged at regular intervals longitudinally on the first flat substrate 50$a$, and the first flat substrate 50$a$ is shaken at a vibration frequency that is an integral multiple of a characteristic frequency in the longitudinal direction thereof. As a consequence, the powder bodies 146 at the antinodes move toward nodes, and thus the powder bodies 146 on the spacer 206 may be removed.

For example, the spacers 206 maybe arranged at intervals of 50 mm in the longitudinal direction on the first flat substrate 50$a$ which is 300 mm in length, but not arranged in the lateral direction. Vibrations at a frequency that resonates the first flat substrate 50$a$ are applied according to the thickness and Young's modulus of the first flat substrate 50$a$. For example, if the characteristic frequency is 300 Hz, vibrations at frequencies of 600 Hz, 900Hz, 1200 Hz, and 1500 Hz, which are integral multiples thereof (300×n(Hz), where n is positive integer) are applied. When the powder bodies 146 that were sprayed uniformly are resonated under such conditions, the powder bodies 146 at the positions corresponding to antinodes (the positions of largest amplitude) of vibration gather at the nodes (the positions of smallest amplitude), and thus the powder bodies 146 on the spacers 206 may be removed.

(Forty-First Embodiment)

In the forty-first embodiment, the particles are encapsulated between the substrates by a mixed airstream with the particles dispersed therein. Components that are the same as in the embodiments described above are assigned the same reference numerals, and descriptions thereof are not repeated.

Figure 56:
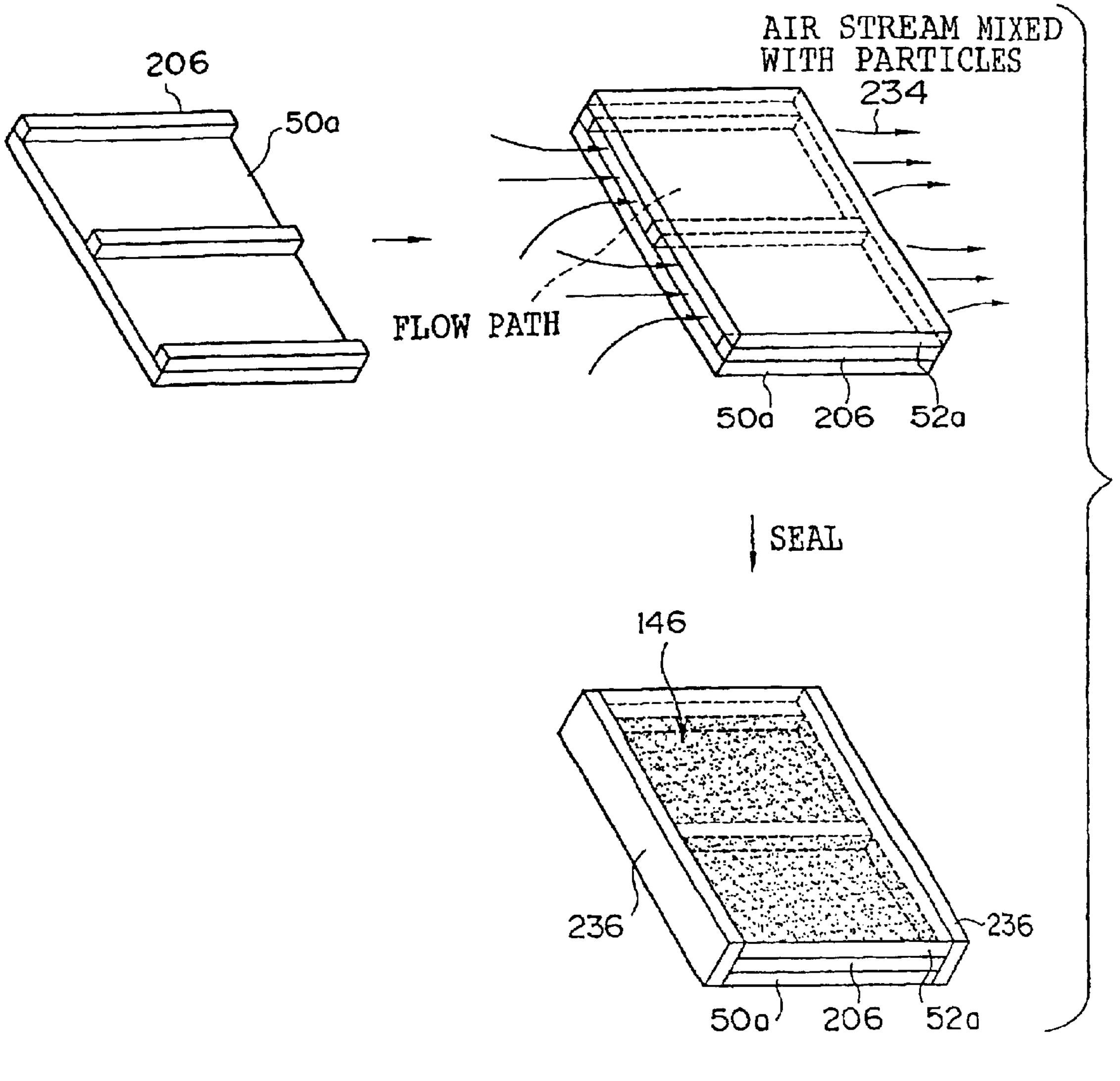
FIG. 56 is an explanatory drawing showing a method of supplying particles to a substrate according to a forty-first embodiment of the present invention.

In the forty-first embodiment, as shown in FIG. 56, a plurality of the spacers 206 is formed laterally on the first flat substrate 50$a$, for example, at the longitudinal ends and the center of the first flat substrate 50$a$, and then the second flat substrate 52$a$ is adhered thereon, and a flow path having a plurality of openings is formed between the substrates. In this way, the spacers 206 are arranged only in one direction so that the flow paths for mixed airstream, described later, are formed. Spherical spacers may be arranged linearly. The arrangement of the spacers is not limited to that shown in FIG. 56, as long as flow paths are formed, but it is preferable to form the flow path in such a manner that the cross sectional area of a flow path is kept constant from one end to the other, because this ensures a constant average flow rate of air, described later, all the way through the flow path, and thus the particles can be distributed uniformly.

Subsequently, a mixed airstream supplying device, not shown, feeds a mixed airstream 234 containing the powder bodies dispersed therein from both sides in the direction of width of the substrates so as to flow between the first flat substrate 50*a* and the second flat substrate 52*a*. As a consequence, flow paths for mixed airstreams are formed between the first flat substrate 50*a* and the second flat substrate 52*a*.

The powder bodies in the mixed airstream are attached on wall surfaces between the first flat substrate 50*a* and the second flat substrate 52*a* by electrostatic adherence or nonelectrostatic adherence. However, excess powder bodies are removed by the airstream and discharged to the outside with gas. The mixed gas containing the powder bodies is blown for from several tens of seconds to several minutes, with average flow rate of gas between the substrates (flow rate/cross sectional area of the flow path between the substrates) adjusted between several cm/s and several m/s, though it depends on diameter of a powder body, material of the powder body and the wall surface, and configuration of the wall surface. Then, after a desired state of attachment is obtained, the air stream is stopped. As a consequence, an image display medium having a prescribed amount of particles distributed uniformly between the substrates and having no trapping of the particles between the substrates may be obtained.

Since the powder bodies are supplied after the first flat substrate 50*a* formed with the spacers 206 and the second flat substrate 52*a* are adhered, no trapping of the powder bodies between the substrate and the spacers occurs. Side substrates 236 are adhered at lateral ends of the substrates. Consequently, the powder bodies are prevented from being spilt out.

It is also possible to flow an air stream containing the powder bodies, and then flow an air stream not containing the powder bodies at a constant speed to discharge excessly attached powder bodies. In this case, the average flow rate of gas between the substrates is adjusted in the range described above. Dry air or nitrogen may also be used as the gas. As a consequence, such gas is encapsulated simultaneously with the powder bodies, and thus a reliable product may be manufactured in a simple manner.

(Forty-Second Embodiment)

In the forty-second embodiment, a dispersion liquid containing dispersed particles is encapsulated between the substrates. Components that are the same as in the embodiments described above are assigned the same reference numerals, and descriptions thereof are not repeated.

Figure 57:
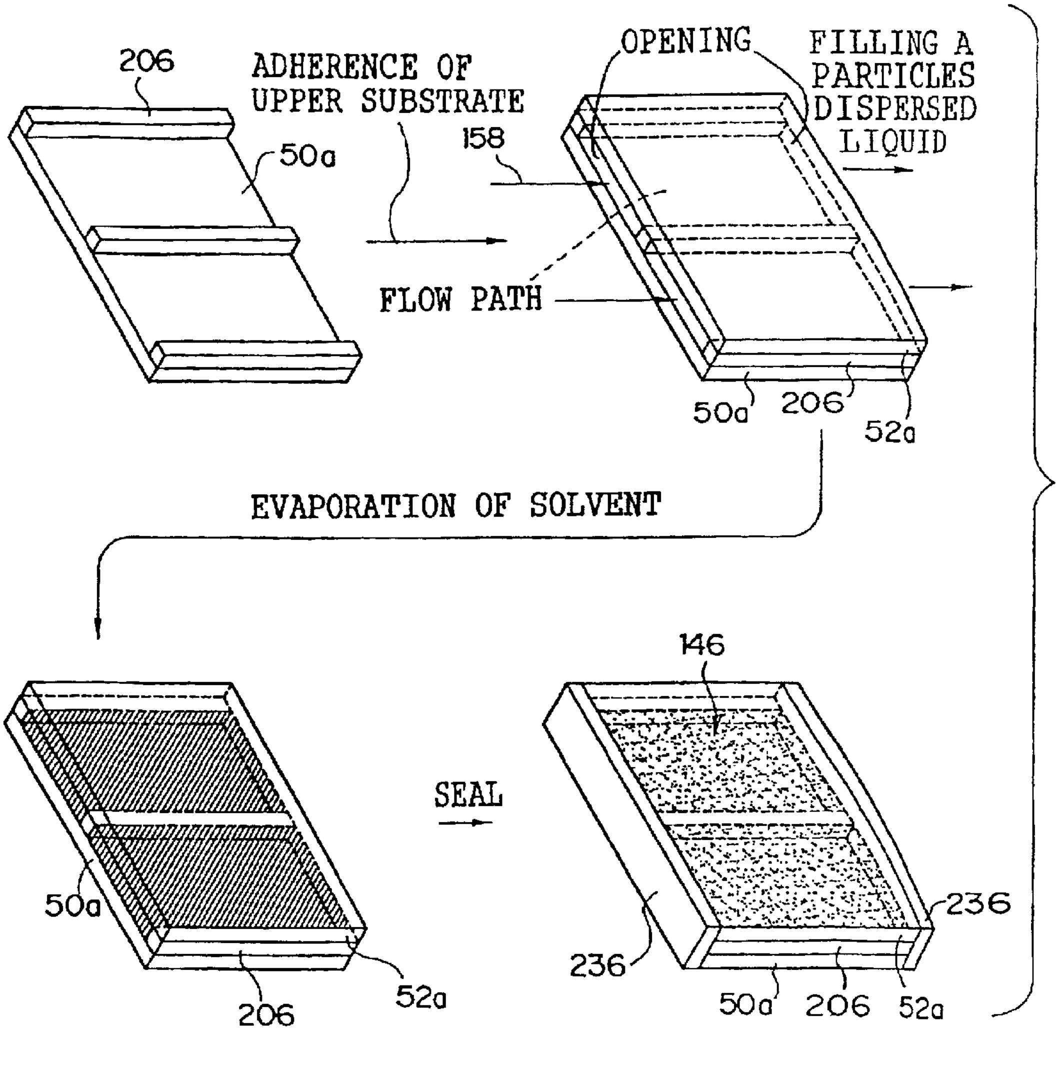
FIG. 57 is an explanatory drawing showing a method of supplying particles to a substrate according to a forty-second embodiment of the present invention.

In the forty-second embodiment, as shown in FIG. 57, a plurality of spacers 206 is formed laterally on the first flat substrate 50*a*, for example, at the longitudinal ends and the center of the first flat substrate 50*a*, and then the second flat substrate 52*a* is adhered thereon, and a flow path having a plurality of openings is formed between the substrates. In this way, the spacers 206 are arranged only in one direction. It is also possible to dispose spherical spacers linearly. The arrangement of the spacers is not limited to that shown in FIG. 57, as long as flow paths are formed, but it is preferable to provide many openings, or to provide openings of larger area for shortening a time period required for evaporation of liquid, described later.

Subsequently, a dispersion liquid supplying device, not shown, feeds the dispersion liquid containing the powder bodies dispersed therein from both sides in the direction of width of the substrates so as to flow between the first flat substrate 50*a* and the second flat substrate 52*a*. The substrates may be completely filled with the dispersion liquid 158. In this case, a method of decreasing pressure between the substrates by a pressure control unit, not shown, and substituting with the dispersion liquid 158 (so called evacuation filling) may be used. This prevents air from remaining inside, and thus the dispersed liquid 158 may be filled uniformly within the substrate.

Subsequently, the dispersion liquid 158 is dried (or dehydrated) to obtain a state in which only the powder bodies are encapsulated. The efficiency of evaporation of the liquid may be enhanced and the time period required for evaporation of solvent (drying) shortened by increasing an opened area or providing a number of openings (several tens of openings).

It is also possible to flow the dispersion liquid 158 so as to partly fill the substrates. In this case, the ratio between liquid and gas flowing between the substrates is kept constant through the substrates. For example, both of the substrates are adhered in parallel so that the distance between the substrates is kept constant through the substrates. Then, a suitable amount of liquid (for example, 20 to 80% of the volume between the substrates) is supplied in a state in which the surface of the substrates is horizontal.

In this state, the liquid is evaporated from the opened ends so that only the powder bodies remain between the substrates. The amount of the powder bodies encapsulated is controlled by controlling the amount of the powder bodies dispersed in the liquid and the amount of liquid supplied. Since the powder bodies are supplied after the second flat substrate 52*a* is adhered on the first flat substrate 50*a* formed with the spacers 206, trapping of the powder bodies between the substrate and the spacers is prevented. Then, after the liquid is evaporated sufficiently, the side substrates 236 are adhered at both lateral sides in the direction of width of the substrates. Consequently, the powder bodies are prevented from being spilt out. In such a manner, an image display medium having a prescribed amount of particles distributed uniformly between the substrates and having no trapping of the particles between the substrates may be obtained.

It is preferable to heat to a temperature, at which the substrates and the powder bodies are not melted or decomposed (for example, 30° C. to 100° C.), because the liquid can be evaporated quicker. It is also preferable to flow air (dry air or dry nitrogen are preferable) in a state in which an airspace exists between the substrates, because the efficiency of discharge of the liquidized vapor increases and the time period for evaporation of solvent (drying) decreases. In this case, the flow rate of gas between the substrates is preferably not more than several cm/s, so as to prevent overflow or irregularity of the liquid.

(Forty-Third Embodiment)

In the forty-third embodiment, trapping of the particles between the substrates is prevented by selectively providing the spacer and the particles on the substrate. Components that are the same as in the embodiments described above are assigned the same reference numerals, and descriptions thereof are not repeated.

Figure 58:
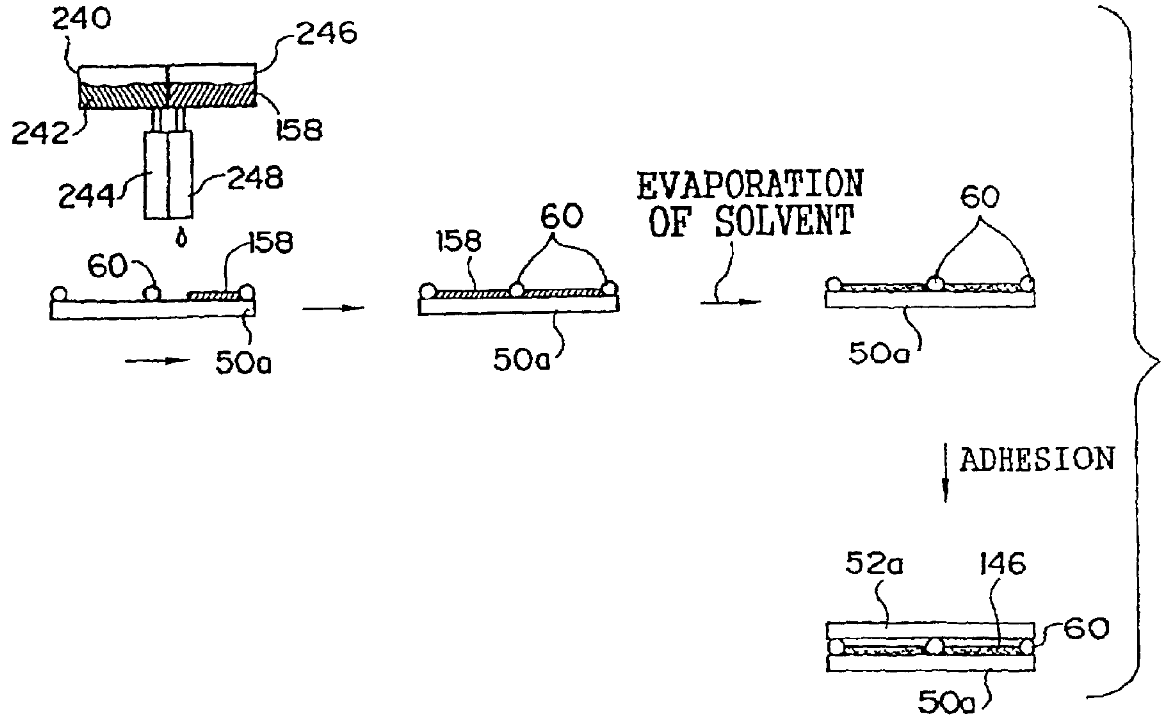
FIG. 58 is an explanatory drawing showing a method of supplying particles to a substrate according to a forty-third embodiment of the present invention.

In the forty-third embodiment, as shown in FIG. 58, a dispersion liquid 242 containing the spacer particles 60 (for example, 100 μm in mean diameter) dispersed therein is filled into a container 240, and the dispersed liquid 242 is supplied to the first flat substrate 50*a* by an ink-jet head 244. The dispersion liquid 158 containing the powder bodies 146

(for example, 30 μm in mean diameter) dispersed therein is filled into a container 246, and the dispersion liquid 158 is supplied onto the first flat substrate 50*a* by an ink-jet head 248.

Then, while (or after) the powder bodies dispersed in the liquid are supplied by one ink-jet (or a printing drum), rib material is injected (or transferred) by the other ink-jet head (or printing drum) to produce ribs.

While the dispersion material 242 is supplied to a desired position by the ink-jet head 244, the dispersion liquid 158 is supplied to a desired position, different from the position to which the dispersion liquid 242 is supplied, by the ink-jet head 248 (one of the dispersion liquids is supplied by one of the ink-jet heads into a part of the substrate and simultaneously the other dispersion liquid is supplied by the other ink-jet head to a different part of the substrate). Subsequently, the substrate is dried for a prescribed time period to evaporate the liquid so that only the powder bodies 146 and the spacer particles 60 are formed on the first flat substrate 50*a*, and then the second flat substrate 52*a* is adhered.

In this way, the powder bodies and the spacer particles are supplied to the different positions, and trapping of the powder bodies 146 between the substrates is prevented.

(Forty-Fourth Embodiment)

In the forty-fourth embodiment, the spacer is formed on the substrate to be on a display side, and a non-display substrate is adhered thereon, so that particles intervened between the substrates are not displayed. Components that are the same as in the embodiments described above are assigned the same reference numerals, and descriptions thereof are not repeated.

Figure 59:
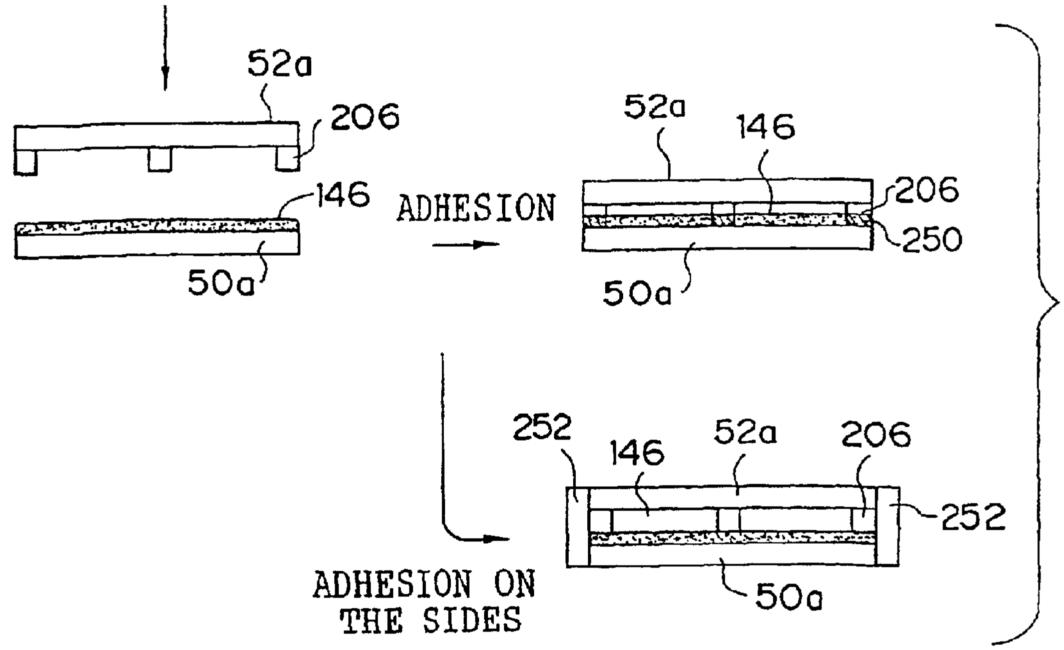
FIG. 59 is an explanatory drawing showing a method of supplying particles to a substrate according to a forty-fourth embodiment of the present invention.

In the forty-fourth embodiment, as shown in FIG. 59, the spacer 206 is formed on the second flat substrate 52*a*, which is the display substrate. Subsequently, after the powder bodies 146 have been supplied uniformly on the first flat substrate 50*a*, which is the non-display substrate, an adhesive agent 250 is applied on the spacer 206, and the second flat substrate 52*a* is adhered thereon. At this time, since the powder bodies 146 are formed uniformly, irregular gaps and floating do not occur. Though the powder bodies 146 are trapped between the spacer 206 and the first flat substrate 50*a* which is the non-display substrate, because it is the non-display substrate, there is no effect on the displayed image, and no problem is caused. It is also possible to adhere side substrates 252 at the sides.

Figure 60:
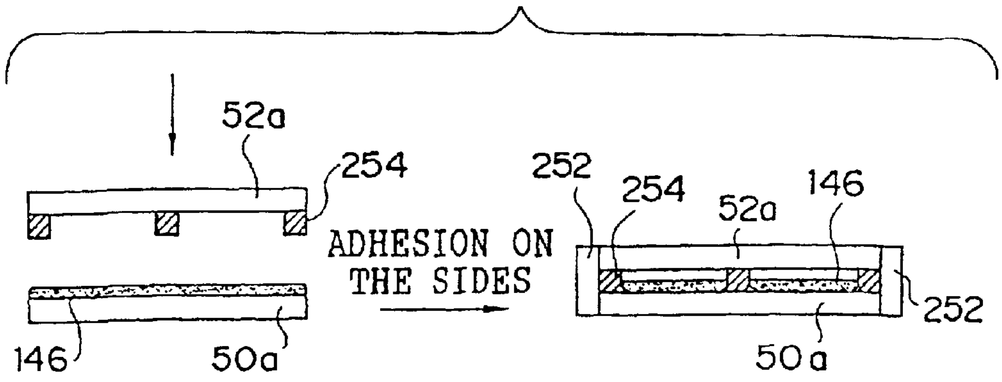
FIG. 60 is an explanatory drawing showing a method of supplying particles to a substrate according to a forty-fourth embodiment.

As shown in FIG. 60, the second flat substrate 52*a* may be formed with a spacer 254 formed of a resilient material (for example, silicone rubber) or of a deformable material. In this case, the powder bodies 146 are formed uniformly on the first flat substrate 50*a*, then the second flat substrate 52*a* is pressed on and adhered with the powder bodies 146 interposed, and the side surfaces are fixed with the side substrates 252.

The embodiments described above may be embodied in combination as needed, and it is also possible to select an optimal method of supply for each group of particles and to supply them separately.

In the embodiments, utilizing an electric field, when a conductive layer such as an electrode is on the substrate, the conductive layer may be used as an electrode for applying the electric field. When applying an electric field to a substrate having no conductive layer, an electrode provided outside of the substrate (a so-called back plate) may be used as one of the electrodes.

An alternating electric field may be applied after encapsulating the particles (to initialize). Consequently, the particles may be further uniformized in each cell (or on the entire substrate).

The adhesive agent to be used for adhering each substrate and the spacer may be a known adhesive for liquid crystal displays or the like. However, when supplying the adhesive agent to the substrate to which the particles are supplied, the adhesive agent is preferably supplied in the grounded state (or in a state of being at the same potential as the substrate) in order to prevent the particles from being detached by charge from a dispenser. If adhering when the particles have been supplied only on one of the substrates, it is preferable to adhere after supplying the adhesive agent to the substrate on which the particles are not supplied, because then the supplied particles are not disturbed.

Preferably, each group of particles is supplied on a different substrate before joining, because particles already supplied and having different polarities are attracted by particles being supplied, and thus are prevented from being detached while being supplied. When more than two groups of particles are supplied, preferably, particles having the same polarity are supplied on the same substrate before joining.

When supplying a plurality of groups of particles, preferably, the particles are supplied while controlling the amount to be supplied for each group because this eliminates the necessity of controlling mixing ratios separately.

When supplying a plurality of types of particles after having mixed them together in advance, preferably, the amount of charge of each particle is controlled into an optimal state before inclusion, by controlling strength of mixing, vibrations or a time period of application of vibration.

If magnetic powder bodies are used as the particles, they may be supplied under conditions optimal for the properties of the magnetic bodies by controlling a magnetic field by an electromagnet.

If a printing process such as screen printing is used for supplying the particles, it is also possible to supply the spacer to the substrate by utilizing the printing process. Consequently, the spacer and the particles may be formed in consecutive processes, thereby improving efficiency.

In the case of supplying the particles onto the substrate dispersingly by injection or the like, or supplying the particles onto the substrate according to a fixed-quantity system, the spacer particles are mixed with the color material particles in advance to supply the spacer particles simultaneously with the particles, so that the process can be simplified.

Preferably, a desiccating agent (silica gel) is included in the cells, to stabilize humidity in the cells and improve reliability.

In screen printing, preferably, the entire spacer, or the surface of the spacer to be adhered is formed of UV-curable ink, or thermosetting ink, so that necessity of separate application of an adhesive agent is eliminated. In this case, a solvent gas of adhesive agent does not remain in the cells, thereby improving reliability.

In a display sheet for holding a developer that is colored into two colors as disclosed in Japanese Patent Laid-Open No. 98803/2000, particles are introduced into the sheet by supplying them into holes and leveling by a pallet. Only an amount defined substantially by the height of the spacer can be encapsulated, and thus it is difficult to freely control the amount of the particles to be supplied. However, according to the present invention, the amount of introduction of the particles may be made uniform, and the amount to be encapsulated may be controlled to an optimum value irrespective of the distance of clearance (gap) between the substrates.

As described above, according to the present invention, prescribed powdered display elements can be encapsulated uniformly between opposed substrates and, concurrently, irregularity of displayed images caused by trapping of powder bodies can be prevented.

What is claimed is:

1. A method of manufacturing an image display medium, the method comprising the steps of:

providing two substantially flat substrates, one of the substrates having at least one spacer disposed thereon;

disposing a plurality of color material particles distributed substantially uniformly on at least one of the two substrates;

while maintaining a predetermined amount of the plurality of color material particles distributed on the at least one of the two substrate, superimposing one of the two substrate onto the other of the two substrates; and using the at least one spacer to fix the two substrates to one another.

2. The method according to claim 1, wherein the step of disposing the plurality of color material particles comprises supplying the color material particles to the at least one of the two substrate using an electric field.

3. The method according to claim 1, wherein the step of disposing the plurality of color material particles comprises the sub-steps of:

dispersing the color material particles in a gas; and thereafter supplying the color material particles to the at least one of the two substrate.

4. The method according to claim 1, wherein the step of disposing the plurality of color material particles comprises the sub-steps of:

dispersing the color material particles in a liquid; and thereafter supplying the color material particles to the at least one of the two substrates.

5. The method according to claim 1, wherein the step of disposing the plurality of color material particles comprises the sub-steps of:

accommodating a predetermined quantity of the color material particles in a receptacle; and thereafter supplying the color material particles from the receptacle to the at least one of the two substrate.

6. The method according to claim 1, further comprising, removing an excess of the color material particles from the at least one of the two substrates after disposing the plurality of color material particles substantially uniformly on the at least one of the two substrates.

7. A method of manufacturing an image display medium, the method comprising the steps of:

providing two substantially flat substrates, one of the two substrates having at least one spacer disposed thereon, the two substrates being fixable to one another using the at least one spacer interposed between the two substrates;

disposing a plurality of color material particles on at least one of the two substrates;

while maintaining the color material particles on the at least one of the two substrates, superimposing the two substrates such that substantially no color material particles are disposed on a surface of the at least one spacer opposing the other of the two substrates not having the at least one spacer disposed thereon; and fixing the two substrates to one another using the at least one spacer.

8. The method according to claim 7, wherein an adhesive property of the surface of the at least one spacer opposing the other of the substrates not having the at least one spacer disposed thereon is lower than an adhesive property of the substrate having the at least one spacer disposed thereon.

9. The method according to claim 7, further comprising the step of removing the color material particles from the surface of the at least one spacer opposing the other of the two substrates not having the at least one spacer disposed thereon by vibrating the at least one spacer.

10. A method of manufacturing an image display medium, the method comprising the steps of:

providing two substantially flat substrates that are fixable to one another using at least one spacer;

fixing the two substrates to one another via the at least one spacer, such that there is a gap between the two substrates;

dispersing color material particles in a gas;

supplying the color material particles dispersed in the gas to the gap; and trapping the color material particles in the gap.

11. A method of manufacturing an image display medium, the method comprising the steps of:

providing two substantially flat substrates that are fixable to one another using at least one spacer;

fixing the substrates to one another via the at least one spacer, such that there is a gap between the substrates;

dispersing color material particles in a liquid;

supplying the color material particles dispersed in the liquid to the gap; and trapping the color material particles in the gap.

12. An image display medium comprising:

a first substantially flat substrate;

a second substantially flat substrate which includes at least one spacer, the second flat substrate being superimposed with the first flat substrate with the at least one spacer therebetween such that a substantially constant distance is maintained between the substrates; and a plurality of color material particles disposed between the substrates, wherein the spacer comprises a shape that tapers toward a side thereof facing the first flat substrate.

* * * * *